(12) United States Patent
Gordon et al.

(10) Patent No.: US 9,674,586 B2
(45) Date of Patent: Jun. 6, 2017

(54) DATA STRUCTURE AND METHODS FOR PROVIDING AN INTERACTIVE PROGRAM GUIDE

(71) Applicant: Comcast IP Holdings I, LLC, Wilmington, DE (US)

(72) Inventors: Donald F. Gordon, Los Altos, CA (US); Edward A. Ludvig, Redwood City, CA (US); Nathan W. Osborn, Palto Alto, CA (US); Jeremy S. Edmonds, Redwood City, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 0 days.

(21) Appl. No.: 13/847,751

(22) Filed: Mar. 20, 2013

(65) Prior Publication Data

US 2014/0123189 A1 May 1, 2014

Related U.S. Application Data

(63) Continuation of application No. 10/694,658, filed on Oct. 28, 2003, now Pat. No. 8,739,218, which is a (Continued)

(51) Int. Cl.
*H04N 7/173* (2011.01)
*H04N 5/445* (2011.01)
(Continued)

(52) U.S. Cl.
CPC ..... *H04N 21/8133* (2013.01); *H04N 5/44543* (2013.01); *H04N 7/163* (2013.01);
(Continued)

(58) Field of Classification Search
CPC .. H04N 21/44016; H04N 5/272; H04N 5/222; H04N 21/4318; H04N 21/47217;
(Continued)

(56) References Cited

U.S. PATENT DOCUMENTS 3,754,211 A 8/1973 Rocher et al.
4,213,124 A 7/1980 Barda et al.
(Continued)

FOREIGN PATENT DOCUMENTS

CA 2388606 4/2002
CA 2721609 11/2010
(Continued)

OTHER PUBLICATIONS

Response to European Office Action—EP 99937446.5—Dated May 12, 2015.
(Continued)

*Primary Examiner* — Pankaj Kumar
*Assistant Examiner* — Reuben M Brown
(74) *Attorney, Agent, or Firm* — Banner & Witcoff, Ltd.

(57) ABSTRACT

A program guide in which a video layer includes a plurality of video objects including title objects, each title object having associated with it a channel and at least one time slot, the video layer being formed in response to a received video stream; and a graphics layer comprising a plurality of graphics objects including title overlay objects, each of the title overlay objects selectively imparting at least a visual de-emphasis to a respective title object in the video layer, the visual de-emphasis being imparted to title objects not being associated with a desired time slot.

20 Claims, 21 Drawing Sheets

Related U.S. Application Data continuation of application No. 09/293,526, filed on Apr. 15, 1999, now Pat. No. 6,754,905.

(60) Provisional application No. 60/093,891, filed on Jul. 23, 1998.

(51) Int. Cl.
| | |
|---|---|
| *H04N 21/81* | (2011.01) |
| *H04N 7/16* | (2011.01) |
| *H04N 21/431* | (2011.01) |
| *H04N 21/45* | (2011.01) |
| *H04N 21/482* | (2011.01) |
| *H04N 21/6547* | (2011.01) |
| *H04N 21/84* | (2011.01) |
| *H04N 5/45* | (2011.01) |

(52) U.S. Cl.
CPC .......... *H04N 7/165* (2013.01); *H04N 21/4314* (2013.01); *H04N 21/4532* (2013.01); *H04N 21/482* (2013.01); *H04N 21/4821* (2013.01); *H04N 21/6547* (2013.01); *H04N 21/84* (2013.01); *H04N 5/45* (2013.01)

(58) Field of Classification Search
CPC ........... H04N 21/3312; H04N 21/8133; H04N 21/4314; H04N 21/4532; H04N 21/482; H04N 21/4821; H04N 21/6547; H04N 21/44; H04N 5/44543; H04N 7/163; H04N 7/165; H04N 21/23418; H04N 21/2343; H04N 21/234318; H04N 21/234327; H04N 21/431; H04N 21/4312; H04N 23/4314; H04N 21/4402; H04N 21/44027; H04N 21/4854; H04N 5/2723; H04N 5/275; H04N 5/278; H04N 5/445; H04N 5/44504; H04N 2005/2726; H04N 2005/441; G06F 3/0481
USPC ............ 725/38, 37, 39, 44, 47, 60; 715/768, 715/823, 866, 861
See application file for complete search history.

(56) References Cited

U.S. PATENT DOCUMENTS

| | | | |
|---|---|---|---|
| 4,250,356 A | 2/1981 | Hammer, Jr. et al. | |
| 4,250,521 A | 2/1981 | Wright | |
| 4,290,063 A | 9/1981 | Traster | |
| 4,381,522 A | 4/1983 | Lambert | |
| 4,437,093 A | 3/1984 | Bradley | |
| 4,479,142 A | 10/1984 | Buschman et al. | |
| 4,496,976 A | 1/1985 | Swanson et al. | |
| 4,520,356 A | 5/1985 | O'Keefe et al. | |
| 4,520,921 A | 6/1985 | Vissing | |
| 4,567,512 A | 1/1986 | Abraham | |
| RE32,187 E | 6/1986 | Barda et al. | |
| 4,600,921 A | 7/1986 | Thomas | |
| 4,633,297 A | 12/1986 | Skerlos et al. | |
| 4,706,121 A | 11/1987 | Young | |
| 4,712,239 A | 12/1987 | Frezza et al. | |
| 4,734,764 A | 3/1988 | Pocock et al. | |
| 4,739,318 A | 4/1988 | Cohen | |
| 4,742,344 A | 5/1988 | Nakagawa et al. | |
| 4,745,468 A | 5/1988 | Von Kohorn | |
| 4,751,578 A | 6/1988 | Reiter et al. | |
| 4,792,848 A | 12/1988 | Nussrallah et al. | |
| 4,792,849 A | 12/1988 | McCalley et al. | |
| 4,829,372 A | 5/1989 | McCalley et al. | |
| 4,829,569 A | 5/1989 | Seth-Smith et al. | |
| 4,847,825 A | 7/1989 | Levine | |
| 4,860,123 A | 8/1989 | McCalley et al. | |
| 4,866,770 A | 9/1989 | Seth-Smith et al. | |
| 4,876,592 A | 10/1989 | Von Kohorn | |
| 4,884,267 A | 11/1989 | Miyamoto et al. | |
| 4,885,775 A | 12/1989 | Lucas | |
| 4,890,321 A | 12/1989 | Seth-Smith et al. | |
| 4,905,094 A | 2/1990 | Pocock et al. | |
| 4,908,713 A | 3/1990 | Levine | |
| 4,926,255 A | 5/1990 | Von Kohorn | |
| 4,941,040 A | 7/1990 | Pocock et al. | |
| 4,963,994 A | 10/1990 | Levine | |
| 4,977,455 A | 12/1990 | Young | |
| 4,991,011 A | 2/1991 | Johnson et al. | |
| 4,994,908 A | 2/1991 | Kuban et al. | |
| 4,994,909 A | 2/1991 | Graves et al. | |
| 5,014,125 A | 5/1991 | Pocock et al. | |
| 5,027,400 A | 6/1991 | Baji et al. | |
| 5,034,807 A | 7/1991 | Von Kohorn | |
| 5,038,211 A | 8/1991 | Hallenbeck | |
| 5,057,915 A | 10/1991 | Von Kohorn | |
| 5,058,160 A | 10/1991 | Banker et al. | |
| 5,070,400 A | 12/1991 | Lieberman | |
| 5,109,279 A | 4/1992 | Ando | |
| 5,113,496 A | 5/1992 | McCalley et al. | |
| 5,119,188 A | 6/1992 | McCalley et al. | |
| 5,123,046 A | 6/1992 | Levine | |
| 5,128,752 A | 7/1992 | Von Kohorn | |
| 5,130,792 A | 7/1992 | Tindell et al. | |
| 5,146,210 A | 9/1992 | Heberle | |
| 5,151,789 A | 9/1992 | Young | |
| 5,153,763 A | 10/1992 | Pidgeon | |
| 5,182,640 A | 1/1993 | Takano | |
| 5,191,410 A | 3/1993 | McCalley et al. | |
| 5,195,092 A | 3/1993 | Wilson et al. | |
| 5,208,665 A | 5/1993 | McCalley et al. | |
| 5,227,874 A | 7/1993 | Von Kohorn | |
| 5,231,665 A | 7/1993 | Auld et al. | |
| 5,239,540 A | 8/1993 | Rovira et al. | |
| 5,247,364 A | 9/1993 | Banker et al. | |
| 5,249,044 A | 9/1993 | Von Kohorn | |
| 5,260,778 A | 11/1993 | Kauffman et al. | |
| 5,270,688 A * | 12/1993 | Dawson et al. | 345/639 |
| 5,270,809 A | 12/1993 | Gammie et al. | |
| 5,283,734 A | 2/1994 | Von Kohorn | |
| 5,293,357 A | 3/1994 | Hallenbeck | |
| 5,297,204 A | 3/1994 | Levine | |
| 5,301,028 A | 4/1994 | Banker et al. | |
| 5,303,295 A | 4/1994 | West et al. | |
| 5,307,173 A | 4/1994 | Yuen et al. | |
| 5,317,391 A | 5/1994 | Banker et al. | |
| 5,319,454 A | 6/1994 | Schutte | |
| 5,319,455 A | 6/1994 | Hoarty et al. | |
| 5,319,707 A | 6/1994 | Wasilewski et al. | |
| 5,335,079 A | 8/1994 | Yuen et al. | |
| 5,351,075 A | 9/1994 | Herz et al. | |
| 5,353,121 A | 10/1994 | Young et al. | |
| 5,357,276 A | 10/1994 | Banker et al. | |
| 5,359,601 A | 10/1994 | Wasilewski et al. | |
| 5,361,091 A | 11/1994 | Hoarty et al. | |
| 5,365,282 A | 11/1994 | Levine | |
| 5,373,330 A | 12/1994 | Levine | |
| 5,376,969 A | 12/1994 | Zdepski | |
| 5,382,983 A | 1/1995 | Kwoh et al. | |
| 5,400,401 A | 3/1995 | Wasilewski et al. | |
| 5,400,402 A | 3/1995 | Garfinkle | |
| 5,406,558 A | 4/1995 | Rovira et al. | |
| 5,410,367 A | 4/1995 | Zahavi et al. | |
| 5,414,448 A | 5/1995 | Wada et al. | |
| 5,414,756 A | 5/1995 | Levine | |
| 5,420,647 A | 5/1995 | Levine | |
| 5,420,866 A | 5/1995 | Wasilewski | |
| 5,422,674 A | 6/1995 | Hooper et al. | |
| 5,428,404 A | 6/1995 | Ingram et al. | |
| 5,438,370 A | 8/1995 | Primiano et al. | |
| 5,440,632 A | 8/1995 | Bacon et al. | |
| 5,448,568 A | 9/1995 | Delpuch et al. | |
| 5,473,609 A | 12/1995 | Chaney | |
| 5,473,704 A | 12/1995 | Abe | |
| 5,475,382 A | 12/1995 | Yuen et al. | |
| 5,477,262 A | 12/1995 | Banker et al. | |
| 5,479,266 A | 12/1995 | Young et al. | |
| 5,479,268 A | 12/1995 | Young et al. | |

(56) References Cited

U.S. PATENT DOCUMENTS

| | | |
|---|---|---|
| 5,481,542 A | 1/1996 | Logston et al. |
| 5,483,287 A | 1/1996 | Siracusa |
| 5,485,197 A | 1/1996 | Hoarty |
| 5,485,221 A | 1/1996 | Banker et al. |
| 5,488,409 A | 1/1996 | Yuen et al. |
| 5,493,339 A | 2/1996 | Birch et al. |
| 5,493,638 A | 2/1996 | Hooper et al. |
| 5,500,933 A | 3/1996 | Schnorf |
| 5,502,504 A | 3/1996 | Marshall et al. |
| 5,508,815 A | 4/1996 | Levine |
| 5,515,106 A | 5/1996 | Chaney et al. |
| 5,515,173 A | 5/1996 | Mankovitz et al. |
| 5,517,257 A | 5/1996 | Dunn et al. |
| 5,523,794 A | 6/1996 | Mankovitz et al. |
| 5,523,796 A | 6/1996 | Marshall et al. |
| 5,526,034 A | 6/1996 | Hoarty et al. |
| 5,530,754 A | 6/1996 | Garfinkle |
| 5,532,732 A | 7/1996 | Yuen et al. |
| 5,532,754 A | 7/1996 | Young et al. |
| 5,534,944 A | 7/1996 | Egawa et al. |
| 5,539,391 A | 7/1996 | Yuen |
| 5,539,822 A | 7/1996 | Lett |
| 5,543,852 A | 8/1996 | Yuen et al. |
| 5,543,853 A | 8/1996 | Haskell et al. |
| 5,544,161 A | 8/1996 | Bigham et al. |
| 5,550,576 A | 8/1996 | Klosterman |
| 5,550,863 A | 8/1996 | Yurt et al. |
| 5,552,837 A | 9/1996 | Mankovitz |
| 5,553,123 A | 9/1996 | Chan et al. |
| 5,559,548 A | 9/1996 | Davis et al. |
| 5,559,549 A | 9/1996 | Hendricks et al. |
| 5,559,550 A | 9/1996 | Mankovitz |
| 5,559,870 A | 9/1996 | Patton et al. |
| 5,568,272 A | 10/1996 | Levine |
| 5,579,055 A | 11/1996 | Hamilton et al. |
| 5,579,057 A | 11/1996 | Banker et al. |
| 5,581,614 A | 12/1996 | Ng et al. |
| 5,583,560 A | 12/1996 | Florin et al. |
| 5,583,576 A | 12/1996 | Perlman et al. |
| 5,583,863 A | 12/1996 | Darr, Jr. et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,598,415 A | 1/1997 | Nuber et al. |
| 5,598,525 A | 1/1997 | Nally et al. |
| 5,600,364 A | 2/1997 | Hendricks et al. |
| 5,600,378 A | 2/1997 | Wasilewski |
| 5,600,711 A | 2/1997 | Yuen |
| 5,604,528 A | 2/1997 | Edwards et al. |
| 5,619,247 A | 4/1997 | Russo |
| 5,619,249 A | 4/1997 | Billock et al. |
| 5,619,269 A | 4/1997 | Lee et al. |
| 5,619,274 A | 4/1997 | Roop et al. |
| 5,619,337 A | 4/1997 | Naimpally |
| 5,619,383 A | 4/1997 | Ngai |
| 5,621,579 A | 4/1997 | Yuen |
| 5,623,308 A | 4/1997 | Civanlar et al. |
| 5,625,405 A | 4/1997 | DuLac et al. |
| 5,625,406 A | 4/1997 | Newberry et al. |
| 5,630,119 A | 5/1997 | Aristides et al. |
| 5,633,683 A | 5/1997 | Rosengren et al. |
| 5,633,810 A | 5/1997 | Mandal et al. |
| 5,635,978 A | 6/1997 | Alten et al. |
| 5,635,989 A | 6/1997 | Rothmuller |
| 5,639,350 A | 6/1997 | Aula et al. |
| 5,644,354 A | 7/1997 | Thompson et al. |
| 5,652,614 A | 7/1997 | Okabayashi |
| 5,652,615 A | 7/1997 | Bryant et al. |
| 5,657,072 A | 8/1997 | Aristides et al. |
| 5,659,350 A | 8/1997 | Hendricks et al. |
| 5,659,367 A | 8/1997 | Yuen |
| 5,666,487 A | 9/1997 | Goodman et al. |
| 5,666,645 A | 9/1997 | Thomas et al. |
| 5,668,599 A | 9/1997 | Cheney et al. |
| 5,673,089 A | 9/1997 | Yuen et al. |
| 5,675,575 A | 10/1997 | Wall, Jr. et al. |
| 5,682,511 A | 10/1997 | Sposato et al. |
| 5,684,525 A | 11/1997 | Klosterman |
| 5,687,331 A | 11/1997 | Volk et al. |
| 5,692,214 A | 11/1997 | Levine |
| 5,694,176 A | 12/1997 | Bruette et al. |
| 5,699,107 A | 12/1997 | Lawler et al. |
| 5,701,383 A | 12/1997 | Russo et al. |
| 5,701,610 A | 12/1997 | Hsu |
| 5,703,877 A | 12/1997 | Nuber et al. |
| 5,710,601 A | 1/1998 | Marshall et al. |
| 5,710,610 A | 1/1998 | Kim |
| 5,714,273 A | 2/1998 | Wake et al. |
| 5,715,515 A | 2/1998 | Akins, III et al. |
| 5,716,273 A | 2/1998 | Yuen |
| 5,719,646 A | 2/1998 | Kikuchi et al. |
| 5,724,203 A | 3/1998 | Kwoh et al. |
| 5,724,525 A | 3/1998 | Beyers, II et al. |
| 5,724,543 A | 3/1998 | Ozden et al. |
| 5,724,646 A | 3/1998 | Ganek et al. |
| 5,727,060 A | 3/1998 | Young |
| 5,729,549 A | 3/1998 | Kostreski et al. |
| 5,731,844 A | 3/1998 | Rauch et al. |
| 5,732,217 A | 3/1998 | Emura |
| 5,734,589 A | 3/1998 | Kostreski et al. |
| 5,734,853 A | 3/1998 | Hendricks et al. |
| 5,745,710 A | 4/1998 | Clanton, III et al. |
| 5,751,282 A | 5/1998 | Girard et al. |
| 5,754,783 A | 5/1998 | Mendelson et al. |
| 5,754,940 A | 5/1998 | Smith et al. |
| 5,757,416 A | 5/1998 | Birch et al. |
| 5,758,257 A | 5/1998 | Herz et al. |
| 5,758,259 A | 5/1998 | Lawler |
| 5,764,739 A | 6/1998 | Patton et al. |
| 5,768,491 A | 6/1998 | Lobodzinski et al. |
| 5,768,539 A | 6/1998 | Metz et al. |
| 5,768,551 A | 6/1998 | Bleiweiss et al. |
| 5,771,064 A | 6/1998 | Lett |
| 5,780,474 A | 7/1998 | Peglion et al. |
| 5,781,228 A | 7/1998 | Sposato |
| 5,781,245 A * | 7/1998 | Van Der Weij et al. ..... 725/105 |
| 5,784,095 A | 7/1998 | Robbins et al. |
| 5,790,172 A | 8/1998 | Imanaka |
| 5,790,198 A | 8/1998 | Roop et al. |
| 5,790,806 A | 8/1998 | Koperda |
| 5,793,364 A * | 8/1998 | Bolanos et al. ................ 725/41 |
| 5,793,410 A | 8/1998 | Rao |
| 5,793,438 A | 8/1998 | Bedard |
| 5,798,785 A | 8/1998 | Hendricks et al. |
| 5,801,747 A | 9/1998 | Bedard |
| 5,801,753 A | 9/1998 | Eyer et al. |
| 5,801,785 A * | 9/1998 | Crump et al. ................. 348/563 |
| 5,801,787 A | 9/1998 | Schein et al. |
| 5,802,063 A | 9/1998 | Deiss |
| 5,805,155 A | 9/1998 | Allibhoy et al. |
| 5,805,204 A | 9/1998 | Thompson et al. |
| 5,805,762 A | 9/1998 | Boyce et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,754 A | 9/1998 | Lui et al. |
| 5,815,145 A | 9/1998 | Matthews, III |
| 5,818,438 A | 10/1998 | Howe et al. |
| 5,818,439 A | 10/1998 | Nagasaka et al. |
| 5,822,014 A | 10/1998 | Steyer et al. |
| 5,822,123 A | 10/1998 | Davis et al. |
| 5,822,324 A | 10/1998 | Kostresti et al. |
| 5,826,110 A | 10/1998 | Ozden et al. |
| 5,828,420 A | 10/1998 | Marshall et al. |
| 5,828,945 A | 10/1998 | Klosterman |
| RE35,954 E | 11/1998 | Levine |
| 5,835,792 A | 11/1998 | Wise et al. |
| 5,838,383 A | 11/1998 | Chimoto et al. |

(56) References Cited

U.S. PATENT DOCUMENTS

| | | |
|---|---|---|
| 5,838,678 A | 11/1998 | Davis et al. |
| 5,838,873 A | 11/1998 | Blatter et al. |
| 5,841,433 A | 11/1998 | Chaney |
| 5,844,600 A | 12/1998 | Kerr |
| 5,844,620 A | 12/1998 | Coleman et al. |
| 5,847,771 A | 12/1998 | Cloutier et al. |
| 5,850,218 A | 12/1998 | LaJoie et al. |
| 5,850,232 A | 12/1998 | Engstrom et al. |
| 5,852,478 A | 12/1998 | Kwoh |
| 5,854,840 A | 12/1998 | Cannella, Jr. |
| 5,859,660 A | 1/1999 | Perkins et al. |
| 5,859,949 A | 1/1999 | Yanagihara |
| 5,861,881 A | 1/1999 | Freeman et al. |
| 5,861,906 A | 1/1999 | Dunn et al. |
| 5,867,208 A | 2/1999 | McLaren |
| 5,870,150 A | 2/1999 | Yuen |
| 5,870,474 A | 2/1999 | Wasilewski et al. |
| 5,880,768 A | 3/1999 | Lemmons et al. |
| 5,886,697 A | 3/1999 | Naughton et al. |
| 5,892,508 A | 4/1999 | Howe et al. |
| 5,894,328 A | 4/1999 | Negishi |
| 5,903,314 A | 5/1999 | Niijima et al. |
| 5,903,816 A | 5/1999 | Broadwin et al. |
| 5,905,497 A * | 5/1999 | Vaughan et al. ............. 345/672 |
| 5,907,323 A | 5/1999 | Lawler et al. |
| 5,914,757 A | 6/1999 | Dean et al. |
| 5,915,068 A | 6/1999 | Levine |
| 5,917,830 A | 6/1999 | Chen et al. |
| 5,926,230 A | 7/1999 | Niijima et al. |
| 5,931,908 A * | 8/1999 | Gerba et al. ................. 709/219 |
| 5,933,141 A | 8/1999 | Smith |
| 5,940,073 A | 8/1999 | Klosterman et al. |
| 5,940,738 A | 8/1999 | Rao |
| 5,945,987 A * | 8/1999 | Dunn ............................ 715/718 |
| 5,949,476 A * | 9/1999 | Pocock ............................ 348/24 |
| 5,949,792 A | 9/1999 | Yasuda et al. |
| 5,951,639 A | 9/1999 | MacInnis |
| 5,953,046 A * | 9/1999 | Pocock ............................ 348/24 |
| 5,956,088 A | 9/1999 | Shen et al. |
| 5,965,088 A | 10/1999 | Lever et al. |
| 5,966,120 A | 10/1999 | Arazi et al. |
| 5,966,162 A | 10/1999 | Goode et al. |
| 5,978,043 A | 11/1999 | Blonstein et al. |
| 5,978,855 A | 11/1999 | Metz et al. |
| 5,982,445 A | 11/1999 | Eyer et al. |
| 5,986,650 A | 11/1999 | Ellis et al. |
| 5,987,245 A | 11/1999 | Gish |
| 5,990,927 A | 11/1999 | Hendricks et al. |
| 5,990,972 A | 11/1999 | Bond-Harris et al. |
| 5,991,799 A | 11/1999 | Yen et al. |
| 5,995,095 A | 11/1999 | Ratakonda |
| 5,999,173 A | 12/1999 | Ubillos |
| 6,002,394 A | 12/1999 | Schein et al. |
| 6,002,444 A | 12/1999 | Marshall et al. |
| 6,005,561 A | 12/1999 | Hawkins et al. |
| 6,005,562 A | 12/1999 | Shiga et al. |
| 6,005,565 A | 12/1999 | Legall et al. |
| 6,005,601 A | 12/1999 | Ohkura et al. |
| 6,005,631 A | 12/1999 | Anderson et al. |
| 6,006,256 A | 12/1999 | Zdepski et al. |
| 6,008,803 A | 12/1999 | Rowe et al. |
| 6,014,184 A | 1/2000 | Knee et al. |
| 6,014,368 A | 1/2000 | Sanami |
| 6,016,144 A | 1/2000 | Blonstein et al. |
| 6,018,372 A | 1/2000 | Etheredge |
| 6,022,223 A | 2/2000 | Taniguchi et al. |
| 6,025,837 A | 2/2000 | Matthews, III et al. |
| 6,029,045 A | 2/2000 | Picco et al. |
| 6,034,677 A | 3/2000 | Noguchi et al. |
| 6,038,000 A | 3/2000 | Hurst, Jr. |
| 6,040,867 A | 3/2000 | Bando et al. |
| 6,044,396 A | 3/2000 | Adams |
| 6,049,831 A | 4/2000 | Gardell et al. |
| 6,061,097 A | 5/2000 | Satterfield |
| 6,061,399 A | 5/2000 | Lyons et al. |
| 6,061,451 A | 5/2000 | Muratani et al. |
| 6,062,868 A | 5/2000 | Toriumi |
| 6,064,376 A | 5/2000 | Berezowski et al. |
| 6,067,303 A | 5/2000 | Aaker et al. |
| 6,075,575 A | 6/2000 | Schein et al. |
| 6,104,391 A | 8/2000 | Johnston, Jr. et al. |
| 6,118,449 A * | 9/2000 | Rosen et al. .................. 715/861 |
| 6,128,009 A | 10/2000 | Ohkura et al. |
| 6,130,898 A | 10/2000 | Kostreski et al. |
| 6,131,161 A | 10/2000 | Linnartz |
| 6,141,003 A | 10/2000 | Chor et al. |
| 6,141,385 A | 10/2000 | Yamaji |
| 6,141,448 A | 10/2000 | Khansari et al. |
| 6,147,714 A | 11/2000 | Terasawa et al. |
| 6,151,059 A | 11/2000 | Schein et al. |
| 6,154,203 A * | 11/2000 | Yuen et al. ...................... 725/52 |
| 6,157,673 A | 12/2000 | Cuccia |
| 6,160,545 A | 12/2000 | Eyer et al. |
| 6,160,546 A | 12/2000 | Thompson et al. |
| 6,163,316 A | 12/2000 | Killian |
| 6,163,345 A | 12/2000 | Noguchi et al. |
| 6,167,188 A | 12/2000 | Young et al. |
| 6,169,843 B1 | 1/2001 | Lenihan et al. |
| 6,172,674 B1 | 1/2001 | Etheredge |
| 6,172,677 B1 | 1/2001 | Stautner et al. |
| 6,172,687 B1 | 1/2001 | Kitamura et al. |
| 6,173,330 B1 | 1/2001 | Guo et al. |
| 6,177,930 B1 | 1/2001 | Chernock et al. |
| 6,177,931 B1 | 1/2001 | Alexander et al. |
| 6,182,287 B1 | 1/2001 | Schneidewend et al. |
| 6,188,725 B1 | 2/2001 | Sugiyama |
| 6,191,782 B1 | 2/2001 | Mori et al. |
| 6,198,478 B1 | 3/2001 | Ota et al. |
| 6,201,536 B1 | 3/2001 | Hendricks et al. |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,212,680 B1 | 4/2001 | Tsinberg et al. |
| 6,212,860 B1 | 4/2001 | Preisner et al. |
| 6,222,531 B1 | 4/2001 | Smith |
| 6,230,322 B1 | 5/2001 | Saib et al. |
| 6,230,324 B1 | 5/2001 | Tomita et al. |
| 6,236,804 B1 | 5/2001 | Tozaki et al. |
| 6,239,794 B1 | 5/2001 | Yuen et al. |
| 6,240,555 B1 | 5/2001 | Shoff et al. |
| 6,243,142 B1 | 6/2001 | Mugura et al. |
| 6,256,785 B1 | 7/2001 | Klappert et al. |
| 6,259,487 B1 | 7/2001 | Bril |
| 6,260,192 B1 | 7/2001 | Rosin et al. |
| 6,262,722 B1 | 7/2001 | Allison et al. |
| 6,263,501 B1 | 7/2001 | Schein et al. |
| 6,268,849 B1 | 7/2001 | Boyer et al. |
| 6,288,738 B1 | 9/2001 | Dureau et al. |
| 6,298,482 B1 | 10/2001 | Seidman et al. |
| 6,305,016 B1 | 10/2001 | Marshall et al. |
| 6,357,043 B1 | 3/2002 | Ellis et al. |
| 6,357,046 B1 | 3/2002 | Thompson et al. |
| 6,359,910 B1 | 3/2002 | Takahashi |
| 6,385,771 B1 | 5/2002 | Gordon |
| 6,388,714 B1 | 5/2002 | Schein et al. |
| 6,389,477 B1 | 5/2002 | Simmon et al. |
| 6,401,242 B1 | 6/2002 | Eyer et al. |
| 6,404,818 B1 | 6/2002 | Obikane |
| 6,405,371 B1 | 6/2002 | Oosterhout et al. |
| 6,414,970 B1 | 7/2002 | Negishi et al. |
| 6,415,437 B1 | 7/2002 | Ludvig et al. |
| 6,421,067 B1 | 7/2002 | Kamen et al. |
| 6,421,359 B1 | 7/2002 | Bennett et al. |
| 6,425,133 B1 | 7/2002 | Leary |
| 6,426,779 B1 | 7/2002 | Noguchi et al. |
| 6,442,755 B1 | 8/2002 | Lemmons et al. |
| 6,449,654 B1 | 9/2002 | Blackwell et al. |
| 6,453,471 B1 | 9/2002 | Klosterman |
| 6,456,782 B1 | 9/2002 | Kubota et al. |
| 6,457,010 B1 | 9/2002 | Eldering et al. |
| 6,459,427 B1 | 10/2002 | Mao et al. |
| 6,460,018 B1 | 10/2002 | Kasai et al. |
| 6,460,181 B1 | 10/2002 | Donnelly |
| 6,463,586 B1 | 10/2002 | Jerding |

(56) References Cited

U.S. PATENT DOCUMENTS

| | | |
|---|---|---|
| 6,469,753 B1 | 10/2002 | Klosterman et al. |
| 6,470,460 B1 | 10/2002 | Kashiwagi et al. |
| 6,473,425 B1 | 10/2002 | Bellaton et al. |
| 6,473,804 B1 | 10/2002 | Kaiser et al. |
| 6,477,705 B1 | 11/2002 | Yuen et al. |
| 6,481,010 B2 | 11/2002 | Nishikawa et al. |
| 6,481,011 B1 | 11/2002 | Lemmons |
| 6,481,012 B1 | 11/2002 | Gordon et al. |
| 6,487,722 B1 | 11/2002 | Okura et al. |
| 6,490,728 B1 | 12/2002 | Kitazato et al. |
| 6,510,152 B1 | 1/2003 | Gerszberg et al. |
| 6,510,555 B1 | 1/2003 | Tsurumoto |
| 6,515,680 B1 | 2/2003 | Hendricks et al. |
| 6,518,986 B1 | 2/2003 | Mugura |
| 6,519,009 B1 | 2/2003 | Hanaya et al. |
| 6,526,577 B1 | 2/2003 | Knudson et al. |
| 6,530,082 B1 | 3/2003 | Del Sesto et al. |
| 6,532,590 B1 | 3/2003 | Chimoto |
| 6,542,518 B1 | 4/2003 | Miyazawa |
| 6,567,106 B1 | 5/2003 | Wugofski |
| 6,573,942 B1 | 6/2003 | Crinon |
| 6,577,350 B1 | 6/2003 | Proehl et al. |
| 6,578,201 B1 | 6/2003 | LaRocca et al. |
| 6,580,441 B2 | 6/2003 | Schileru-Key |
| 6,584,125 B1 | 6/2003 | Katto |
| 6,584,153 B1 | 6/2003 | Gordon et al. |
| 6,588,014 B1 | 7/2003 | Hayashi |
| 6,594,271 B1 | 7/2003 | Wu et al. |
| 6,606,746 B1 | 8/2003 | Zdepski et al. |
| 6,621,870 B1 | 9/2003 | Gordon et al. |
| 6,625,810 B1 | 9/2003 | Murphy et al. |
| 6,637,029 B1 | 10/2003 | Maissel et al. |
| 6,651,252 B1 | 11/2003 | Gordon et al. |
| 6,671,882 B1 | 12/2003 | Murphy et al. |
| 6,675,385 B1 | 1/2004 | Wang |
| 6,675,387 B1 | 1/2004 | Boucher et al. |
| 6,681,395 B1 | 1/2004 | Nishi |
| 6,704,028 B2 | 3/2004 | Wugofski |
| 6,704,359 B1 | 3/2004 | Bayrakeri et al. |
| 6,727,886 B1 | 4/2004 | Mielekamp et al. |
| 6,741,617 B2 | 5/2004 | Rosengren et al. |
| 6,754,905 B2 * | 6/2004 | Gordon ............ H04N 5/44543 348/384.1 |
| 6,763,522 B1 | 7/2004 | Kondo et al. |
| 6,782,132 B1 | 8/2004 | Fogg |
| 6,791,561 B1 | 9/2004 | Dawson |
| 6,807,528 B1 | 10/2004 | Truman et al. |
| 6,828,993 B1 | 12/2004 | Hendricks et al. |
| 6,874,129 B2 | 3/2005 | Smith |
| 6,954,897 B1 | 10/2005 | Noguchi et al. |
| 6,968,567 B1 | 11/2005 | Gordon et al. |
| 6,999,476 B2 | 2/2006 | Lerman et al. |
| 7,031,348 B1 | 4/2006 | Gazit |
| 7,062,777 B2 | 6/2006 | Alba et al. |
| 7,065,709 B2 | 6/2006 | Ellis et al. |
| 7,096,484 B2 | 8/2006 | Mao et al. |
| 7,100,185 B2 | 8/2006 | Bennington et al. |
| 7,110,006 B2 | 9/2006 | MacInnis et al. |
| 7,117,440 B2 | 10/2006 | Gordon et al. |
| 7,134,133 B1 | 11/2006 | Wugofski |
| 7,137,135 B2 | 11/2006 | Schein et al. |
| 7,143,428 B1 | 11/2006 | Bruck et al. |
| 7,150,029 B1 | 12/2006 | Ebling et al. |
| 7,174,084 B2 | 2/2007 | Edmonds et al. |
| 7,178,158 B2 | 2/2007 | Nishina et al. |
| 7,194,032 B1 | 3/2007 | Easwar et al. |
| 7,343,614 B1 | 3/2008 | Hendricks et al. |
| 7,359,439 B1 | 4/2008 | Conover |
| 7,363,645 B1 | 4/2008 | Hendricks |
| 7,370,342 B2 | 5/2008 | Ismail et al. |
| 7,404,200 B1 | 7/2008 | Hailey et al. |
| 7,503,003 B2 | 3/2009 | Kamen et al. |
| 7,685,619 B1 | 3/2010 | Herz |
| 7,836,467 B2 | 11/2010 | Gordon et al. |
| 7,838,467 B2 | 11/2010 | Jones et al. |
| 8,032,906 B2 | 10/2011 | Gordon et al. |
| 8,060,905 B1 | 11/2011 | Hendricks |
| 8,739,218 B2 * | 5/2014 | Gordon ............ H04N 5/44543 715/768 |
| 2001/0005447 A1 | 6/2001 | Kawamura et al. |
| 2001/0010095 A1 | 7/2001 | Ellis et al. |
| 2001/0012022 A1 | 8/2001 | Smith |
| 2001/0056577 A1 | 12/2001 | Gordon et al. |
| 2002/0007493 A1 | 1/2002 | Butler et al. |
| 2002/0012353 A1 | 1/2002 | Gerszberg et al. |
| 2002/0026496 A1 | 2/2002 | Boyer et al. |
| 2002/0032907 A1 | 3/2002 | Daniels |
| 2002/0035728 A1 | 3/2002 | Fries |
| 2002/0049971 A1 | 4/2002 | Augenbraun et al. |
| 2002/0066102 A1 | 5/2002 | Chapman et al. |
| 2002/0066103 A1 | 5/2002 | Gagnon et al. |
| 2002/0120933 A1 | 8/2002 | Knudson et al. |
| 2002/0133565 A1 | 9/2002 | Huat |
| 2003/0020744 A1 | 1/2003 | Ellis et al. |
| 2003/0034982 A1 | 2/2003 | Talayssat et al. |
| 2003/0035007 A1 | 2/2003 | Wugofski |
| 2003/0052905 A1 | 3/2003 | Gordon et al. |
| 2003/0056216 A1 | 3/2003 | Wugofski et al. |
| 2003/0066085 A1 | 4/2003 | Boyer et al. |
| 2003/0083533 A1 | 5/2003 | Gerba et al. |
| 2003/0083936 A1 | 5/2003 | Mueller et al. |
| 2003/0091339 A1 | 5/2003 | Isozaki |
| 2003/0115603 A1 | 6/2003 | Lemmons et al. |
| 2003/0149988 A1 | 8/2003 | Ellis et al. |
| 2003/0193619 A1 | 10/2003 | Farrand |
| 2003/0200544 A1 | 10/2003 | Ellis et al. |
| 2003/0209599 A1 | 11/2003 | Gatto |
| 2004/0078824 A1 | 4/2004 | Krisbergh et al. |
| 2004/0107439 A1 | 6/2004 | Hassell et al. |
| 2004/0117831 A1 | 6/2004 | Ellis et al. |
| 2004/0128686 A1 | 7/2004 | Boyer et al. |
| 2004/0148636 A1 * | 7/2004 | Weinstein ........ H04N 5/44513 725/113 |
| 2004/0261105 A1 | 12/2004 | Marshall et al. |
| 2005/0028208 A1 | 2/2005 | Ellis et al. |
| 2005/0226417 A1 | 10/2005 | Kubota et al. |
| 2005/0278741 A1 | 12/2005 | Robarts et al. |
| 2006/0277581 A1 | 12/2006 | Eliyahu et al. |
| 2006/0282852 A1 | 12/2006 | Purpura et al. |
| 2007/0011702 A1 | 1/2007 | Vaysman |
| 2007/0089135 A1 | 4/2007 | Qureshey et al. |
| 2007/0157247 A1 | 7/2007 | Cordray et al. |
| 2008/0066103 A1 | 3/2008 | Ellis et al. |
| 2008/0115164 A1 | 5/2008 | Kiiskinen |
| 2009/0028153 A1 | 1/2009 | Koster et al. |
| 2010/0333004 A1 | 12/2010 | Kristiansen et al. |
| 2011/0209173 A1 | 8/2011 | Vaysman et al. |
| 2011/0314499 A1 * | 12/2011 | Alba et al. .................. 725/40 |
| 2013/0081081 A1 | 3/2013 | Wang |
| 2013/0152129 A1 | 6/2013 | Alberth et al. |
| 2013/0174201 A1 | 7/2013 | Tam |
| 2014/0208356 A1 | 7/2014 | McCarthy et al. |
| 2016/0353177 A1 | 12/2016 | Gordon et al. |

FOREIGN PATENT DOCUMENTS

| | | |
|---|---|---|
| CA | 2775625 | 4/2012 |
| EP | 0721253 A2 | 7/1996 |
| EP | 0725539 A2 | 8/1996 |
| EP | 0758833 A2 | 2/1997 |
| EP | 0/838958 A1 | 4/1998 |
| EP | 0921682 A2 | 6/1999 |
| EP | 0946060 A1 | 9/1999 |
| EP | 0966164 A2 | 12/1999 |
| EP | 07016891 | 10/2000 |
| EP | 01905040 | 1/2001 |
| EP | 99934182 | 2/2001 |
| EP | 99937298 | 2/2001 |
| EP | 99937446 | 2/2001 |
| EP | 01905040 A1 | 4/2008 |
| GB | 0124726.1 A | 9/1971 |
| GB | 2364195 A | 1/2002 |
| JP | 9-284739 A | 10/1997 |
| JP | 10-191273 A | 7/1998 |

(56) References Cited

FOREIGN PATENT DOCUMENTS

| | | | |
|---|---|---|---|
| JP | 11-163817 A | 6/1999 | |
| JP | 2000-561774 | 1/2001 | |
| JP | H08506939 | 5/2001 | |
| JP | 2001-519625 A | 10/2001 | |
| JP | 2010-254186 | 11/2010 | |
| WO | 94/14280 A1 | 6/1994 | |
| WO | 9414282 A1 | 6/1994 | |
| WO | 94/30008 A1 | 12/1994 | |
| WO | 96/37059 A1 | 11/1996 | |
| WO | 9713368 A1 | 4/1997 | |
| WO | 9746007 A1 | 12/1997 | |
| WO | 9831116 A2 | 7/1998 | |
| WO | 98/47825 A1 | 10/1998 | |
| WO | 9853611 A1 | 11/1998 | |
| WO | 99/04561 A1 | 1/1999 | |
| WO | 0005890 A1 | 2/2000 | |
| WO | 0005892 A1 | 2/2000 | |
| WO | 0040013 A1 | 7/2000 | |
| WO | 0064164 A1 | 10/2000 | |
| WO | 0064169 A1 | 10/2000 | |
| WO | 0156290 A1 | 8/2001 | |

OTHER PUBLICATIONS

Office Action in Canadian patent application No. 2680673. dated Oct. 7, 2010.
Office Action in Canadian patent application No. 2680673. dated May 24, 2011.
Office Action in European Patent Application No. 07007019.8, dated Oct. 21, 2011.
Rule 69 EPC Communication in European Patent Application No. 07016891.9, dated Aug. 9, 2010.
Search Report and Written Opinion in European Patent Application No. 07016891.9-2202, dated Jul. 5, 2010.
Search Report in European Patent Application No. 07007019.8, dated Feb. 11, 2011.
Freier, Alan 0. et al., "The SSL Protocol Version 3.0," Mar. 1996, pp. 1-52, Netscape.
Kaliski. Burton S .. "A Layman's Guide to a Subset of ASN.1, BER and DER," Nov. 1, 1993, pp. 1-38, RSA Laboratories.
Malpani, AM Barish et al., "Simple Certificate Validation Protocol (SCVP)," Jul. 2001, pp. 1-23.
PKCS #7: Cryptographic Message Syntax Standard, Nov. 1993, pp. 1-29, RSA Laboratories.
Office Action in European Application No. 07016891.9-2202, dated Apr. 21, 2010.
International Search Report PCT/US99/15522, Oct. 15, 1999.
International Search Report PCT/US00/10187, Jul. 11, 2000.
International Search Report PCT/US01/02440, Aug. 2, 2001.
International Search Report PCT/US97/22850, Oct. 22, 1998.
International Search Report PCT/US99/16265, Feb. 3, 2000.
International Search Report PCT/US99/16786, Oct. 18, 1999.
International Search Report PCT/US99/16764, Oct. 18, 1999.
International Search Report PCT/US00/10059, Jul. 6, 2000.
International Preliminary Examination Report PCT/US00/10059, Sep. 30, 2001.
International Search Report PCT/US00/29806, Jan. 19, 2001.
International Preliminary Examination Report PCT/US00/29806, Nov. 18, 2001.
International Search Report PCT/US00/29805, Jan. 22, 2001.
International Preliminary Examination Report PCT/US00/29805, Nov. 13, 2001.
International Preliminary Examination Report PCT/US00/10188, May 15, 2001.
International Preliminary Examination Report PCT/US99/16786, Dec. 18, 2000.
International Search Report PCT/US00/10188, Jun. 15, 2000.
British Search and Examination Search report—GB 0124726.1—Aug. 8, 2003.
International Preliminary Examination Report PCT/US01/02440, Apr. 15, 2003.
European Search Report EP01963811, Sep. 22, 2005.
Supplementary European Search Report EP01905040, Feb. 21, 2006.
International Preliminary Examination Report—PCT/US99/15522—Feb. 17, 2000.

\* cited by examiner

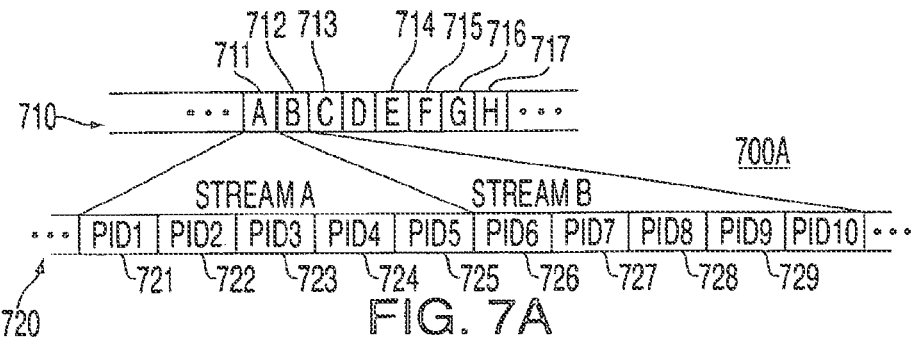

FIG. 7A

FIG. 7B — STREAM GANGING

| STREAM | PID# | CONTAINS | BITRATE |
|---|---|---|---|
| A | 1 | CH1-CH8 | 1.05MBPS |
| A | 2 | CH9-CH16 | " |
| A | 3 | CH17-CH24 | " |
| A | 4 | AUDIO | 192KBPS |
| A | 5 | DATA CH1-CH24 | LOW |
| B | 6 | CH25-CH32 | 1.05MBPS |
| B | 7 | CH33-CH40 | " |
| B | 8 | CH41-CH48 | " |
| B | 9 | AUDIO | 192KBPS |
| B | 10 | DATA CH25-CH48 | LOW |

700B

FIG. 7C — OVERLAPED GANGING

| STREAM | PID# | CONTAINS | BITRATE |
|---|---|---|---|
| A | 1 | CH(N-7)-CHN | 1.05MBPS |
| A | 2 | CH1-CH8 | " |
| A | 3 | CH9-CH16 | " |
| A | 4 | AUDIO | 192KBPS |
| A | 5 | DATA CH(N-7)-CH16 | LOW |
| B | 6 | CH9-CH16 | 1.05MBPS |
| B | 7 | CH17-CH24 | " |
| B | 8 | CH25-CH32 | " |
| B | 9 | AUDIO | 192KBPS |
| B | 10 | DATA CH25-CH48 | LOW |
| C | 11 | CH25-CH32 | |
| C | 12 | CH33-CH40 | 1.05 MBPS |
| C | 13 | CH41-CH48 | " |

| STREAM | PID# | CONTAINS | BITRATE |
|---|---|---|---|
| A | 1 | CH1-CH8 | |
| A | 2 | AUDIO | |
| A | 3 | DATA | |
| B | 4 | CH9-CH16 | |
| B | 5 | AUDIO | |
| B | 6 | DATA | |

| STREAM | PID# | CONTAINS | BITRATE |
|---|---|---|---|
| A | 1 | CH1-CH8 | |
| A | 2 | CH9-CH16 | |
| A | 3 | DATA | |
| ⋮ | ⋮ | ⋮ | |
| A | N | CH(N-7)-CHN | |
| A | N+1 | AUDIO | |
| A | N+2 | DATA | |

700E

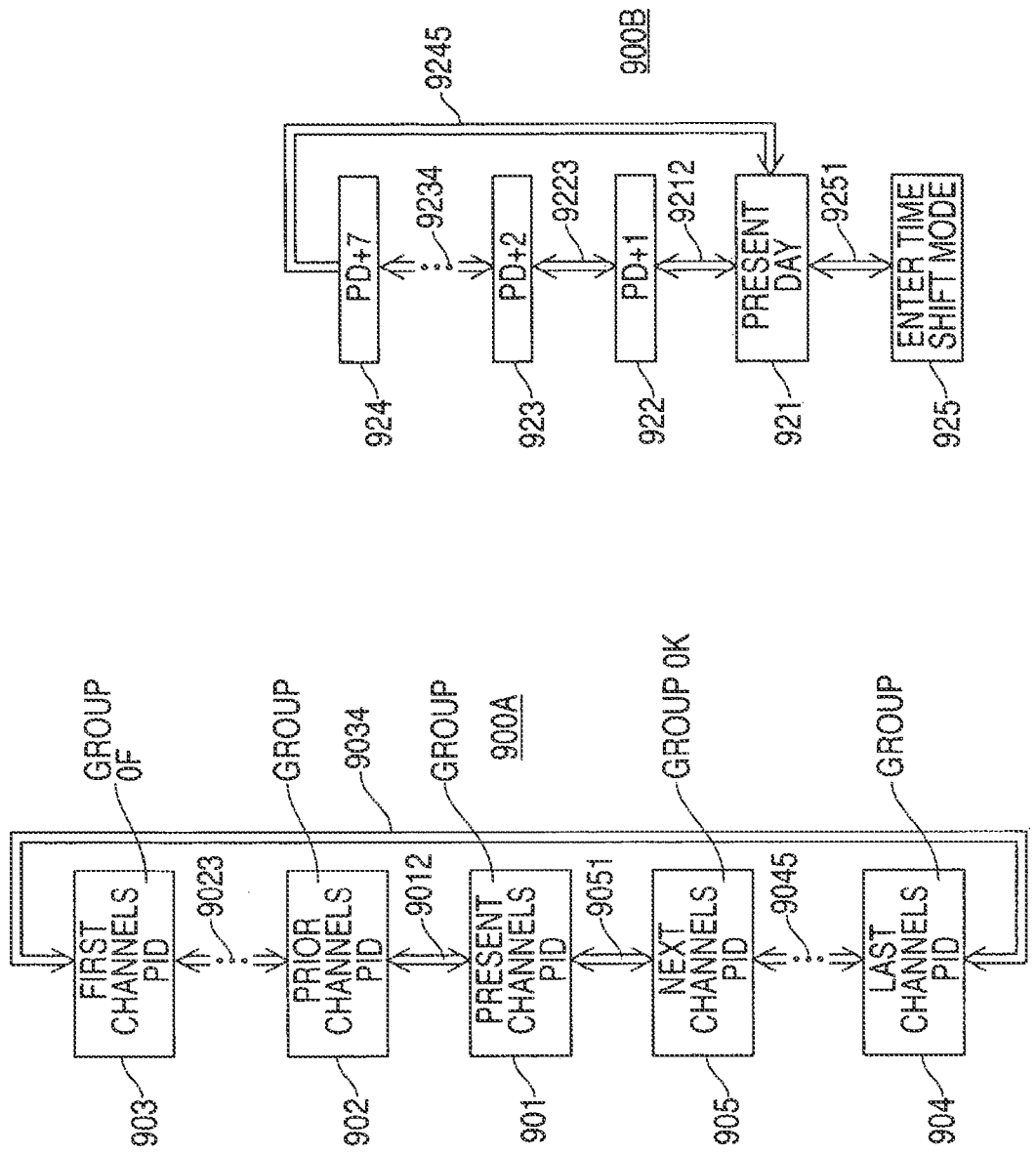

| KEY | GUIDE REGION ACTION | IMAGE REGION ACTION |
|---|---|---|
| ↑ (INC) | INDICATE NEXT CHANNEL OR LAST CHANNEL OF PRIOR CHANNEL PID | VIEW NEXT TIME SLOTS POSSIBLY ENTER POINTCAST MODE |
| ↓ (DEC) | INDICATE PRIOR CHANNEL OR FIRST CHANNEL OF NEXT CHANNEL PID | VIEW PRIOR TIME SLOTS OR ENTER TIME SHIFT MODE |
| ⇑ (PAGE UP) | INDICATE CHANNEL IN PRIOR CHANNEL PID (CORRESPONDING, FIRST, LAST OR DEFAULT) | VIEW NEXT DAY POSSIBLY ENTER TIME SHIFT MODE |
| ⇓ (PAGE DN) | INDICATE CHANNEL IN NEXT CHANNEL PID (CORRESPONDING, FIRST, LAST OR DEFAULT) | VIEW PRIOR DAY POSSIBLY ENTER TIME SHIFT MODE |
| → MOVE RIGHT | EMPHASIZE NEXT TIME SLOT OR FIRST IMAGE REGION OBJECT | SELECT NEXT OBJECT |
| ← MOVE LEFT | EMPHASIZE PRIOR TIME SLOT OR LAST IMAGE REGION OBJECT | SELECT PRIOR OBJECT |
| SELECT | TUNE PRESENTLY INDICATED CHANNEL | SELECT HIGHLIGHTED OBJECT OR ENTER NEW OPERATING MODE |
| ADD/REMOVE | ADD/REMOVE INDICATED TITLE IN HIGHLIGHTED TIME SLOT TO FAVORITES | N/A |

FIG. 10

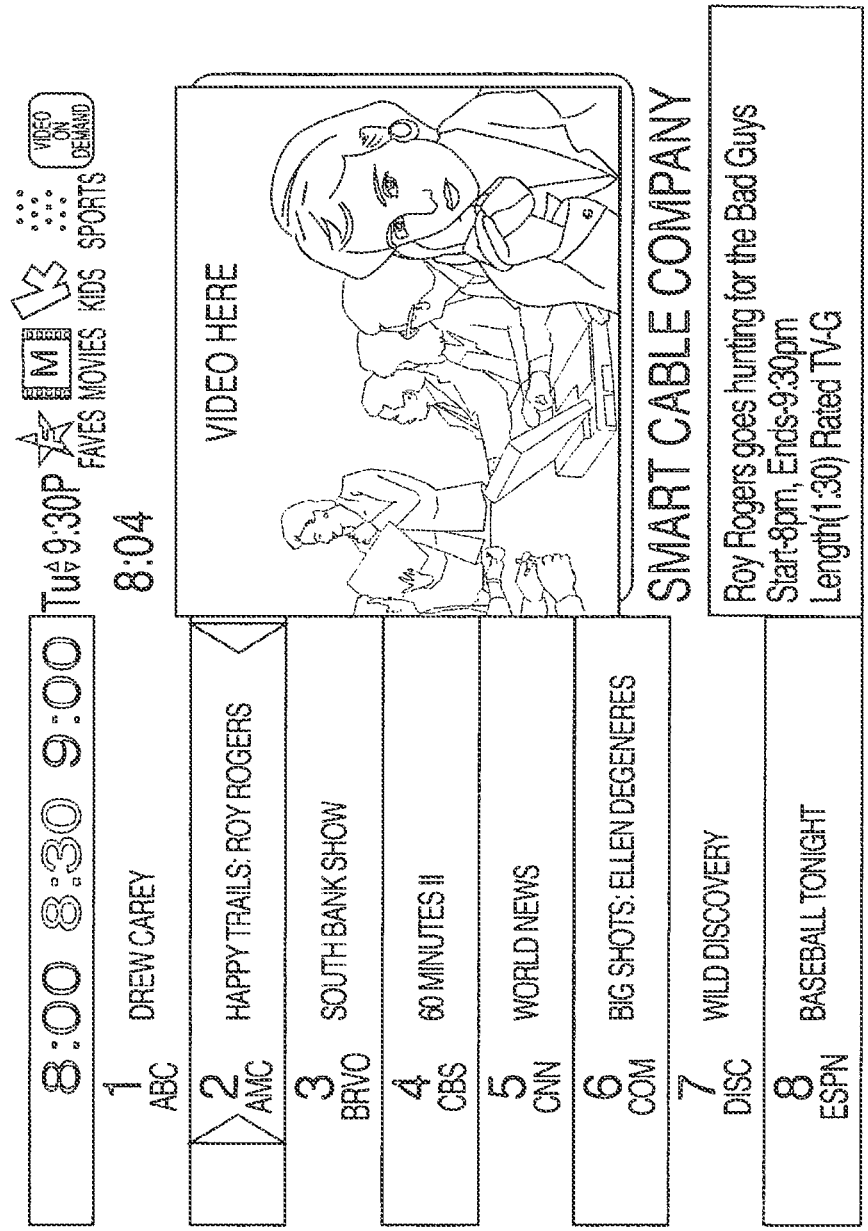

FIG. 15 | 15A / 15B

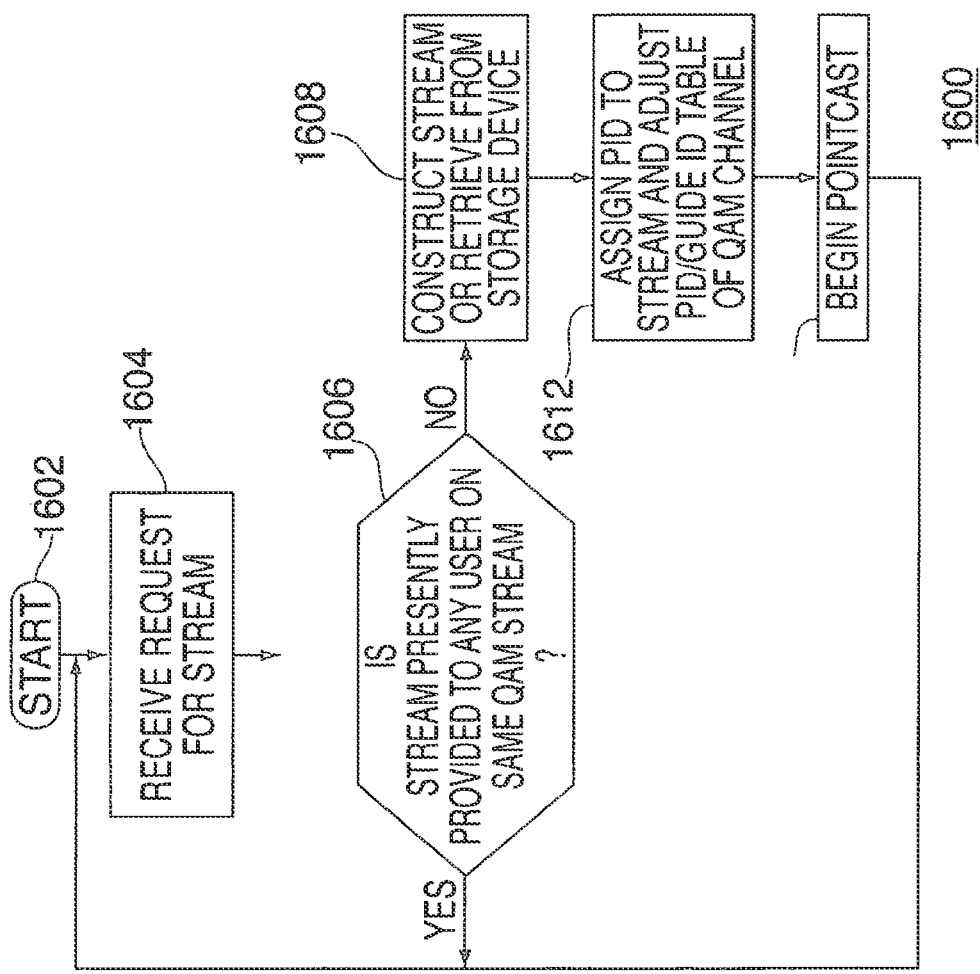

DATA STRUCTURE AND METHODS FOR PROVIDING AN INTERACTIVE PROGRAM GUIDE

CROSS REFERENCE TO RELATED APPLICATIONS

This application is a continuation of U.S. patent application Ser. No. 10/694,658 filed Oct. 28, 2003, which is a continuation of U.S. patent application Ser. No. 09/293,526, filed on Apr. 15, 1999 (now U.S. Pat. No. 6,754,905, issued Jun. 22, 2004), which application claims benefit of U.S. Provisional patent application Ser. No. 60/093,891 filed Jul. 23, 1998. All of the above priority applications are hereby incorporated by reference in their entireties.

This application is related to contemporaneously filed U.S. patent application Ser. No. 09/293,535, filed Apr. 15, 1999 (now U.S. Pat. No. 6,584,153), which is incorporated herein by reference in its entirety.

BACKGROUND OF THE DISCLOSURE

The invention relates to communications systems in general and, more specifically, the invention relates to an interactive electronic program guide suitable for use in an interactive video information delivery system.

In several communications systems the data to be transmitted is compressed so that the available bandwidth is used more efficiently. For example, the Moving Pictures Experts Group (MPEG) has promulgated several standards relating to digital data delivery systems. The first, known as MPEG-1, refers to the ISO/IEC standards 11172 and is incorporated herein by reference. The second, known as MPEG-2, refers to the ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Over the past few years, television has seen a transformation in the variety of means by which its programming is distributed to consumers. Cable television systems are doubling or even tripling system bandwidth by migrating to hybrid fiber coaxial (HFC) cable as an information delivery medium. Many consumers have turned to direct broadcast satellite (DRS) systems to receive higher quality (with respect to NTSC) video imagery. Other video information delivery approaches using high bandwidth digital technologies, intelligent two way set top boxes and other methods are used by information providers to offer services that are differentiated from standard cable and over the air broadcast systems.

With this increase in bandwidth, the number of programming choices has also increased. Leveraging off the availability of more intelligent set top boxes, several companies such as Starsight® and Prevue™ Guide have developed elaborate systems for providing an interactive listing of the vast array of channel offerings, expanded textual information about individual programs, the ability to look forward to plan television viewing as much as several weeks in advance, and the option of automatically programming a VCR to record a future broadcast of a television program.

An interactive digital video on demand (VOD) service known as the DIVA system is manufactured by DIVA Systems Corporation of Menlo Park, Calif. The DIVA system distributes audio-visual information to individual subscribers utilizing MPEG-like information streams. DIVA subscribers utilize intelligent set top terminals (STT).

Unfortunately, the existing program guides have several drawbacks. They tend to require a lot of memory, some of them needing upwards of one megabyte of set top terminal memory. They are typically very slow to acquire their current database when they are turned on for the first time or are subsequently restarted (e.g., a large database may be downloaded to a set top terminal using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider. Additionally, the user interface to existing program guides does not usually look like a typical television control interface; rather the user interface looks like a 1980s style computer display (i.e., blocky, ill-formed text and/or graphics).

Therefore, it is seen to be desirable to provide a method and apparatus for providing the functionality of electronic program guide in a manner tending to reduce the above-described problems.

SUMMARY OF THE INVENTION

The invention provides an interactive electronic program guide that isolates an interaction model at the set-top box level, where no context is associated with any user interaction, and where merely the manipulation of audio and visual elements representing, applying, removing and shifting emphasis from one area or another. All items containing contextual information reside in a centralized location where they will be processed and the management of network resources executed in a manner to enable the request context-based service request or transition.

The invention works by combining the use of broadcast digital video streams with video-on-demand streams to produce a compelling audiovisual user interface. The invention uses an intelligent set top boxes ability to manipulate a graphics overlay plane displayed in conjunction with a video image on an intelligent analog or digital set top box. The system allows the interactions to carry the user from broadcast (or narrowcast) video stream to broadcast (or narrowcast) video stream, from broadcast (or narrowcast) video stream to pointcast video stream, and from pointcast video stream to broadcast (or narrowcast) video stream.

Guide and image regions of the IEPG displays are provided within video streams broadcast, narrowcast or pointcast video streams provided by the head end. That is, the program guide information is assembled at the head end and provided as video information to the STTs within the system. Manipulation of video layer objects is accomplished by proxy manipulations of graphic layer objects. The STT provides (beyond tuning, demultiplexing, decoding and such operations) the ability to highlight or emphasize object and select a highlighted or emphasized object. The graphic information manipulated by the STT is received via a data stream (i.e., a data PID), auxiliary data, private data and the like. Advantageously, since there is no local storage of an entire program guide database, memory resources of the STT are conserved. Rather, information sufficient to e.g., describe a highlighted program title is included within the aforementioned data stream, which may be contemporaneously transmitted to the STT along with the video stream including the channel group/time slots including the program title.

A program guide according to one embodiment of the invention comprises: a video layer comprising a plurality of video objects including title objects, each title object having associated with it a channel and at least one time slot, the video layer being formed in response to a received video stream; and a graphics layer comprising a plurality of graphics objects including title overlay objects, each of the title overlay objects selectively imparting at least a visual de-emphasis to a respective title object in the video layer, the visual de-emphasis being imparted to title objects not being associated with a desired time slot.

In another embodiments of the invention, the opacity level of the title overlay object is increased to impart the visual de-emphasis to a respective title object. Optionally, the title objects subjected to de-emphasis are substantially hidden.

In another embodiments of the invention a color of the title overlay object is adapted to impart the visual de-emphasis to a respective title object.

BRIEF DESCRIPTION OF THE DRAWINGS

The teachings of the present invention can be readily understood by considering the following detailed description in conjunction with the accompanying drawings, in which:

FIG. 7A depicts a diagrammatic representation of a multiple program transport stream suitable for use in the interactive information distribution system of FIG. 4;

FIGS. 7B through 7E depict respective tabular representations of exemplary utilizations of a single program transport stream providing program guide information and suitable for use in the multiple program transport stream of FIG. 7A.

FIGS. 8A, 8B, 8C, 9A and 9B depict respective a contextual flow diagrams useful in understanding the invention;

FIG. 10 depicts a tabular representation of the functions of various keys during guide region and image region operation;

FIGS. 11A-11C, 12A-12C, 13 and 14 depict respective display screens of an interactive electronic program guide (IEPG) displays useful in understanding the invention;

FIG. 16 depicts a flow diagram of a head end stream request processing method.

To facilitate understanding, identical reference numerals have been used, where possible, to designate identical elements that are common within the figure.

DESCRIPTION OF THE EMBODIMENT

The invention will be described within the context of an interactive information distribution system, illustratively the DIVA interactive digital video on demand (VOD) system. However, it will be readily apparent to those skilled in the art that the teachings of the present invention may be advantageously utilized in other interactive video information distribution systems.

Figure 1:
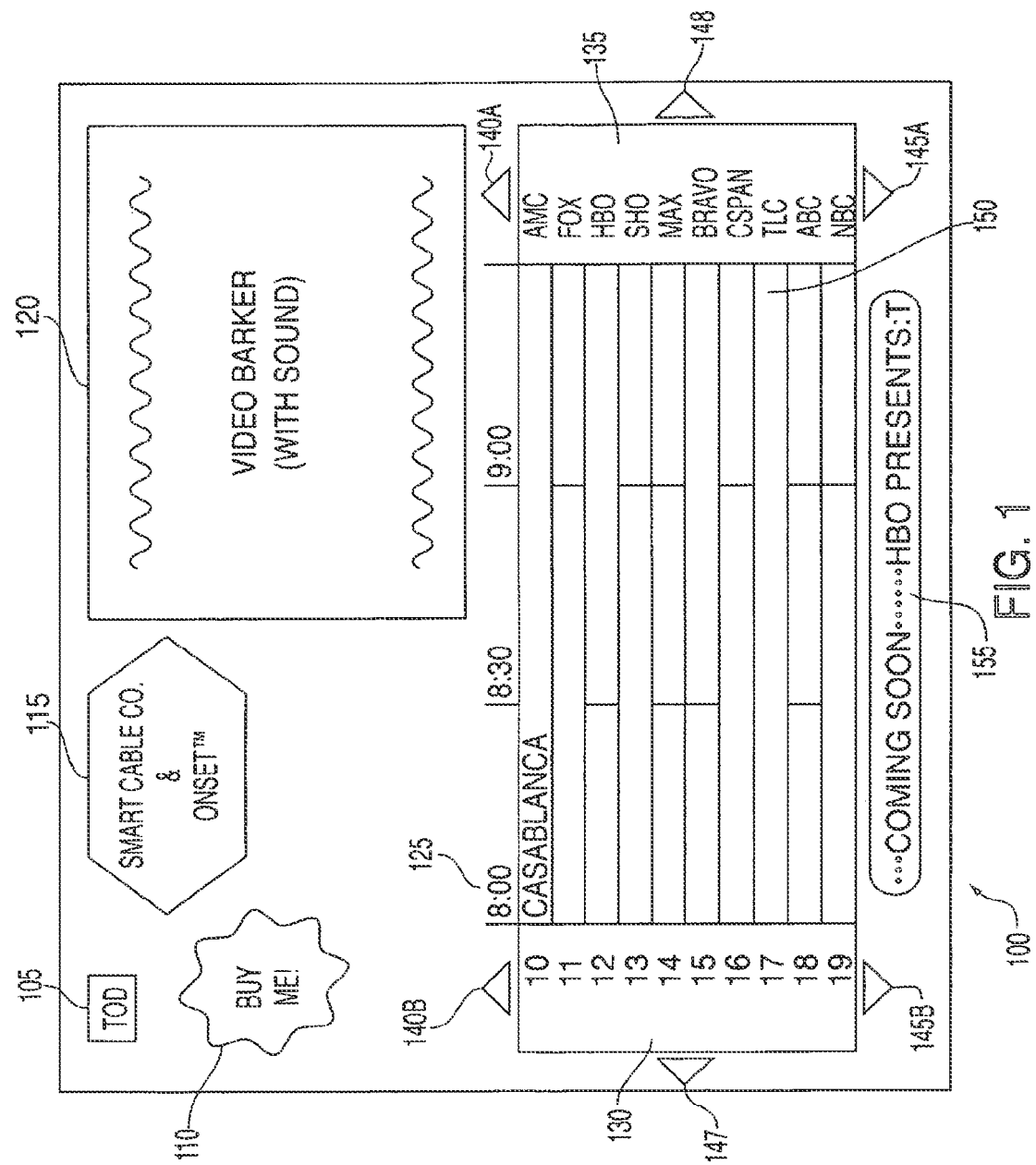
FIG. 1 depicts a display screen of an interactive electronic program guide (IEPG)

FIG. 1 depicts a display screen 100 of an interactive electronic program guide (IEPG) according to the invention. Specifically, the exemplary interactive program guide screen 100 comprises a time of day/date (DOT) indicator 105, a promotional "splash" object 110, a cable system or provider logo 115, a video barker 120 (and associated audio barker), a program time indicator 125, a channel number indicator 130, a channel identifier (text or logo) 135, a pair of channel display decrement objects 140a and 140b, a pair of channel display increment objects 145a and 145b, a temporal increment object 148, a temporal decrement object 147, a program grid 150 and a scrolling promotional banner 155. The interactive program guide display 100 is displayed on a television screen or other video presentation device in, e.g., the home of a subscriber to a cable television or other information distribution system utilizing the interactive electronic program guide. Subscriber side equipment suitable for receiving and displaying is described in detail in FIG. 2.

Referring to FIG. 1, the interactive program guide display 100 is comprised of a video layer and a graphics layer. That is, the IEPG display 100 is primarily formed at a central or head end location in, for example, a cable television system. Video information representative of each of the objects or elements previously described (105-155) is generated at the cable central processing location or a head end, and transmitted as part of a video stream. Thus, the actual display parameters (i.e., the size, shape, color, position and other visual parameters) associated with each object are entirely controlled at a central location.

Those on screen objects which may be modified by the subscriber are selected by, e.g., a remote control device cooperating with the set top terminal, which causes the locally stored and/or locally generated graphical overlay objects to be manipulated in a manner identifying the objects on the screen produced at the head end. That is, each manipulable object or element is associated with a corresponding graphical overlay element (e.g., an x-y coordinate box or other element). The overlay element has selectively emphasized or de-emphasized (e.g., selectively shading, highlighting coloring and the like) via manipulation of the remote control unit.

Upon receiving a "select" entry from the remote control unit, the set top terminal transmits, via a back channel, the information that identifies the selected object to the head end. It is important to note that changing the emphasis of an object or element is performed entirely at the local level. That is, there is no change in the actual video information transmitted by the head end to the subscriber. Only the graphical overlay layer on the display is changed.

The user interaction manipulations are those manipulations that are intended by the user to change a particular emphasis, or overlay highlighting, or overlay position on the screen. By contrast, other manipulations may be intended to change video information displayed on the screen such as the position (temporal or channel) of the program grid, selection of a promotional object and the like.

The interactive program guide display 100 (i.e., the video layer provided by the head end) depicts a program offering of 10 channels within a 1.5 hour time interval. Since there are 24 hours in a day, 16 video streams are required to depict 24 hours of program offerings of 10 channels. These 16 video streams may be included within a single transport stream. Thus, a user desiring to view the next 1½ hour time interval (e.g., 9:30-11:00) may activate a "scroll right" object (or move the joystick to the right when a program within program grid 150 occupies the final displayed time interval). Such activation will result in the controller of the STT noting that a new time interval is desired. The video stream corresponding to the new time interval will then be decoded and displayed. If the corresponding video stream is within the same transport stream (i.e., a new PID), then the stream will be immediately decoded and presented. If the corresponding video stream is within a different transport stream, then the different transport stream will be extracted from the broadcast stream and the appropriate video stream will be decoded and presented. If the different broadcast stream is within a different broadcast stream, then the different broadcast stream will be tuned, the different transport stream will be extracted from the different broadcast stream and the appropriate video stream will be decoded and presented.

Similarly, a user interaction resulting in a prior time interval or a different set of channels (i.e., a group of channels) will result in the retrieval and presentation of an appropriate video stream. It is important to note that each extracted video stream is associated with a common audio stream. Thus, the video/audio barker function of the program guide is continuously provided, regardless of the selected video stream.

The above described user manipulations, and the resulting change in presented video streams, are all within the same "context" of the program guide. That is, the context of the program guide (i.e., the contextual model) described thus far is the "program guide" context in which user manipulations to the guide are used to modify the attributes of the program grid. In the event of a user selection of a highlighted or emphasized program within the program grid, the context changes to a "program selected" context, in which the video and audio information streams associated with a selected channel are retrieved and presented to the user. The selection information is coupled to the head end via the back channel. The head end then couples the appropriate streams to the user, if they are not already being received by the user. In the program selection context, the user may have selected a broadcast stream (i.e., a network feed), a narrowcast stream (a regional or local information feed, such as a community or public access channel) or a pointcast stream (such as a pay per view event or interactive shopping channel).

After the user has finished viewing or otherwise utilizing a selected program, the operating context of the STT/program guide will return to the program guide context. That is, any pointcast or narrowcast "session" that was initiated due to the selection of a program will be torn down upon completion of that program. The user will be returned to the broadcast streams associated with the program guide of the present invention. The concept of contextual shifting and the implications for bandwidth utilization described in more detail below. Briefly, the invention operates to maximally utilize the bandwidth within an interactive information distribution system by allocating system functionality to system components (i.e., server side and subscriber side) such that a common interactive program guide may be provided by the head end to multiple subscribers via a broadcast (i.e., non-specific subscriber delivery) technique, which requires less expensive transmission techniques than those used for pointcast (i.e., subscriber specific delivery) transmission techniques.

Figure 2:
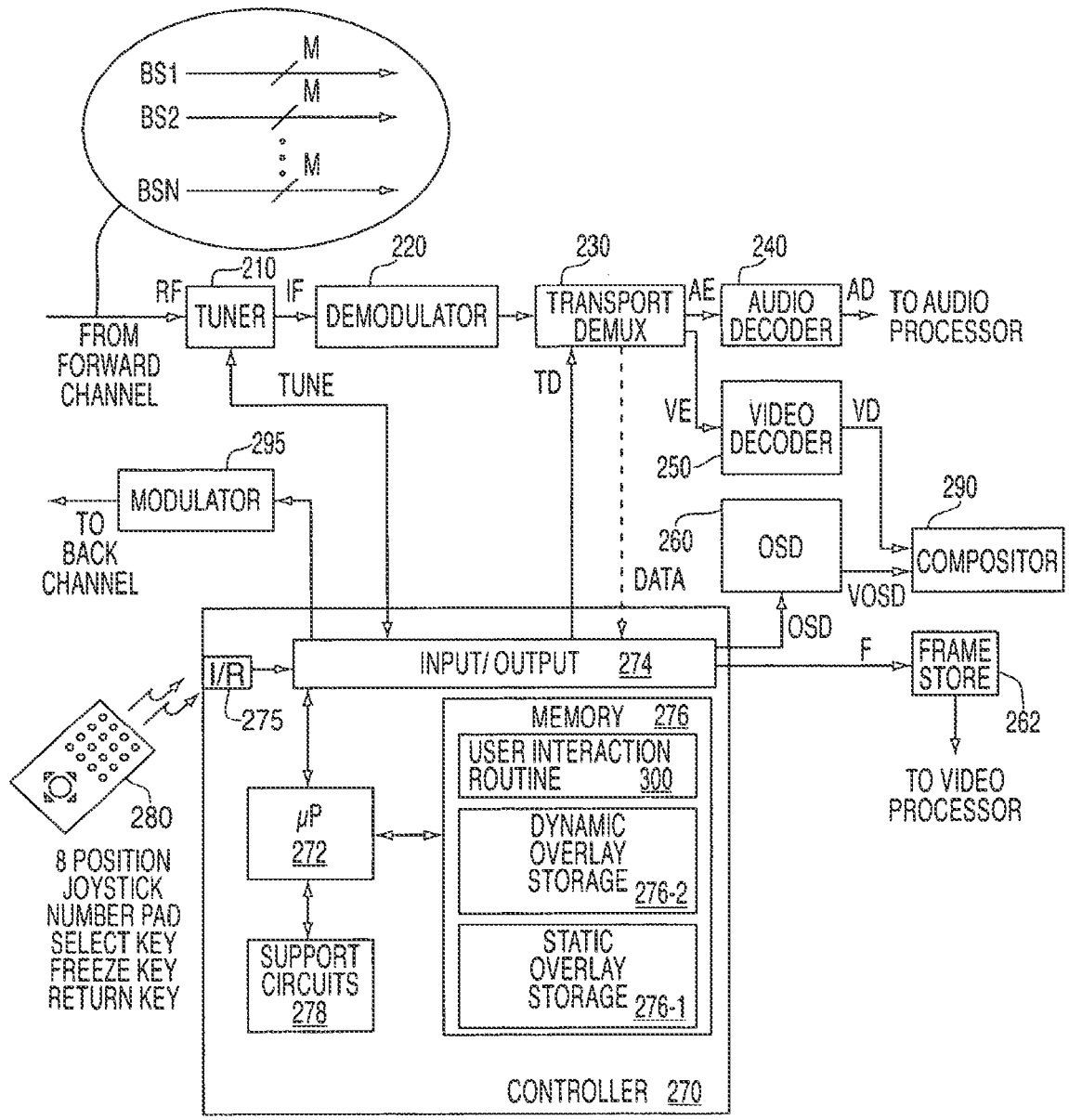
FIG. 2 depicts subscriber side equipment suitable for use in an interactive information distribution system.

FIG. 2 depicts subscriber side equipment suitable for use in the present invention. Specifically, FIG. 2 depicts a set top terminal (STT) comprising a tuner 210, a demodulator 220, a transport demultiplexer 230, an audio decoder 240, a video decoder 250, an on screen display processor (OSD) 260, a frame store memory 262, a compositor 290 and a controller 270. User interaction is effected via a remote control unit 280. Tuner 210 receives, e.g., a radio frequency (RF) signal comprising a plurality of quadrature amplitude modulated (QAM) information signals from a forward channel such as a hybrid fiber optic cable television system. Tuner 210, in response to a control signal TUNE, tunes to a particular one of the QAM information signals to produce an intermediate frequency (IF) information signal. Demodulator 220 receives and demodulates the intermediate frequency QAM information signal to produce an information stream, illustratively an MPEG transport stream. The MPEG transport stream is coupled to a transport stream demultiplexer 230.

Transport stream demultiplexer 230, in response to a control signal TD produced by controller 270, demultiplexes (i.e., extracts) an audio information stream AE and a video information stream VE. The audio information stream AE is coupled to audio decoder 240, which decodes the audio information stream and presents the decoded audio information stream AD to an audio processor (not shown) for subsequent presentation. The video stream VE is coupled to the video decoder 250, which decodes the compressed video stream VE to produce an uncompressed video stream VD that is coupled to the compositor 290. OSD 260, in response to a control signal OSD produced by controller 270, produces a graphical overlay signal VOSD that is coupled to the compositor 290.

Optionally (e.g., in the absence of a default or predetermined overlay design), transport stream demultiplexer 230 retrieves a data stream DATA, illustratively an auxiliary data stream or user data stream according to, e.g., the MPEG standards. The retrieved data stream DATA provides information regarding overlay parameters and other program guide information. The retrieved data stream may also include other profile parameters inserted into the forward channel bitstreams by a profile unit 460 of FIG. 4 (described below).

Additionally, in one embodiment, the data stream identifies sequence header location, GOP structure, coding parameters, PID locations, program map tables and other information suitable for use by controller 270 in, e.g., selecting appropriate decoding or processing parameters.

The compositor 290 merges the graphical overlay signal VOSD and the uncompressed video stream VD to produce a modified video stream (i.e., the underlying video images with the graphical overlay) that is coupled to the frame store unit 262. The frame store unit 262 stores the modified video stream on a frame-by-picture basis according to the frame rate of the video stream. Frame store unit 262 provides the stored video frames to a video processor (not shown) for subsequent processing and presentation on a display device.

The frame store unit 262, in response to a control signal F produced by the controller 270, "freezes" in memory (i.e., does not update) a presently stored video frame such that the video information provided to the video process results in a still image. This is useful when, e.g., a broadcast program guide utilizes scrolling information, a telephone number or address is briefly displayed or a user simply wants to view a presently displayed frame for a longer period of time.

Controller 270 comprises a microprocessor 272, an input/output module 274, a memory module 276, an infrared (IR) receiver 275 and support circuitry 278. The microprocessor 272 cooperates with conventional support circuitry 278 such as power supplies, clock circuits, cache memory and the like as well as circuits that assist in executing the software routines. The input/output circuitry 274 forms an interface between the controller 270 and the tuner 210, the transport demultiplexer 230, the onscreen display unit 260, the back channel modulator 295, and the remote control unit 280. Although the controller 270 is depicted as a general-purpose computer that is programmed to perform specific interactive program electronic guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 2, the remote control unit 280 comprises an 8-position joystick, a numeric pad, a "select" key, a "freeze" key and a "return" key. User manipulations of the joystick or keys of the remote control device are transmitted to a controller via an infrared (IR) link. The controller 270 is responsive to such user manipulations at several levels of abstraction. Specifically, the controller interprets user manipulations as interaction model manipulations or interface model manipulations, which are described below.

Interaction model manipulations are those manipulations which depend only upon local processing resources, such as changing overlay object emphasis or selecting a new video stream within a previously tuned and demodulated transport stream (i.e., a sub-stream having only a different packet id (PID) than the presently displayed sub-stream or tuning to another channel already present in the broadcast spectrum). Interface model manipulations are those manipulations which require interaction with the head end, such as selection of an object that requires a change from a broadcast mode of operation to a pointcast mode of operation. These modes will be described in more detail below. Briefly, in a broadcast mode of operation, many subscribers receive and utilize the same information stream. In a pointcast mode of operation, only one subscriber receives and utilizes a particular information stream. In a narrowcast mode, a relatively small number of subscribers receives and utilize a particular information stream. This is, essentially, a "shared pointcast" mode.

Referring to FIG. 1, emphasis and selection of promotional splash 110 changes the context from the program guide context to a shopping guide context. Within the shopping guide context the user is allocated an individual interactive information stream (i.e., a pointcast stream) allowing the user to buy a particular product, browse a particular group of products or otherwise interact with the server. Similarly, selection of the logo object 115 or any of the channel objects 135 or channel number objects 130 results in a narrowcast information stream that provides the user with general information associated with the companies or individuals identified with the logos or channel boxes.

Within a narrowcast context just described, a user may change to a pointcast context to retrieve more particularized information. Similarly, if the user emphasizes and selects the video barker object 120 a new stream is provided to the user in which the video barker may be displayed at full screen resolution or a promotional screen other than the video barker may be displayed. Optionally, ordering information for a pay preview event represented by the video barker may also be provided. Scrolling promotional banner 155 may also be selected, bringing the user to a narrowcast or broadcast stream that provides a promotional video barker or other information. It should be noted that the time of day information and date information 105 may be retrieved by the subscriber and utilized to synchronize the clock within the subscriber terminal.

The interactive program guide 100 depicted in FIG. 1 is formed using a single video stream having an associated audio stream and a corresponding graphic overlay. The program guide display 100 depicts an hour and a half time interval for each of ten channels. Thus, to depict an entire 24-hour time interval for ten channels, it is necessary to provide 16 separate images or display screens of information.

Each particular video screen may be associated with a packet ID (PID) value. A plurality of such video streams may be included within a single transport stream.

Figure 3:
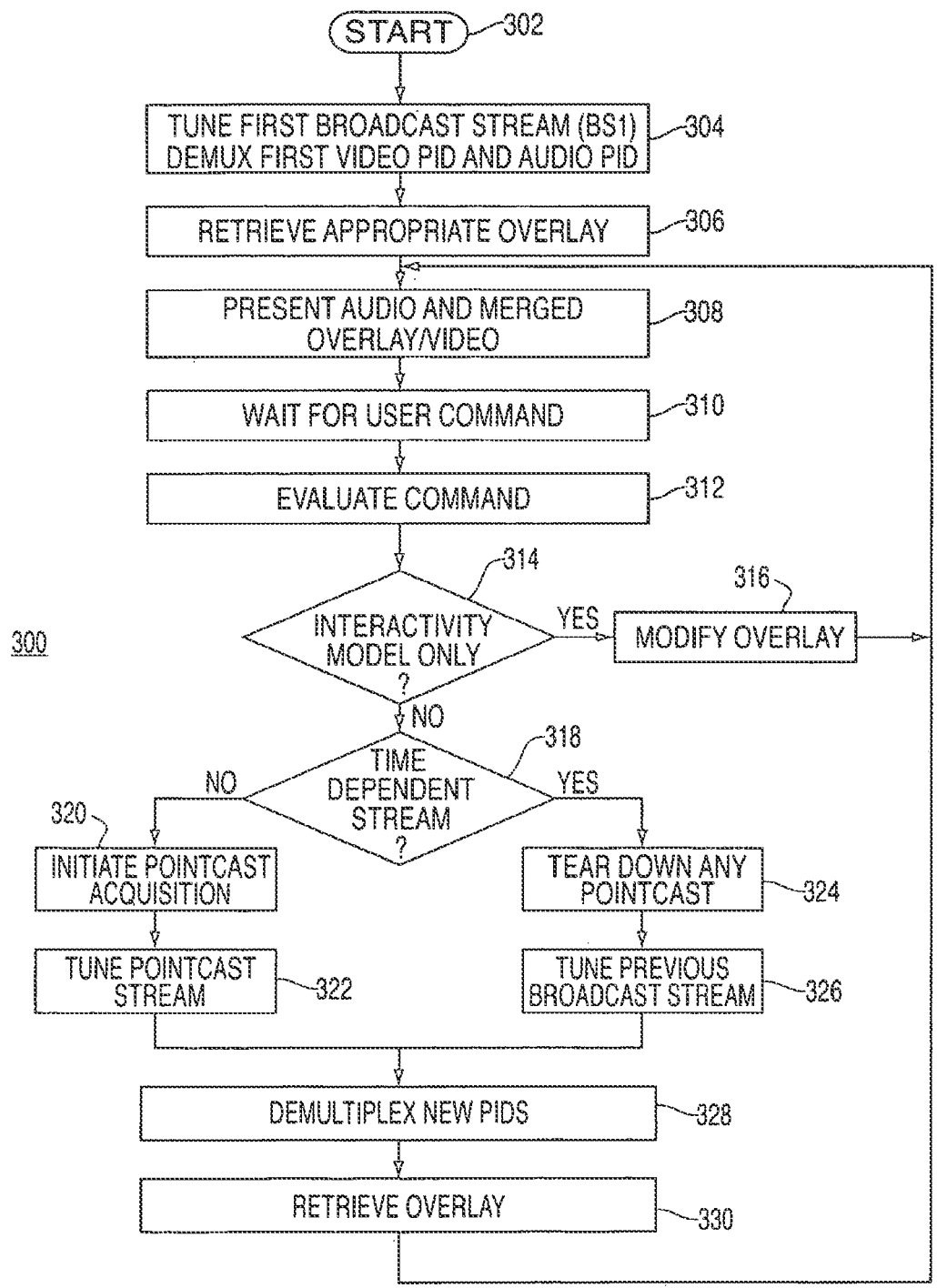
FIG. 3 depicts a flow diagram of a user interaction method suitable for use in the subscriber side equipment of FIG. 2.

FIG. 3 depicts a flow diagram of a user interaction routine 300 suitable for use in the subscriber side of equipment of FIG. 2, and more particularly, suitable for use in the controller 270 of the subscriber side equipment depicted in FIG. 2. The routine 300 is entered at step 302, when the subscriber side equipment is powered on. The routine 300 then proceeds to step 304, where a first or default broadcast stream from the forward channel is tuned by RF tuner 210 in response to a control signal TUNE provided by controller 270. The tuned broadcast stream, illustratively BS1, is demodulated by demodulator 220 to produce one or more transport streams which are coupled to transport stream demultiplexer 230. A video stream having a default packet ID (PID) and an audio stream having a default packet ID (PID) are demultiplexed by transport stream demultiplexer 230 to produce an encoded audio stream AE and an encoded video stream VE.

After tuning the first broadcast stream and demultiplexing the first video stream and associated audio stream (step 304), the routine 300 proceeds to step 306, where an appropriate overlay is retrieved from memory unit 276. That is, a default overlay, e.g., an overlay stored in static overlay storage unit 276-1 in a memory unit 276, is retrieved by the controller 270 and coupled to the OSD generator 260. Optionally, as previously discussed, transport demultiplexer 230 also demultiplexes a control and applet data stream, illustratively an auxiliary data stream included with the signal received via a forward channel. This data stream may include specific overlay information intended to be used with the received program stream and stored in the dynamic overlay storage unit 276-2. Alternatively, the received data stream may include simply X-Y grid coordinates that may be used to calculate an appropriate overlay for the video stream. The overlay information may simply be default information suitable for use in a fixed (i.e., predetermined) on screen program guide display. Upon retrieving the appropriate overlay, the routine 300 proceeds to step 308.

At step 308, routine 300 presents the merged overlay and video information stream. That is, the decoded video stream VD produced by video decoder 250 and the on-screen display stream VOSD produced by OSD unit 260 are merged together by compositor 290 to produce a merged video stream which is then coupled to a video processor (not shown) for further processing prior to presentation on a display device. Contemporaneously, audio decoder 240 is decoding the appropriate audio channel, i.e., the audio information stream associated with the audio PID of step 304, which is then coupled to an audio processor for subsequent presentation by a set of speakers. The routine 300 then proceeds to step 310, where it waits for a user command. Upon receipt of a user command, such as the receipt of a joy stick manipulation indicative of an on-screen program guide command such as a change in object emphasis or a selection of an object or other related commands, the routine proceeds to step 312, where the received user command is evaluated.

After evaluation the received user command (step 312) the routine 300 proceeds to step 314, where a query is made as to whether the received command requires processing at an interactivity model level only. That is, whether the received command is simply directed towards changing the on screen object presently emphasized (interactivity model only or set top terminal processing only), or directed towards retrieving information found in a different video stream. For example, a non interactivity model command includes commands that change the contents of the program grid 150 (different group of channels or different displayed time intervals), commands that indicate a selection of an emphasized object (i.e., selection of a promotional banner or object, selection of a channel, increment or decrement of the presently displayed group of channels such that a different video stream is required, increment or decrement of the displayed temporal intervals such that a different video stream is required, and so on.

If the query in step 314 is answered affirmatively, then the routine 300 proceeds to step 316, where the overlay is modified. That is, the presently emphasized object is de-emphasized by the on-screen display unit 260 and emphasis is placed on a different object. For example, referring to the electronic program guide display 100 of FIG. 1, if the promotional object 110 is presently highlighted, and the user moves the joy stick in a manner indicating an intent to select the logo object 115 (e.g., an upper right movement of the joy stick), then the overlay is modified by deemphasizing object 110 and emphasizing object 115. The routine 300 then proceeds to step 308, where the audio and merged overlay and video information are presented.

If the query at step 314 is answered negatively, then the routine proceeds to step 318, where a query is made as to whether a time-dependent stream is being selected. That is, if the query at step 314 is answered negatively, then the received command is such that an additional video information stream is to be selected. At step 318 a query is made as to whether that additional video information stream to be selected is one of a time-dependent stream or a time-independent stream. A time-dependent stream is a stream that is either broadcast or narrowcast to a plurality of subscribers. That is, a time-dependent stream is a stream received by many subscribers such that no one subscriber may control the transmission of that stream. A time-independent stream comprises, e.g., a pointcast stream such as an interactive shopping channel, a pay per view channel and the like.

If the query at step 318 is answered negatively, the routine 300 proceeds to step 320, where a pointcast stream acquisition is initiated. That is, at step 320, the process of initiating a pointcast session is started by transmitting appropriate information to the server side via the back channel. The routine 300 then proceeds to step 322, where the appropriate pointcast stream is tuned. The routine 300 then proceeds to step 328, where the video and audio stream (i.e., the PID associated with video and the PID associated with audio) streams are demultiplexed by transport demultiplexer 230. The routine 300 then proceeds to step 330, where an appropriate overlay is retrieved, and to step 308, where the audio and video merged with overlay streams are presented. In the case of a pay per view presentation, the overlay may comprise a transparent overlay, such that there is no on-screen display associated with a pay per view presentation. Optionally, the overlay may comprise a small icon or logo to indicate which pay per view channel or which cable channel has been selected for processing.

If the query at step 318 is answered affirmatively, then the routine proceeds to step 324, where any existing narrowcast/pointcast session is torn down, and to step 326, where the last broadcast stream tuned by the subscriber side equipment is re-tuned, and the associated transport stream or streams are re-acquired. In this manner, in the event of a user selecting a particular pay per view or other context-changing program, the context will be returned to the initial program guide context upon exiting the changed-to context (i.e., time independent stream). The routine 300 then proceeds to step 328, where the video and associated audio streams are multiplexed according to the appropriate PID values. The routine 300 then proceeds to step 330, where the appropriate overlay is retrieved (e.g., the program guide object oriented emphasis overlay), and to step 308, where the audio and merged overlay and video streams are presented.

The above described user interaction routine 300 provides an efficient method for user navigation within an interactive information distribution system. Specifically, the user manipulates on screen objects by selectively emphasizing or de-emphasizing those objects using a remote control device associated with the set top terminal. Within the program guide context objects are emphasized and de-emphasized and selected to retrieve desired video and/or audio streams. For example, in the case of the on screen display 100 of FIG. 1, a user may manipulate any of the objects and select a particular object to change the context of the program guide such that the user changes the level of abstraction (i.e., context) by which information is presented.

Figure 4:
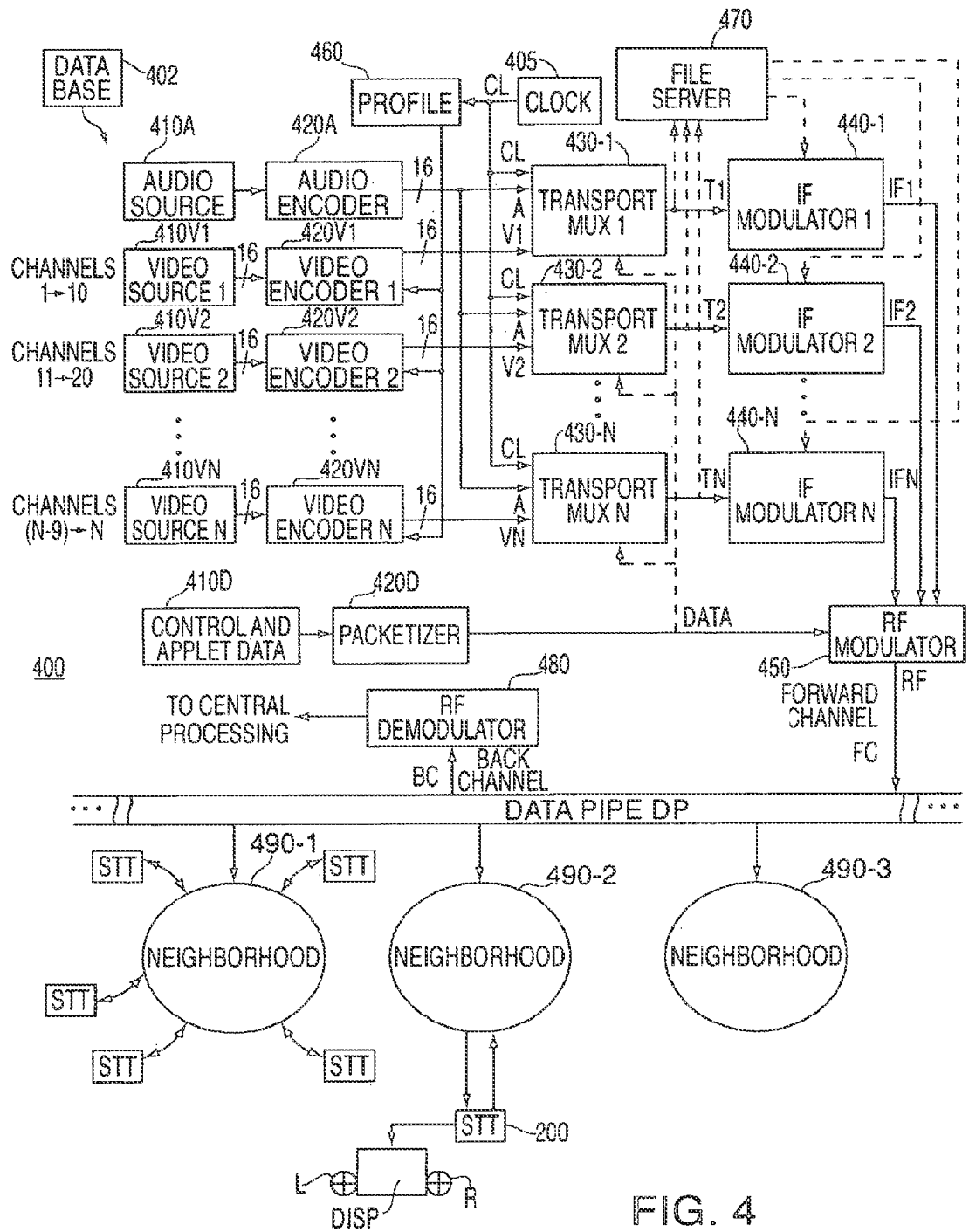
FIG. 4 depicts a high-level block diagram of an interactive information distribution system.

FIG. 4 depicts a high-level block diagram of an interactive information distribution system. Specifically, FIG. 4 depicts an interactive video information distribution system directed towards providing a plurality of video information streams and an associated audio information stream suitable for use in the interactive electronic program guide described above with respect to FIG. 1.

The head end processing portion 400 depicted in FIG. 4 comprises an audio source 410A, a plurality of video sources 410V1 through 410VN, an audio encoder 420A, a plurality of video encoders 420V1 through 420VN, a plurality of transport multiplexers 430-1 through 430-N, a plurality of intermediate frequency (IF) modulators 440-1 through 440-N, a radio frequency (RF) modulator 450, a video profile module 460, a file server 470, a clock source 405, an RF demodulator 480.

Audio source 410A provides an audio information stream, illustratively an audio information stream associated with the audio-visual barker 120 of the interactive program guide display 100 of FIG. 1. The audio information stream is coupled to an audio encoder 420A, where it is encoded into a standard compressed audio format, such as Dolby AC3 or another appropriate format. The encoded audio stream A is coupled to each of the transport multiplexer units 430-1 through 430-N.

The first video source 410V1 provides, illustratively, 16 video information streams to video encoder 420V1. Each of the 16 video streams is suitable for providing the video information necessary to support the interactive program guide display 100 of FIG. 1. Specifically, it is noted that in the exemplary program guide 100 of FIG. 1 up to ten channels may be displayed at one time. Thus, each of the video information streams includes information sufficient to display a program guide screen comprising a 10-channel group of channels. In one embodiment of the invention, each of the 16 video streams coupled to the video encoder 420 comprises information sufficient to provide all video layer information for a single channel group, e.g., channels 1-10. In the case of only one of the 16 video streams being used, the output of the video encoder 420 comprises a single encoded video stream (which will be subsequently included in a single transport stream). In the case of more than one of the 16 video streams being used, the output of the video encoder 420 comprises more than one (up to 16) encoded video stream (all of which will be subsequently included in a single transport stream). It will be noted that 16 video streams represents 24 hours of programming for a single channel group in the case of 1.5 hour program groupings.

All the generated streams are temporally aligned in terms of data (i.e., streams depicting different channels or different times are aligned such that stream to stream switching at a decoder may be accomplished in a substantially seamless manner). In addition, the streams are generated in a synchronized manner with respect to clock source 405, such that GOP structures, sequence headers, I-picture location and other parameters (which are indicated via the profile unit 460) are (if desired) aligned across a plurality of information streams. In this manner, stream splicing may be performed without noticeable video artifacts or audio artifacts, and without excessive latency.

A database 402 provides program guide information to a plurality of video sources 410V1 through 410VN. Each of the plurality of video sources 410V1 through 410VN is associated with, illustratively, ten channels (i.e., AMC, Fox, HBO and the like). Each of the ten channels provides different programming material at different times of the day as denoted by programming grid 150 in the interactive electronic program guide display 100 of FIG. 1. Specifically, since the displayed portion of the programming grid 150 comprises a 1.5 hour time interval, it is necessary to associate 16 (25 divided by 1.5) video streams with each ten-channel block for each 24 hour period. That is, a first of the 16 video streams associated with the ten channel block is used to identify programming material from 12:00 a.m. through 1:30 a.m., a second stream is used to identify programming material from 1:30 a.m. through 3:00 a.m. and so on. Thus, video source 1 (410V1) provides 16 video information streams to video encoder 1 (420V1), wherein each of the 16 video information streams includes program identification information for channels 1-10 for each of the 16 1.5 hour time intervals. That is, each of the 16 video streams is capable of providing the video layer used in electronic program guide display 100 of FIG. 1 for a respective 1.5 hour time period.

Included within the program guide display 100 is, of course, the video barker 120. Associated with the video barker 120 is the audio stream A produced by audio source 410A and encoded by audio encoder 420A. The 16 video streams produced by video encoder 420V1, the audio stream produced by audio encoder 420A and a reference clock CL produced by a clock source 405 are coupled to a first transport multiplexer 430-1. Similarly, 16 video information streams representing 24 hours of programming data for channels 11 though 20 are produced by a second video source 410V2, and coupled to a second video encoder 420V2. The 16 encoded video streams V2 produced by second video encoder 420V2 are coupled to a second transport multiplexer 430-2 along with the audio stream A and clock signal CL. Similarly, the Nth video source 410VN produces 16 video information streams associated with a 24-hour programming period for the N-9 through Nth channels in the system. The 16 video information streams produced by the Nth video stream 410VN are coupled to an Nth video encoder 420VN where they are encoded. The Nth group of 16 encoded video information streams VN is then coupled to an Nth transport multiplexer 430-N, along with the audio stream A produced by audio encoder 420A and the clock signal CL produced by clock source 405.

Each of the transport multiplexers 430-1 through 430-N produces a respective output transport stream T1 through TN that is coupled to a respective intermediate frequency (IF) modulator 440-1 through 440-N. Optionally, the transport streams T1 through TN are coupled to file server 470 for storage prior to subsequent delivery to the respective IF modulators 440-1 through 440-N. The IF modulators 440-1 through 440-N produce respective IF output signals which are then coupled to RF modulator 450. The RF modulator 450 modulates the respective IF signals onto a carrier frequency for subsequent transmission via a forward channel.

It is important to note that, while the transport multiplexing function is depicted as being performed by a plurality of transport multiplexers 430-1 through 430-N, the transport multiplexing function may also be performed using a single transport multiplexer. Additionally, while the IF modulation function is depicted as being performed by a plurality of IF modulators 440-1 through 440-N, the IF modulation function may also be performed using a single IF modulator. The main constraint placed upon the IF modulation function relates to the available bandwidth within the forward channel FC. That is, since each IF modulated signal IF1 through IF-N is capable of carrying data at a maximum bitrate (e.g., 27 Mbps in a 64 QAM modulation scheme), the total data rate of the transport stream(s) within the IF modulated signal cannot exceed the available bandwidth. Thus, in the case very high data rate streams are transport encoded, it may be necessary to use several IF modulators to produce several corresponding IF modulated signals for transmission via the forward channel FC.

A control and applet source 410D provides control information and applet data information (i.e., subscriber side programs provided by the server) to a packetizer 420D, illustratively an MPEG2 packetizer producing an auxiliary data stream DATA. The auxiliary data stream DATA is coupled to RF modulator 450 and, optionally, each of the transport multiplexers 430-1 through 430-N. In the case of the auxiliary data stream DATA being coupled to each of the transport multiplexers, the resulting multiplexed transport streams T1 through TN will each include the control and applet data such that retrieval of any one of the multiplexed transport streams from the forward channel by a set top terminal will yield control data and applet data sufficient to run any appropriate subscriber side programs.

The RF modulated data is coupled to a forward channel within, e.g., a cable television system or other information distribution system. The information distribution system is denoted as data pipe DP and is coupled to a plurality of neighborhood information distribution systems 490-1 through 490-3. Each of the neighborhood distribution systems 490-1 through 490-3 is coupled to a plurality of set top terminals 200. It should be noted that while each of the set top terminals is denoted by the same reference designator (i.e., 200), each of these terminals will be associated with a unique terminal identification (TID) and other subscriber specific information. The set top terminal 200 described above with respect to FIG. 2 may be used within the system of FIG. 4. Furthermore, each set top terminal is associated with a display device (i.e., a television or other display device) and an audio presentation unit (i.e., speakers and associated speaker drivers). The display device and speakers are denoted by the DISP, L and R designators.

Figure 5:
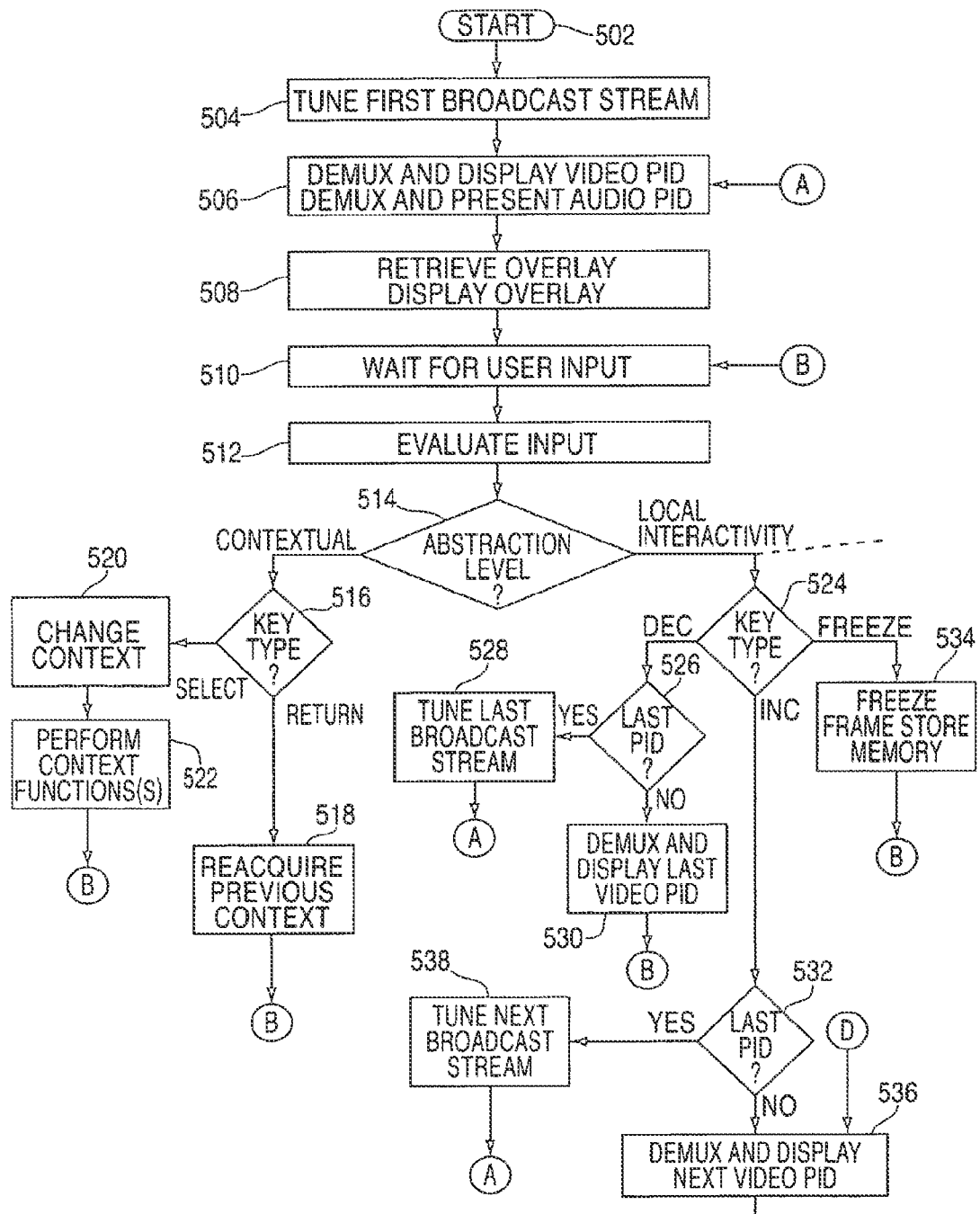
FIG. 5 depicts a flow diagram of a user interaction method suitable for use in the subscriber side equipment of FIG. 2.

FIG. 5 depicts a user interaction routine 500 according to the invention. The routine 500 is entered at step 502, when subscriber side equipment is initially powered on or otherwise initialized. The routine 500 then proceeds to step 504, where a first default stream is tuned and demodulated. The routine 500 then proceeds to step 506, where a default video stream and associated audio stream is demultiplexed and displayed or presented. The routine 500 then proceeds to step 508, where an appropriate overlay is retrieved and displayed along with the displayed or presented video stream. The routine 500 then proceeds to step 510, where the processor waits for user input via, e.g., remote control device 280.

Upon receipt of user input, the routine proceeds to step 512, where the user input is evaluated. The routine 500 then proceeds to step 514, where a query is made as to whether the evaluation indicates that the abstraction level indicated by the user input is a contextual or local interactivity.

If the query at step 514 indicates that the user interaction is such that the contextual level of the interactive experience is to be changed, then the routine proceeds to step 516. At step 516, a query is made as to which key has been pressed by the user. If the query at step 516 indicates that the "return" key has been pressed, then the routine 500 proceeds to step 518, where the previous context is re-acquired. That is, in the case of a present pointcast context such as an interactive shopping or pay per view context, activation of a "return" key on the remote control device indicates that a return to the previous context is required, which would typically mean that return to the program guide context is desired. The routine 500 then proceeds to step 510, where the processor waits for user input.

If the query at step 516 indicates that the key pressed was the "select" key, then the routine proceeds to step 520, where the context is changed in response to the emphasized object selected by the "select" key. The routine 500 then proceeds to step 522, where the selected context function or functions are performed. The routine then proceeds to step 510, where the processor waits for user input.

If the query at step 514 indicates that local interactivity only is requested by the user, then the routine proceeds to step 524, where a query is made as to the type of key pressed by the user. If the query at step 524 indicates that the "freeze" key has been pressed by the user, then the routine proceeds to step 534, where the video frame presently stored in frame store unit 262 is frozen. That is, the frame store unit 262 is not updated by subsequent video frames until such time as the "freeze" key or other key is pressed again. The routine 500 then proceeds to step 510, where the processor waits for user input. If the query at step 524 indicates that an "increment" key has been pressed (e.g., a temporal increment or channel increment) then the routine proceeds to step 532.

At step 532 a query is made as to whether the presently selected video stream, as indicated by the PID of the stream, is, in fact, the last video stream within a particular broadcast stream. If the query at step 532 is answered affirmatively, then the routine 500 proceeds to step 538, where the next broadcast stream is tuned. The routine 500 then proceeds to step 506, where the first video and associated audio streams of the newly tuned broadcast stream are demultiplexed and displayed or presented.

If the query at step 532 is answered negatively, then the routine 500 then proceeds to step 536, where the next video stream (i.e., the next video PID) is demultiplexed and displayed. The routine 500 then proceeds to step 510, where the processor waits for user input.

If the query at step 524 indicates that a "decrement" key was pressed (i.e., a temporal or channel identification decrement), then the routine 500 proceeds to step 526, where a query is made as to whether the presently selected video stream as indicated by the PID of the stream is, in fact, the first video stream in the presently tuned broadcast stream. If the query at step 526 is answered affirmatively, then the routine 500 proceeds to step 528, where the previous broadcast stream associated with the "decrement" key (i.e., the previous broadcast stream including the temporal and/or channel information) is tuned. The routine 500 then proceeds to step 506. If the query at step 520 is answered negatively, then the previous video stream associated with the appropriate parameter (i.e., temporal or channel parameter) is demultiplexed and displayed along with the associated overlay. The routine 500 then proceeds to step 510, where the processor waits for user input.

A critical aspect of the present invention is the isolation of the interaction model at the set-top box level, where no context is associated with any user interaction, and where merely the manipulation of audio and visual elements represents the applying, removing, and shifting of emphasis from one area of the display screen to another. All items containing contextual information reside in a centralized location where they are processed and the management of network resources executed in manner to enable the context-based service request or transition.

This invention works by combining the use of broadcast digital video streams with video-on-demand streams to produce a compelling user interface in both visual and audio terms. The invention uses an intelligent set top box's ability to manipulate a graphics overlay plane displayed in conjunction with a video box. The system allows the interactions to carry the user from broadcast (or narrowcast) video stream to broadcast (or narrowcast) video stream, from broadcast (or narrowcast) video stream to pointcast video stream, and from pointcast video stream to broadcast (or narrowcast) video stream.

At the heart of the interactive program guide is a method that takes the time-dependent information and provides that information in streaming mode over a series of synchronized real-time video streams. The user of the guide agilely moves between these broadcast streams to receive the full set of available listings. When the user's interest takes him/her from the domain of time-dependent information, such as a listing of currently available programming to the realm of time-independent information, such as previews, promotions and the like, the streams processed at the set top box transition from broadcast to pointcast (on-demand) streams.

When the user's interest takes him/her from one area of time-independent information back to an area of time-dependent information, the streams requested by the system and processed at the set top box will shift from one pointcast stream to a broadcast stream. For example, when a user returns to the program guide from an interactive shopping channel or pay per view event the video stream served to the user changes from a pointcast stream to a broadcast stream. That is, the pointcast session is torn down and the user's STT selects the appropriate broadcast stream.

The user of the exemplary interactive program guide controls the logical operation of shifting the emphasis from one "object" to the next through the use of an interactive device such as a remote control with directional arrows, a joystick or other interactive controller. Such an approach may be used with or without an on-screen pointer or cursor. When the user makes a selection to a single option, the tuner 210 in the set top box may be force-tuned to the corresponding selection.

Traversal of the available options in a long list of programming options is achieved by providing the option to page through the various sets of options. This effect is achieved by jumping from one video stream (by changing from one PID to another within the same or different QAM channel). The advantage of jumping within the same QAM channel is that there will not be any noticeable added latency associated with tuning and demodulating a new QAM channel.

It is important to note that synchronization of program channel numbers with areas of on-screen emphasis is achieved through either in-band data delivery, out-of-band data delivery, vertical blanking interval (VBI) data delivery or other approaches known to those familiar in the art of data delivery in broadband networks. That is, data indicative of the location of manipulable screen objects (i.e., those objects that may be selectively emphasized) is provided to the set top terminal via one or more techniques.

Channel options in the Interactive Program Guide can represent any combination of programming offered from a wide range of sources, including but not limited to, over-the-air broadcast, cable broadcast, satellite broadcast, local programming, ad insertion apparatus and can include the full range of pay channels, pay per view (PPV), video on demand (VOD), near video on demand (NVOD), internet service, interactive gaming, interactive shopping, "free" programming, etc. Channel numbers can be virtual in nature, and they can be remapped in either the set top box or the head end equipment to correspond to the service being delivered.

Delivery of PPV, NVOD, VOD, interactive gaming, interactive shopping, internet, video classified ads, and other services can be integrated into this system in a two-way cable environment through the use of cable modem technologies or other back-channel methods known to those familiar in the art of enabling such services in a network environment.

This invention may further be used to enable pay television services, such as subscription services like HBO®, Showtime®, etc., in a two-way cable environment through the use of cable modem technologies or other back-channel methods known to those familiar in the art of enabling such services in a network environment.

This system can further be extended to implement conditional access by arranging bitmap information in different data blocks according to types of access allowed. Processing of this information is done at the head end where a series of descriptors are developed for each on-screen area capable of receiving emphasis. Part of the descriptors contains entitlement "locks" mapping access entitlement to on-screen areas capable of displaying emphasis. At the set top box, a series of "keys" exist that map to those channels the user is entitled to view. If one of the keys "fits" any of the locks, the bitmap set linked to the key may receive on-screen emphasis at the set top box.

The invention is unique because, advantageously, it does not require the maintenance of television programming lists in the set top box, it adds a level of interactivity to current broadcast programming guides, it provides a more television-like user experience, and it makes the best economic use of bandwidth in intricate, asset-rich interactive program guides.

In one embodiment of the invention, multiplexed broadcast analog or digital video and static, pre-programmed bitmaps are utilized. In this embodiment, the pre-programmed bitmaps are installed in the set top box in, e.g., memory module 276. The bitmaps are x-y grid borders that align with x-y grid borders built into the broadcast video streams, and are modified in color and/or degree of transparency to allow visual emphasis to be associated with a single option or set of options.

In another embodiment of the invention, multiplexed broadcast analog or digital video and dynamic, pre-programmed bitmaps are utilized. In this embodiment, a variety of pre-programmed bitmaps are installed in the set top box. These bitmaps may be x-y grid borders, circles, or any other delineator capable of providing adequate emphasis so that a user may discern the option of set of options representing an actionable field. These may align with borders built into the broadcast video streams and are modified in color and/or degree of transparency to allow visual emphasis to be associated with a single option or set of options. The set top box can move back and forth between one set of bitmaps and another.

Synchronization of a particular set of installed bitmaps to a broadcast video stream is achieved through signaling linked to the broadcast video stream either through in-band data delivery, out-of-band data delivery, vertical blanking interval data delivery or other approaches known to those familiar in the art of data delivery in broadband networks.

In another embodiment of the invention, multiplexed broadcast analog or digital video and dynamic, updateable bitmaps are used. In this embodiment, a variety of pre-programmed bitmaps may or may not be installed in the set top box. As in the previous embodiment, these bitmaps may be x-y grid borders, circles, or any other delineator capable of providing adequate emphasis so that a user may discern the option of set or options representing an actionable field. These may align with borders built into the broadcast video streams and are modified in color and/or degree of transparency to allow visual emphasis to be associated with a single option or set of options. The set top box can move back and forth between one set of bitmaps and another. Synchronization of a particular set of installed bitmaps to a broadcast video stream and download of new bitmaps is achieved through signaling linked to the broadcast video stream either through in-band data delivery, out-of-band data delivery, vertical blanking interval data delivery or other approaches known to those familiar in the art of data delivery in broadband networks.

In one embodiment of the invention a set top box focused method is described for transitioning from stream to stream without interruption in signal or contextual continuity with parallel information streams in an interactive information on demand environment. Specifically, referring to FIG. 4, a high-level block diagram depicting the formation and distribution of a plurality of related information streams is shown. Specifically, the related information streams comprise a single audio information stream and a plurality of video information streams. Each video information stream comprises image information such as the image information depicted in the interactive electronic program guide display 100 of FIG. 1. However, each video stream is associated with different channels as identified in the channel grid 150, channel identification 135 and channel number 130 objects in the display 100 of FIG. 1.

In one embodiment of the invention, text information is integrated into video streams to provide a video-based, remote cast interactive program guide. That is, text information is included within the downstream video portion as part of the onscreen program guide. This text information may comprise, e.g., stock quotes and other information.

In another embodiment of the invention, profiling data is produced by transport demultiplexer 230. Specifically, transport demultiplexer 230 produces data indicative of GOP structure, sequence header locations, I-picture locations, PID identifications, and other information included in the broadcast streams and/or video and audio streams included within that broadcast stream.

In another embodiment of the invention, a system and method for advertisement insertion into pointcast and narrowcast digital distribution systems is disclosed. Specifically, advertisements appropriate to a particular subscriber or a group of subscribers in, e.g., a neighborhood, are inserted into pointcast or narrowcast digital video streams going to that subscriber or neighborhood of subscribers.

In another embodiment of the invention, a system and method for invoking an information stream using a video-based, remote-cast interactive program guide in an interactive information-on-demand system is disclosed.

In another embodiment of the invention, a method and apparatus for processing conditional access information for a video-based, remote cast interactive program guide is disclosed. Also disclosed is a method and apparatus for merging multiple sources of scheduled and on-demand programming for a video-based, remote cast interactive programming guide. Additionally disclosed is a system and method for inserting advertisements into an interactive program guide based on user profiles (i.e., demographic profiles). These demographic profiles are also useful in targeting, in either pointcast or narrowcast streams, advertising material for a particular subscriber or a group of subscribers. Also disclosed is a method and apparatus for blending sub-elements of independent MPEG streams to make a single unified MPEG stream (also known as slice level splicing). In this embodiment, particular elements of the onscreen program display are associated with particular slices. That is, a slice comprises one or more contiguous blocks within a single row of macroblocks. The first block of a line is always the first block of a slice, the last block of a line is always the last block of a slice. A line may comprise a single slice or multiple slices. By forming the onscreen display according to a slice-based regional approach, slice level splicing may be performed at a subscriber end by, e.g., controller 270 adaptively coupling slices from one or more information streams to an output.

Also disclosed is a method and apparatus for the generation of rewind tracks for MPEG in near real time. That is, the head end processing system may include, in addition to standard (i.e., forward) video information streams, additional information streams comprising a temporally reversed information stream. This temporally reversed information stream need not be transmitted contemporaneous to the forward information stream. Rather, portions of the rewind information stream may be transmitted such that a slicing operation between the streams may result in a stream switching without excessive latency, while at the same time the rewind track is acquired rapidly and provided to the output.

Figure 6:
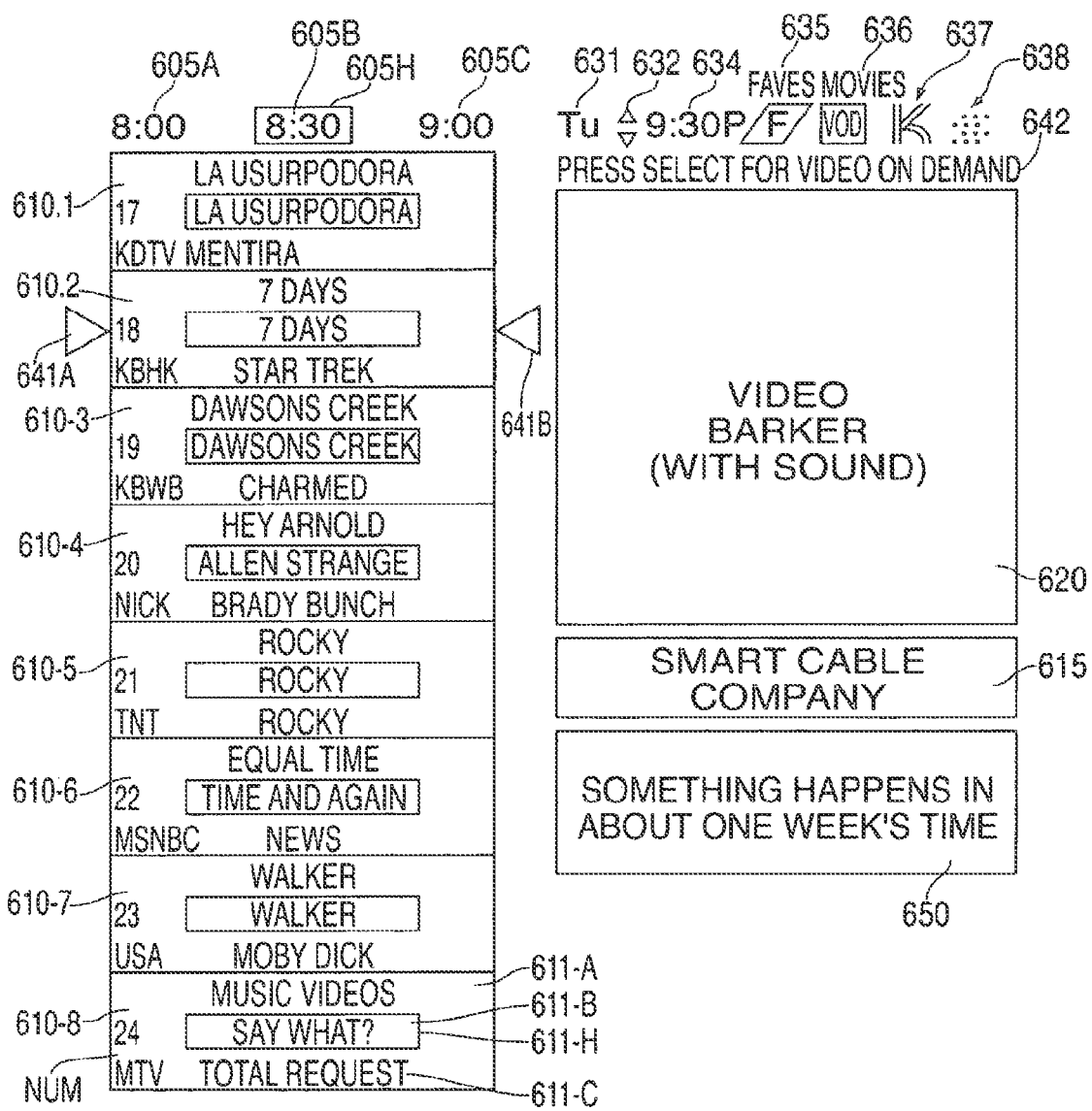
FIG. 6 depicts a display screen of an interactive electronic program guide (IEPG)

FIG. 6 depicts a display screen of an interactive electronic program guide (IEPG). Specifically, FIG. 6 depicts an exemplary interactive electronic program guide display 600 that is formed and operates in a manner similar to that described above with respect to the IEPG display 100 of FIG. 1. That is, the interactive program guide display 600 of FIG. 6 utilizes a video layer and a graphics layer that is displayed on, e.g., a television screen or other video presentation device in, e.g., the home of a subscriber to a cable television system or other information distribution system. Video information representative of each of a plurality of IEPG objects or elements is generated at the cable television central processing end or the head end and transmitted as part of a video stream. Graphic layer objects are associated with at least those video layer objects that may be manipulated by user interaction via, e.g., a remote control device. Subscriber side equipment suitable for receiving and displaying the IEPG is described above with respect to FIG. 2.

The primary differences between the IEPG displays of FIG. 1 and FIG. 6 are as follows. First, the IEPG display 100 of FIG. 1 utilizes a program grid 150 to present programming information, whereas the IEPG display 600 of FIG. 6 utilizes an enhanced "hide and reveal" technique to present more information to a viewer while reducing the amount of display clutter experienced by the viewer in navigating through the available programming choices. Second, the IEPG display 600 of FIG. 6 includes a program description object that is used to display, illustratively, a brief textual description of a program occupying a presently emphasized time slot of a presently indicated channel.

The IEPG display 600 of FIG. 6 comprises a first 605A, second 605B and third 605C time slot object (collectively time slot object 605), a plurality of channel content objects 610-1 through 610-8 (collectively channel contact object 610), a pair of channel indicator objects 641A and 641B (collectively channel indicator object 641), a video barker 620 (and associated audio barker), a cable system or provider logo 615, a program description object 650, a day of week identification object 631, a time of day object 639, a next time slot object 634, a temporal increment/decrement object 632, a prompt line object 642, a "favorites" filter or selection object 635, a "movies" filter or video on demand (VOD) selection object 636, a "kids" (i.e., juvenile) programming filter or VOD selection object 637 and a "sports" programming filter or VOD selection object 638. It should be noted that the day object 631 and next time slot object 634 may comprise independent objects (as depicted in FIG. 6) or may be considered together as parts of a combined object. Each of the channel content objects 610-1 through 610-8 comprises a channel number object NUM, a channel identification object ID, a first title object 611A, a second title object 611B and a third title object 611C (collectively 611). The channel number object NUM indicates the actual or virtual channel number of the channel identified by the channel identification object ID. The first 611A, second 611B and third 611C title objects depict the titles of programs provided by the channel during time slots indicated by, respectively, the first 605A, second 605B and third 605C time slot objects.

The IEPG display 600 of FIG. 6 is logically divided into two operational zones or regions, a guide region and an image region. The guide region comprises the time slot objects 605, channel content objects 610-1 through 610-8 and channel indicator objects 641A and 641B. The image region comprises the remaining objects. When a user or viewer is interacting with the program guide of the present invention, only one of these two regions will be active. Some keys or controls utilized by a viewer to control the IEPG will operate differently, depending upon which region is active. The operational differences between the two regions will be described in more detail below.

Referring now to the guide region of FIG. 6, it can be seen that the second time slot 605B is highlighted or emphasized by a time slot highlighting object 605H. Similarly, it can be seen that each respective second title object 611B of each of the plurality of channel content objects 610-1 through 610-8 is also emphasized or highlighted by a corresponding title highlighting object 611H. Time slot emphasis is coordinated. That is, if the first time slot object 605A is emphasized or highlighted, then the first title object 611A of each of the plurality of channel content objects 610-1 through 610-8 is also emphasized or highlighted. Similarly, if the second time slot object 605B is emphasized or highlighted, then the second title object 611B of each of the plurality of channel content objects 610-1 through 610-8 is also emphasized or highlighted. This coordinated highlighting or emphasizing of time slot 605 and title 611 objects assists the viewer in determining which titles within the respective channel content objects 610-1 through 610-8 are associated with which time slot.

In one embodiment of the invention, the coordinated emphasis or highlighting of time slot and title objects is accomplished by using the graphics layer to de-emphasize the de-emphasized or non-highlighted time slot and title objects. That is, the opacity of the graphics layer proximate the de-emphasized or non-highlighted time slot and title objects is adjusted to a level of opacity that is higher than the level of opacity of the emphasized or highlighted time slot and title objects. In the case of only two levels of opacity, the non-highlighted or de-emphasized objects are hidden using a full opacity level, while the highlighted or emphasized objects are revealed using a zero opacity level (i.e., transparent graphics layer). In the case of more than two levels of opacity, the difference in opacity levels between emphasized and de-emphasized objects is selected to provide clear indication to the viewer of object highlighting or emphasis, while retaining the viewer's ability to read the non-highlighted or de-emphasized objects.

In one embodiment of the invention, the coordinated emphasis or highlighting an object is accomplished by using the graphics layer to adjust a color, brightness or other parameter of an object, or display area surrounding the object. For example, an x-y coordinate grid or other shape surrounding an object to be highlighted or emphasized may be changed in color or brightness level such that the surrounded or proximate object is emphasized. Similarly, an x-y coordinate grid or other shape surrounding an object to be non-highlighted or de-emphasized may be changed in color or brightness level such that the surrounded or proximate object is de-emphasized.

The program description object 650 of the image region is used to display a description of a presently indicated title. The description comprises, illustratively, one or more of a brief textual description of the title, title start and end times, title run time, title ratings (e.g., MPAA or other ratings), title reviews (e.g., "thumbs-up" or "thumbs-down" or other qualitative indicia), ranking of title in comparison to other titles (e.g., popularity, aggregated positive or negative viewer feedback) and the like.

The pair of channel indicator objects 641A and 641B (or a single channel indicator object 641A or 641B) is used to indicate which of the plurality of channel content objects 610-1 through 610-8 includes a highlighted or emphasized title object 611 having associated with it a textual description within the program description object 650. That is, the channel indicator objects 641A and 641B provide a visual indication of a presently indicated channel to the viewer.

It is important to note that the video barker 620 of FIG. 6 (and the video barker 120 of FIG. 1) is, itself, an object that may be selected in some embodiments of the invention. Specifically, in an embodiment where the video barker 620 is used to present a movie trailer, selection of the video barker object 620 by the user implies a desire to view that movie in, e.g., a video-on-demand context. Thus, in an embodiment of the invention where the video barker comprises an active or selectable object, selection of the video barker brings the user to a video-on-demand interaction screen where the user is provided with the opportunity to purchase the movie presented in the video barker. Similarly, where the video barker is used to present merchandise or other products and/or services for sale, selection of the video barker results in the user being brought to an interaction screen suitable for fulfilling a user's desire to purchase or shop for such goods and/or services (e.g., an advertisement from a store associated with a virtual mall, an advertisement for a restaurant associated with a food coupon retrieval system providing coupons via either virtual or via regular mail after entering a name and address).

Referring now to FIG. 6, the second channel contact object 610-2, which is indicated by the channel indicators 641A and 641B, includes a second title 611B that is associated with the highlighted or emphasized second time slot 605B. In one embodiment of the invention, selecting this title (i.e., pressing a "select" key on a remote control device when the guide regions is active), which is to be presented in the future, results in the user being transferred to a preview screen depicting a preview of the selected title. For example, in the case of the selected title being a television sitcom to be broadcast in, e.g., 20 minutes from the present time, selecting that title results in the user being taken to a preview information screen related to the sitcom. Similarly, in the case of the selected title being a boxing match (or other sporting event), such an event is usually associated with a pre-game show or pre-fight program. this pre-game show or pre-game program may be on one or more channels. Thus, in the case of a sporting event being associated with one or more pre-game or pre-event programs, the user is brought to a screen in which he may select which of these pre-event programs he would like to view. Alternatively, the user is brought to a screen providing information regarding the upcoming fight or sporting event.

When the guide region is active, user manipulations of left or right arrow keys on, e.g., a remote control device, result in a change in the highlighted or emphasized time slot, while user manipulations of up or down arrow keys result in a change in the indicated channel. In the case of a change in time slot or channel indication, the contents of the title description information that is displayed as the program description object 650 are also changed. The guide region becomes inactive and the image region becomes active when the user utilizes the left or right arrow keys to highlight or emphasize an object within the image region (i.e., icons 631-639). The response of the system to various user manipulations will be described in more detail below with respect to FIGS. 8-9.

Referring now to FIG. 6, the guide region of the interactive program guide display 600 (i.e., the video layer provided by the head end) presents to a viewer a tabular representation of available programming on a predefined number of channels (e.g., eight channels) and for a predefined period of time (e.g., 1½ hours) utilizing a "hide and reveal" technique. That is, each of the eight channels displayed (e.g., channels 17-24) is associated with a title for each of the three time slots of interest. By highlighting a particular time slot (via left/right arrow key activation), the appropriate titles within the displayed channels are in turn emphasized.

There are several important considerations that must be understood with respect to the use of interactive electronic program guides by a user. First, it is important to the user that the time and title information is clearly presented in a way that is understandable and without causing undue eyestrain due to, e.g., screen clutter. The invention reduced screen clutter by the use of selective emphasis, including changes in opacity, to de-emphasize title information and/or time information. Moreover, the invention provides a clear and concise presentation of available programming by using the multiple title objects (611A through 611C) in a coordinated fashion with appropriate channel content objects (610-1 through 610-8) and time slot objects (605A through 605C). In this manner, more information may be provided on the screen without a deleterious impact to the subjective viewing quality of the IEPG display.

It should be noted that while the channel content object 610-1 through 610-8 are described as comprising three title objects 611A through 611C, more or fewer title objects may be displayed or provided. Similarly, while three time slot objects 605A-605C are described, more or fewer time slot objects may be utilized. Advantageously, by including more time slot objects or more title objects the total number of video streams needed to represent the program guide is reduced. For example, in a system having 80 channels, ten video PIDs are required to represent respective 8-channel portions of the available channels. Moreover, while the display is shown with 8 channel content objects 610-1 through 610-8, more or fewer channel content objects may be displayed. The embodiments using three time slot objects associated with respective three title objects and within eight channel content objects provide pleasing display imagery on current display devices such as NTSC, PAL, and SECAM television screens. As increased resolution display devices become more readily available, the number of title objects within each channel content object may be increased (thereby increasing the number of time slot objects represented in a single screen) and/or the number of channel content objects may be increased without any significant degradation in display quality.

An important aspect of the invention is the program description object 650. The program description 650 describes information relating to a presently emphasized title of a presently indicated channel. The presently emphasized title is that title associated with a presently emphasized time slot within a presently indicated channel. The combined features of the program description object and the various emphasis and de-emphasis protocols developed with respect to the present invention provide a high quality navigation experience to the interactive electronic program guide viewer.

In a system comprising 80 channels, where channels are displayed in 8-channel groups having associated with them three half hour time slots, it is necessary to provide 10 video streams to carry the present-time channel/time/title information, one audio stream to carry the audio barker and/or a data stream (or other data transport method) to carry the program description data, overlay data and the like. To broadcast program information up to 24 hours in advance, it is necessary to provide 160 (10*24/1.5) video streams, along with one audio and, optionally, one or more data streams. The amount of time provided for in broadcast video streams for the given channel groups comprises the time depth of the program guide, while the number of channels available through the guide (compared to the number of channels in the system) provides the channel depth of the program guide. In a system providing only half of the available channels via broadcast video streams, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours. It should be noted that each video, audio and, optionally, data stream has associated with it a respective PID.

The video streams for the IEPG display may be included as a PES within a single transport stream. Thus, a user desiring to view the next 1½ hour time interval (e.g., 9:30-11:00) may activate a "scroll right" object (or move the joystick to the right when a program within program grid 150 occupies the final displayed time interval). Such activation will result in the controller of the STT noting that a new time interval is desired. The video stream corresponding to the new time interval will then be decoded and displayed. If the corresponding video stream is within the same transport stream (i.e., only a new PID), then the stream will be immediately decoded and presented. If the corresponding video stream is within a different transport stream, then the different transport stream will be extracted from the broadcast stream and the appropriate video stream will be decoded and presented. If the corresponding transport stream is within a different broadcast stream, then the different broadcast stream will be tuned, the different transport stream will be extracted from the different broadcast stream, and the appropriate video stream will be decoded and presented.

Similarly, a user interaction resulting in the selection of a prior time interval or a different set of channels will result in the retrieval and presentation of an appropriate video stream. If the appropriate video stream is not normally part of the broadcast video streams, then a pointcast session is initiated. That is, the STT send a request to the head end via the back channel requesting a particular stream. The head end processes the request, retrieves the appropriate stream, incorporates the stream within a transport stream as a video PID (ideally the transport stream currently being tunes/selected by the STT) and informs the STT which PID should be demultiplexed, and from which transport stream it should be demultiplexed from. The STT then retrieves the appropriate video PID. In the case of the appropriate video PID being within a different transport stream, the STT must first demux the different transport stream (possibly even tuning a different QAM stream within the forward channel).

Upon completion of the viewing of the appropriate stream, the STT indicates to the head end that the STT no longer needs the stream, whereupon the head end tears down the pointcast session. It should be noted that in one embodiment of the invention, the head end causes multiple STTs to "share" a pointcast stream. That is, if a first STT request a video stream that is currently being provided to a second STT, the head end will guide the first STT to the PID and (optionally) transport stream providing the video stream to the second STT. If the second STT indicates to the head end that it is finished viewing the video stream, the head end determines if another STT (i.e., the first STT) is still utilizing the video stream. If the stream is still being utilized, the pointcast session is not torn down (at least not with respect to the STT(s) utilizing the video stream). In this manner, forward channel bandwidth and head end video processing resources are conserved.

The above-described sharing of pointcast streams is especially useful within the IEPG display context where relatively low channel depth and/or time depth is used. In such a case, it is quite likely that several users will want to contemporaneously view information that may be packaged within the same video stream. Thus, an adaptive narrowcast (or group pointcast) system is provided, wherein the head end is able to adapt resource allocation to the sub-set of users exhibiting a coordinated need for information. These adaptive narrowcast sessions are created and torn down as necessary in response to changing user demand. In the event of a very high level of utilization of streams associated with a particular channel group(s) or time slot(s), the head end may determine that the processing, memory, and bandwidth resources required to create, manage, and tear down the narrowcast of such streams is greater than the resources required to simply provide such streams as broadcast streams. In one embodiment of the invention the head end will adapt the depth of the broadcast stream to accommodate the high utilization stream(s). This accommodation does not require the addition of contiguous channel groups or time slots, only the addition of PIDs allocated to the high utilization stream(s).

It is important to note that each extracted IEPG video stream is associated with a common audio stream. Thus, the video/audio barker function of the program guide is continuously provided, regardless of the selected video stream.

FIG. 7A depicts a diagrammatic representation of a multiple program transport stream suitable for use in the interactive information distribution system of FIG. 4. Specifically, FIG. 7A depicts a diagrammatic representation of a system stream 710 and a transport stream 720.

The system stream 710 comprises, illustratively, a quadrature amplitude modulation (QAM) system stream conveyed by a forward channel within the DIVA system. Specifically, the system stream 710 comprises a plurality of transport streams, including transport streams A-H (711-718). Each of the transport streams includes at least one video stream, one audio stream and, optionally, one or more data elementary streams or packetized elementary streams (PES). Each elementary stream within the system stream 710 has associated with it a unique packet identification (PID) number.

The transport stream 720 depicts an exemplary plurality of elementary streams associated with a first transport stream 711 (denoted as stream A) and a second transport stream 712 (denoted as stream B). Specifically, first transport stream 711 (i.e., stream A) comprises five elementary streams (721-725), each of which has associated with it a respective PID. The five elementary streams (721-725) of stream A are used to provide video, audio, and graphics/data information to a set top terminal such that the set top terminal is capable of producing, via a display device, an IEPG display such as described above with respect to FIG. 1 or 6. The utilization of the transport stream 720 will now be discussed with respect to FIG. 7B.

In an exemplary embodiment of the invention, the system stream 710 comprises a constant bitrate stream having a bitrate of 3.37125 million bits per second (Mbps), each video PES has a bitrate of 1.05 Mbps, each audio PES has a bitrate of 192 Kbps (44.1 kHz audio) or 224 Kbps (44 kHz audio) while the remaining bandwidth is utilized by data streams, overhead and the like. It will be appreciated by those skilled in the art that the bitrate of any of these streams may be adapted to, e.g., provide minimum video and/or audio quality levels, provide maximum video and/or audio quality levels, to provide for a maximum number of video and/or audio elementary streams within a transport stream and other system design criteria. The exemplary bitrates are only provided to give a sense of the bandwidth utilization of a system utilizing the teachings of the invention. The actual bitrates will increase or decrease as the system is upgraded and the like.

FIGS. 7B through 7E depict respective tabular representations of exemplary utilizations of a single program transport stream providing program guide information and suitable for use in the multiple program transport stream of FIG. 7A. Specifically, each of the disclosed data structures provides one or more video streams for carrying image guide and image region image information. The IEPG displays may be provided entirely in a single transport stream (FIG. 7E), in individual transport streams (FIG. 7D), in groups within transport streams (FIG. 7A), and in overlapping groups within transport streams (FIG. 7B). Each of the data structures described in FIGS. 7A-7D may be readily produced using the server-side or head end apparatus described above with respect to FIG. 4.

FIG. 7D depicts a tabular representation of an exemplary utilization of a pair of single program transport streams providing program guide information and suitable for use in the multiple program transport stream of FIG. 7A. Specifically, FIG. 7D depicts a tabular representation 700D of a single program data structure for carrying program guide information. That is, each of the single program transport streams (A-H) of the multi-program transport stream 710 comprises a single video PID, a single audio PID and, optionally, a data PID. Thus, a single program transport stream is required for each video PID. As previously noted, the information normally included within the data PID may be included within, e.g., a private data field or other location within the included video stream or audio stream.

Referring now to the tabular representation 700D of FIG. 7D, a first single program transport stream A comprises a video stream having associated with it a PID of 1 that contains IPG display screen image data related to channels 1-8; an audio stream having associated with it a PID of 2 that contains an audio track or audio barker for the video barker 120 of FIG. 1 or 620 of FIG. 6; and a data stream including overlay information, program or title description information or other information suitable for providing the IPG functionality. Similarly, a second a single program transport stream B comprises a video stream having associated with it a PID of 4 that contains IPG display screen image data related to channels 9-16; an audio stream having associated with it a PID of 5 that contains the same audio track or audio barker contained in the first single program transport stream A; and a data stream associated with channels 9-16 (including overlay information, program or title description information or other information suitable for providing the IPG functionality).

FIG. 7E depicts a tabular representation of an exemplary utilization of a single program transport stream providing program guide information and suitable for use in the multiple program transport stream of FIG. 7A. The data structure of FIG. 7E is denoted by the inventor as a "super-ganging" data structure. Specifically, FIG. 7E depicts a tabular representation 700E of a multiple program data structure for carrying all of the program guide information. That is, one of the single program transport streams (A-H) of the multi-program transport stream 710 is used to provide the necessary video PIDs to contain all of the IEPG displays to be provided in broadcast mode.

Referring now to the tabular representation 700E of FIG. 7E, a single program transport stream A comprises N video streams, each of the N video streams being associated with a respective PID and containing IPG display screen image data related to a respective channel group (illustratively an eight channel group); an audio stream having associated with it a PID of N+1; and a data stream having associated with it a PID of N+2.

Advantageously, the "super-ganging" data structure provides for the most rapid changes between video PIDs, since each video PID is within the same transport stream.

FIG. 7B depicts a tabular representation of an exemplary utilization of a pair of single program transport streams providing program guide information and suitable for use in the multiple program transport stream of FIG. 7A. The data structure of FIG. 7B is denoted by the inventor as a "ganging" data structure. Specifically, FIG. 7B depicts a tabular representation 700B of a multiple program data structure wherein each transport stream comprises a respective plurality of program guide information. That is, two or more of the single program transport streams (A-H) of the multi-program transport stream 710 are used to provide the necessary video PIDs to contain all of the IEPG displays to be provided in broadcast mode.

Referring now to the tabular representation 700B of FIG. 7B, each of a first A and second B single program transport stream comprises three respective video streams, with each of the three video streams being associated with a respective PID and containing IPG display screen image data related to a respective channel group (illustratively an eight channel group); a respective audio stream having associated with it a respective PID; and a respective data stream having associated with it a respective PID.

Advantageously, the "ganging" data structure provides for rapid changes between video PIDs, where the video PID to be selected is within the same transport stream as the video PID presently selected. Moreover, the "ganging" data structure allows for the construction of relatively small transport streams, compared to the "super-ganging" structure described above with respect to FIG. 7E.

FIG. 7C depicts a tabular representation of an exemplary utilization of a number of single program transport streams providing program guide information and suitable for use in the multiple program transport stream of FIG. 7A. The data structure of FIG. 7C is denoted by the inventor as an "overlapping ganging" data structure. Specifically, FIG. 7C depicts a variation of the data structure described above with respect to FIG. 7B. In the data structure of FIG. 7C, each single program transport stream (A-H) comprises at least one video PID that contains an IPG display of a channel group that duplicates the contents of a video PID found in another single program transport stream. By contrast, the data structure of FIG. 7B does not duplicate the IPG display of a channel group. The "overlapping ganging" structure utilizes a multiple program data structure wherein each transport stream comprises a plurality of program guide information, including overlapping program guide information. That is, two or more of the single program transport streams (A-H) of the multi-program transport stream 710 are used to provide the necessary video PIDs to contain all of the IEPG displays to be provided in broadcast mode.

Referring now to the tabular representation 700C of FIG. 7C, each of a first A, second B, and third C single program transport streams comprise three respective video streams, with each of the three video streams being associated with a respective PID and containing IPG display screen image data related to a channel group (illustratively an eight channel group); a respective audio stream having associated with it a PID of 4; and a respective data stream having associated with it a PID of 5.

Referring to the second B single program transport stream, the first video PID contains channel group 9-16, the second video PID contains channel group 17-24, and the third video PID contains channel group 25-32. Note that the first video PID of the second B single program transport stream contains the same channel group as the third video PID of first A single program transport stream; and that the third video PID of the second B single program transport stream contains the same channel group as the first video PID of third C single program transport stream.

Advantageously, the "overlapping ganging" data structure provides for rapid changes between video PIDs, where the video PID to be selected is within the same transport stream as the video PID presently selected. Additionally, since the contents of the first and/or last video PIDs are included within two transport streams, the STT can utilize stream priming methods to select the second transport stream and transition the user to viewing the same IEPG display, but derived form a video stream within the second transport stream. Stream priming comprises requesting that the head-end delivers a stream prior to, or in anticipation of, the need for the stream by a set top terminal, as will be discussed below. In this manner, delays experienced by the user of the STT in changing from one transport stream to another are reduced, since the change is actually executed as a background process. Thus, the use of the "overlapping ganging" data structure and the stream priming technique provides most of the advantages of the "super-ganging" structure, but without the use of very large transport streams.

While the ganged 700B and overlapping 700C data structures are depicted as including only three video streams, each of these data structures may include more or fewer video streams. In one embodiment of the invention, each of the single program transport stream (A-H) comprises 10 video PIDs. In the case of the overlapping 700C data structure, the first video PID of each stream contains the same channel group as the last video PID of the preceding stream. Similarly, the last video PID of each stream contains the same channel group as the first video PID of the next stream. The terms "preceding" and "next" within this context indicate streams that carry contiguous EIPG display information, in either a channel-sense (e.g., adjoining channel groups) or a time slot sense (e.g., adjoining time slots).

An important aspect to the invention is the "stream priming" aspect. Stream priming is a method of anticipating that a particular stream will be required and requesting that stream prior to the actual need for that stream. For example, where a user receiving a pointcast IEPG stream has traversed to within a threshold level of the upper or lower channel or time slots displayed, it is likely that the user will continue past the channel or time slot boundaries of the IEPG display. In this case, when the user reaches the threshold level, the STT sends a request for the appropriate next stream to the head end of the system. The head end processes the request and begins delivering the appropriate stream. In the case of the appropriate stream being delivered via the same transport stream currently being demultiplexed by the STT (a preferred embodiment), the STT simply selects the PID of the appropriate stream when the user exceeds the upper or lower channel or time slots displayed. In this manner, the latency inherent in requesting and receiving the appropriate stream is greatly reduced.

The first video stream (PID 1) comprises all the information necessary to produce a video layer for the IEPG display 600 of FIG. 6, including channel content objects 610-1 through 610-8 associated with channels 1-8 for a defined time period. The second video stream (PID 2) and third video stream (PID 3) differ from the first video stream (PID 1) in that the second video stream (PID 2) and third video stream (PID 3) comprise the information necessary to produce a video layer including channel content objects 610-1 through 610-8 associated with, respectively, channels 9-16 and channels 17-24.

The audio stream (PID 4) comprises the audio information necessary to produce the audio barker associated with the video barker 620 (e.g., the voice-over of a movie trailer displayed within the video barker 620 of the image region of the display.

The data/graphics stream (PID 5) comprises the title description information that is displayed as the program description object 650. That is, data/graphics stream (PID 5) comprises a textual description of each title provided by channels 1-8 for each of the displayed time slots (e.g., three half hour slots). The textual description of the titles is processed by the graphics processing elements of the STT such that the textual description of a presently highlighted or emphasized title of an indicated channel is presented to a viewer via the graphics layer of the IEPG display 600 of FIG. 6.

It is important to note that graphics and/or data information may be conveyed to a set top terminal using a data stream associated with a unique PID (as depicted here), as private data within the adaptation headers of the transports stream packets, or by other means (e.g., encoded within the video data using, e.g., watermarking techniques). Moreover, since the data stream is used to convey program identification data or other data that does not need to be provided in real time, such data may be used to build a local database of, e.g., favorite programming and the like. However, the favorite programming database does not comprise a program guide database. Rather, the favorite programming database comprises sufficient information to identify the favorite program or title, illustratively, the transport stream and video PID providing the appropriate channel group, an index into the channel group (e.g., third channel from start), an index into the time slots (e.g., second time slot) and the like. There is no need to store the actual title of the program, only to determine which titles should be highlighted or emphasized in a favorite viewing mode.

Referring now to FIG. 7B, transport stream A comprises three video PES streams having respective PID values or 1, 2, and 3. Each video PES includes video information for providing the video layer of a program guide display, such as depicted above with respect to FIGS. 1 and 6. Each video PES stream has associated with it the channel guide information of a respective plurality of channels. Within the context of the program guide display of FIG. 1, each video PES includes channel guide information associated with a respective 10 channels arranged according to the grid display described above with respect to FIG. 1. Within the context of the program guide display of FIG. 6, each video PES includes channel guide information associated with a respective 8 channels arranged according to the mask and reveal display described above with respect to FIG. 6.

Figure 8A:
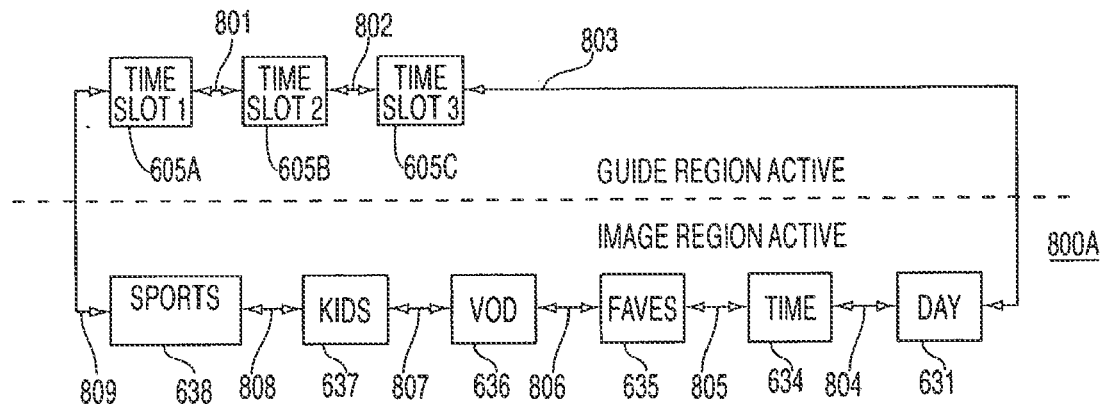

FIG. 8A depicts a contextual flow diagram useful in understanding the invention. Specifically, the contextual flow diagram 800A of FIG. 8A depicts changes in the contextual flow of the IEPG display screen 600 in response to horizontal increment and decrement (right/left) commands, such as right arrow and left arrow key activations from, e.g., a remote control. Each of the objects depicted in the contextual flow diagram comprises a video object having associated with it a graphics object or overlay providing emphasis to indicate an active (i.e., selectable) object or de-emphasis to indicate a non-active object (i.e., non-selectable).

The objects depicted in the contextual flow diagram 800A of FIG. 8A comprise a subset of the objects depicted in the IEPG display screen 600 of FIG. 6. Specifically, the objects depicted in the contextual flow diagram 800A of FIG. 8A comprise, in the order of emphasis in response to a right arrow or horizontal increment: the first 605A, second 605B and third 605C time slot objects of the IPG display screen guide region. These objects are followed by the following IPG display screen image region objects: day of week identification object 631, next time slot object 634, "favorites" filter object 635, "movies" filter or video on demand (VOD) selection object 636, a "kids" filter or VOD selection object 637, and "sports" filter or VOD selection object 638. It should be noted that while the objects depicted in the contextual flow diagram 800A comprise objects depicted in the IEPG display screen 600, the IEPG display 100 of FIG. 1 and other IPG display screens may be adapted accordingly.

For purposes of this discussion it will be assumed that the first object to be highlighted or emphasized is the first time slot object 605A. Referring now to FIG. 8A, in response to a first right arrow or horizontal increment 801, the first time slot object 605A is de-emphasized and the second time slot object 605B is emphasized; in response to a second right arrow or horizontal increment 802, the second time slot object 605B is de-emphasized and the third time slot object 605C is emphasized; in response to a third right arrow or horizontal increment 803, the third time slot object 605C is de-emphasized and the day of week identification object 631 is emphasized, and so on for the (804) next time slot object 634; (805) "favorites" object 635; (806) "movies" selection object 636; (807) "kids" selection object 637; (808) "sports" selection object 638, and, finally, the (809) first time slot object 605A.

The graphical depiction of FIG. 8A is divided into those objects associated with an active guide region (the three time slots 605A-605C) and those objects associated with an active image region (the remaining objects 631-638). This delineation is used to determine the functionality of vertical increment (up arrow), vertical decrement (down arrow), page up, and "page down" keys. The differences between guide region and image region key functionality will be discussed in more detail below with respect to FIGS. 8B and 9A (guide region functionality) and FIGS. 8C and 9B (image region functionality).

When the guide region is active (any of objects 605A-605C emphasized), the up and down arrow keys are used to scroll through the various portions of the guide region. That is, the presently indicated (via channel indicator objects 641A and/or 641B) channel content object (610-1 through 610-8) is changed by one (i.e., incremented or decremented) in response to up arrow or down arrow activation. Similarly, the displayed video stream is changed (via selecting the next or prior video PID) in response to page up or "page down"

key activation. Thus, active guide region functionality provides for navigation of the various video streams providing broadcast IPG screens to a user.

When the image region is active (any of objects 631-638 emphasized), the up and down arrow keys are used to adjust the presently indicated next time slot object 634, while the page up and "page down" keys are used to adjust the day of week identification object 631. Specifically in response to an up arrow key activation, the presently indicated next time slot object 634 is incremented by, e.g., 1½ hours by selecting the video PID including the guide information for the next three time slots of the current channels presented in the guide region. Similarly, in response to a "page up" key activation, the presently indicated day of week identification object 631 is incremented by one day by selecting the video PID including the guide information for the next day of the current channels presented in the guide region.

In the case of a "deep time depth" broadcast of guide information (i.e., broadcast of present, future and/or past guide information on appropriate video streams), the broadcast video PID including the appropriate guide screen is selected. If such a broadcast video PID is not available, then the STT makes a request for such a stream via the back channel (i.e., a pointcast mode is entered). Upon tuning and/or demultiplexing the transport stream including the requested pointcast or narrowcast video PID, the requested video PID is selected and, if necessary, a different audio stream and data stream is selected.

Figures 8B, 8C:
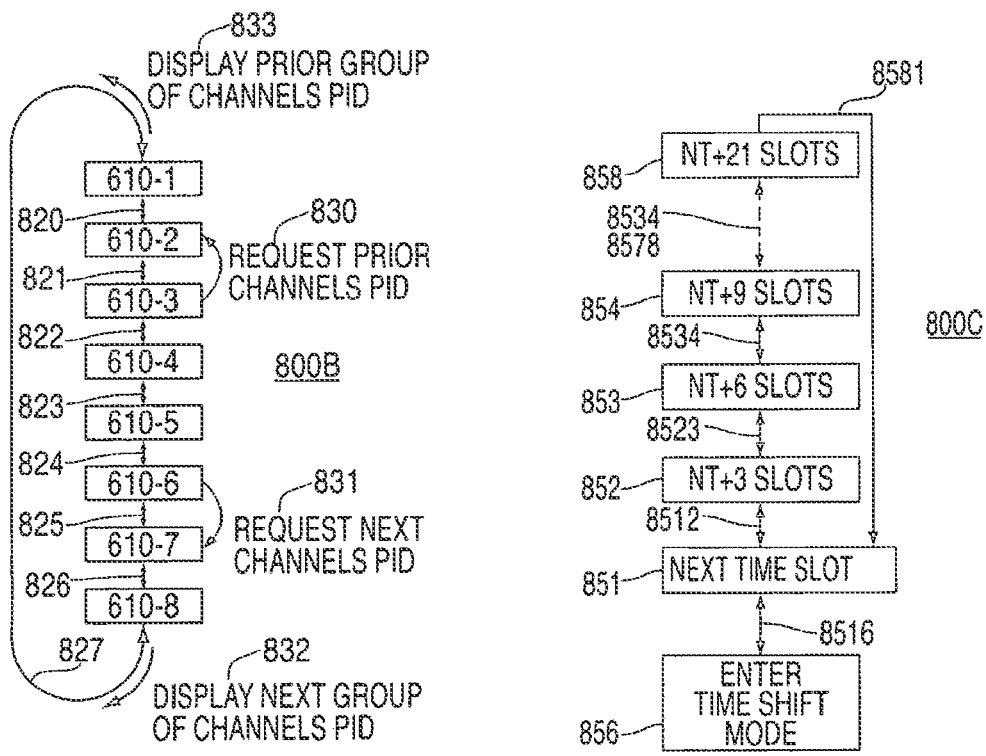

FIG. 8B depicts a contextual flow diagram useful in understanding the invention. Specifically, the contextual flow diagram 800B of FIG. 8B depicts changes in the contextual flow of the IEPG display screen 600 in response to vertical increment and decrement (up/down) commands received while a guide region object is highlighted or emphasized.

The objects depicted in the contextual flow diagram 800B of FIG. 8B comprise a subset of the objects depicted in the IEPG display screen 600 of FIG. 6. Specifically, the objects depicted in the contextual flow diagram 800B of FIG. 8B comprise the channel content objects 610-1 through 610-8 as indicated by the channel indicator objects 641A and/or 641B. In response to successive down arrow or vertical "decrement" key activations, the indicated channel content object traverses from 610-1 to 610-2 (820); 610-2 to 610-3 (821); 610-3 to 610-4 (822); 610-4 to 610-5 (823); 610-5 to 610-6 (824); 610-6 to 610-7 (825), and 610-7 to 610-8 (826). Similarly, activating an up arrow or vertical "increment" key changes the indicated channel in the reverse manner.

In response to a down arrow activation while channel object 610-8 is indicated, the "next" video PID is selected for display. That is, the video PID containing the next eight channels to be displayed for the currently viewed time slot is selected. If the last eight channels are presently being displayed, than the video PID associated with the first eight channels is selected (i.e., channel "roll-over"). In the case of the "next" video PID being part of a different transport stream (i.e., a "next" transport stream), it is first necessary to tune and/or decode the next transport stream to extract (i.e., demultiplex) the appropriate video PID and the associated audio and data PIDs.

In response to an up arrow activation while channel object 610-1 is indicated, the "prior" video PID is selected for display. That is, the video PID containing the prior eight channels to be displayed for the currently viewed time slot is selected. If the first eight channels are presently being displayed, than the video PID associated with the last eight channels is selected (i.e., channel "roll-under"). In the case of the "prior" video PID being part of a different transport stream (i.e., a "prior" transport stream), it is first necessary to tune and/or decode the next transport stream to extract (i.e., demultiplex) the appropriate video PID and the associated audio and data PIDs.

If the system is in a pointcast mode when the need to change the displayed channel arises, then the issue of latency must be addressed. Specifically, to receive a pointcast PID, it is first necessary to request such a PID from the head end of the system. Ideally, the requested PID will be conveyed to the requesting STT via the same transport stream presently being tuned and demultiplexed by the requesting STT. In one embodiment of the invention, the head end will adjust, e.g., the program map table (PMT) or program association table (PAT) of the transport stream including the requested PID such that the STT may determine which video PID (and possibly which audio and data PIDs) should be selected to realize the channel roll-over or roll-under function (i.e., select receive and display another stream).

To reduce latency in requesting a PID during pointcast or narrowcast mode, the STT optionally issues a request prior to the traversal of the first 610-1 or last 610-8 channel content object. Specifically, FIG. 8B depicts the requesting 831 of a next channel PID contemporaneous to the indicated channel content object traversal of 610-6 to 610-7 (825); and the requesting 830 of a prior channel PID contemporaneous to the indicated channel content object traversal of 610-3 to 610-2 (821). Thus, when the actual roll-over 827 or roll-under 827 channel content object traversal is desired, the appropriate next or prior video PID is likely to be readily available, thereby masking the latency in procuring the video PID during the pointcast or narrowcast mode. The above-described latency masking technique allows more rapid acquisition of an appropriate next or prior PID at the expense of providing multiple PIDs to a single STT.

FIG. 8C depicts a contextual flow diagram useful in understanding the invention. Specifically, the contextual flow diagram 800C of FIG. 8C depicts changes in the contextual flow of the IEPG display screen 600 in response to vertical increment and decrement (up/down) commands received while an image region object is highlighted or emphasized.

The object depicted in the contextual flow diagram 800C of FIG. 8C comprises the next time slot object 634 depicted in the IEPG display screen 600 of FIG. 6. Specifically, when an image region object is activated, the next time slot object 634 is incremented or decremented in response to, respectively, an up arrow or vertical "increment" key activation and a down arrow or vertical "decrement" key activation. In the exemplary embodiment, the next time slot object 634 is delineated in 1½ hours intervals (i.e., the time slot following the three time slots 605A, 605B and 605C of the guide region) for a 24-hour period.

In one embodiment of the invention, the operations described in the contextual flow diagram shown in FIG. 8C only occur if the next time slot object 634 or a combined object comprising the day object 631 and next time slot object 634 are highlighted or emphasized. In another embodiment of the invention, the operations described in the contextual flow diagram shown in FIG. 8C occur when any image regions object is highlighted or emphasized.

In response to successive up arrow or vertical "increment" key activations, the indicated next time slot object traverses from the actual (with respect to the present time) next time slot (851) to a next time slot+3 (852) via path 8512; a next time slot+6 (853) via path 8523; a next time slot+9 (854) via path 8534, and so on up to a next time slot+21 (858) via path

8578. An additional up arrow or vertical "increment" key activation results, in the present embodiment, in a return to the next time slot (851) via path 8581. Similarly, activating a down arrow or vertical "decrement" key changes the indicated next time slot object in the reverse manner, except for one case. Specifically, in the case of activating a down arrow or vertical "decrement" key when the next time slot (851) is indicated, the system enters a time shift mode 856 via path 8516.

The time shift mode 856 comprises the retrieval, via pointcast, of video PID associated with programming that has already been presented. That is, the time shift mode comprises a mode of retrieving previously broadcasted programming, such as network programming, sporting events and the like. Upon entering this mode, the STT user interacts with the server to arrange for the selection and/or payment of such time shifted programming material. It is noted that the programming guide information associated with time-shifted material may be incomplete due to business-related restrictions on time shifting or "second broadcast" programming. However, in the case where the head end of the system records all the contents of each channel for a predefined period of time (e.g., 2 weeks), the title and prior presentation time of the recorded programming material are viewed and selected using the IPG screens of the present invention.

FIG. 9A depicts a contextual flow diagram useful in understanding the invention. Specifically, the contextual flow diagram 900A of FIG. 9A depicts changes in the contextual flow of the IEPG display screen 600 in response to page up and page down commands received while an object within the image region is highlighted or emphasized.

The changes in contextual flow of the contextual flow diagram 900A of FIG. 9A comprise the selection of a video PID including the presently viewed time slots of channels prior to (page up) or after (page down) the channels of the presently selected video PID, when a guide region object is activated.

In response to successive "page up" key activations, the following traversals are made: from a present group of channels PID 901 to a prior group of channels PID 902 via path 9012, from the prior group of channels PID 902 to the second prior group of channels PID (not shown) and so on up to the first group of channels PID 903 via path 9023. Further in response to successive "page up" key activations, the following traversals are made: from the first group of channels PID 903 to a last group of channels PID 904 via path 9034, from the last group of channels PID 904 to a second from last prior group of channels PID (not shown) and so on up to a next group of channels PID 905 via path 9045, and from the next group of channels PID 905 to the present group of channels PID 901 via path 9051.

In response to successive "page down" key activations, the following traversals are made: from the present group of channels PID 901 to the next group of channels PID 905 via path 9051, from the next group of channels PID 905 to the second next group of channels PID (not shown) and so on up to the last group of channels PID 904 via path 9045. Further in response to successive "page down" key activations, the following traversals are made: from the last group of channels PID 904 to the first group of channels PID 903 via path 9034, from the first group of channels PID 903 to a second group of channels PID (not shown), and so on up to the prior group of channels PID 902 via path 9023, and from the prior group of channels PID 902 to the present group of channels PID 901 via path 9012.

In one embodiment of the invention, changing PIDs will yield a guide image in which either the corresponding channel content object, the first channel content object, the last channel content object, or a predetermined channel content object is indicated.

FIG. 9B depicts a contextual flow diagram useful in understanding the invention. Specifically, the contextual flow diagram 900B of FIG. 9B depicts changes in the contextual flow of the IEPG display screen 600 in response to page up and page down commands received while an image region object is highlighted or emphasized.

The changes in contextual flow of the contextual flow diagram 900B of FIG. 9B comprise the selection of a video PID including the presently viewed time slots of the presently viewed group of channels one day in advance of (page up) or one day prior to (page down) the channels of the presently selected video PID, when a guide region object is activated.

In one embodiment of the invention, the operations described in the contextual flow diagram shown in FIG. 9B only occur if the day object 631 or a combined object comprising the day object 631 and next time slot object 634 is highlighted or emphasized. In another embodiment of the invention, the operations described in the contextual flow diagram shown in FIG. 9B occur when any image regions object is highlighted or emphasized.

In response to successive "page up" key activations, the following traversals are made: from a present day PID 921 to a next day PID 922 via path 9212; from the next day PID 922 to a second next day PID 923 via path 9223, and so on up to a week ahead PID 924 via a path 9234, and from the week ahead PID 924 to the present day PID 921.

In response to successive "page down" key activations, the following traversals are made: from the week ahead PID 924 to a week ahead minus one day PID (not shown), and so on to the next day PID 922 via paths 9234 and 9223, and to the present day PID 921 via paths 9212. In the case of a "page down" key activation when the present day PID object is highlighted, the system enters the time shift mode described above via path 9251. Within the time shift mode 925, page up and "page down" keys may be used to reach back in time to the extent allowed by the system, based upon the amount of programming recorded for subsequent re-presentation to the user.

FIG. 10 depicts a tabular representation of the functions of various keys during guide region and image region operation. The functions of some of the depicted keys have been described above and, therefore, will not be additionally discussed. Specifically, FIG. 10 depicts the guide region and image region functionality of the increment (up arrow), decrement (down arrow), page up, page down, horizontal increment (move right), horizontal decrement (move left), select, and add/remove keys. The Select key is used to select a highlighted or emphasized object to, e.g., enter a different operating mode (image region response) of tune an indicated channel (guide region response). The add/remove key is used to add a presently tuned channel to the list of favorites. If the presently tuned channel is already on the list, then the channel is removed form the list of favorites. Optionally, the viewer is queried as to whether the viewer really intends to remove the channel from the favorites list.

FIGS. 11A-11C, 12A-12C, 13, and 14 depict respective display screens of interactive electronic program guide (IEPG) displays useful in understanding the invention. These IEPG displays are similar to the IEPG display 600 depicted above with respect to FIG. 6. The IEPG displays of FIGS. 11-14 depict different aspects of the invention, including variations of a "hide and reveal" aspect of the present invention.

Figure 11A:
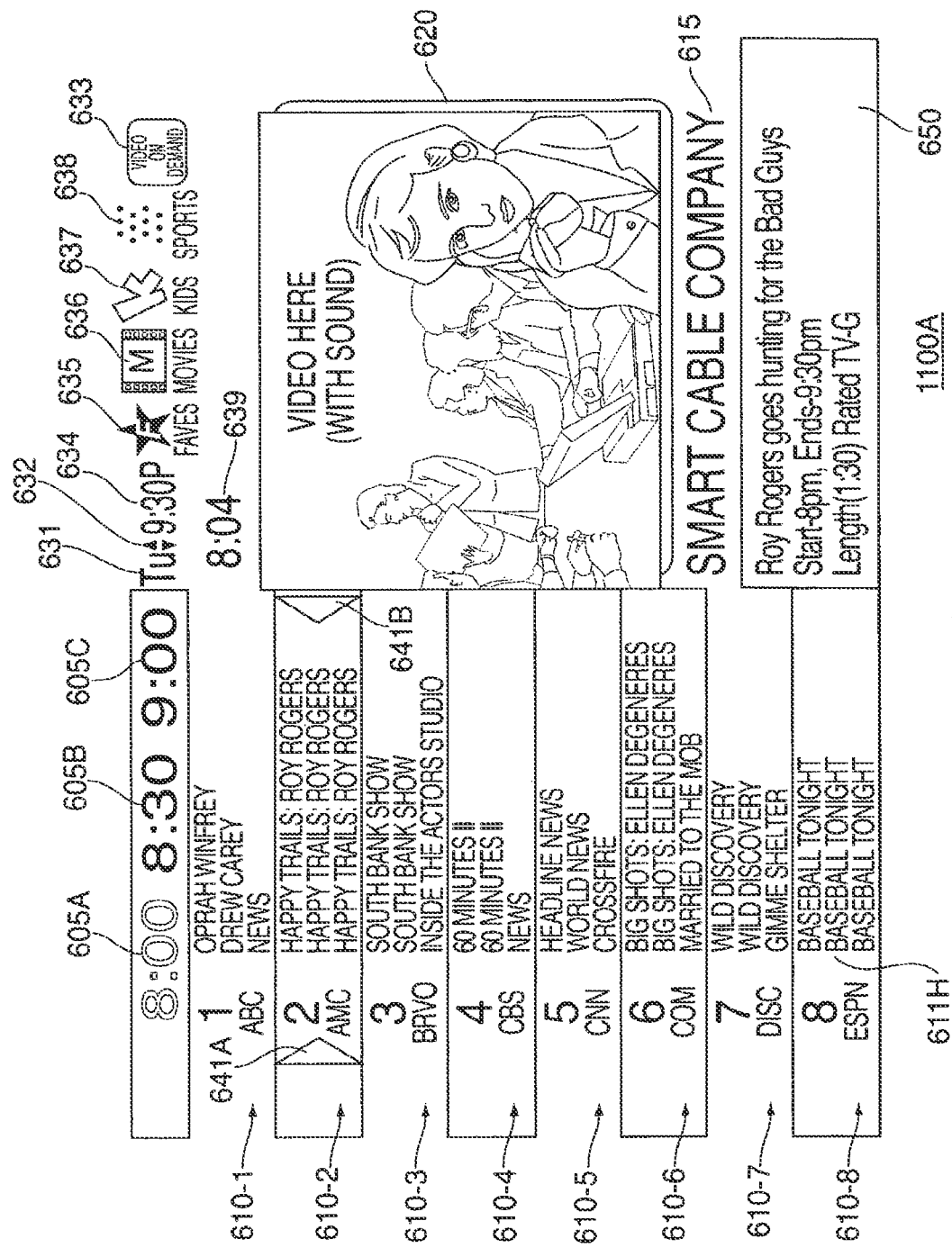

Referring to FIG. 11A, the IEPG display 1100A of FIG. 11A comprises a first 605A, second 605B and third 605C time slot object, a plurality of channel content objects 610-1 through 610-8, a pair of channel indicator objects 641A and 641B, a video barker 620 (and associated audio barker), a cable system or provider logo 615, a program description object 650, a day of week identification 631, a time of day object 639, a next time slot object 634, a temporal increment/decrement object 632, a "favorite" filter or selection object 635, a "movies" filter or selection object 636, a "kids" filter or selection object 637, a "sports" filter or selection object 638, and a video on demand (VOD) selection object 633.

To simplify the discussion, the various reference designators used to describe elements of FIG. 11A will generally not be replicated in FIGS. 11B-14. However, a textual reference to a reference designator within one of FIGS. 11A-14 should be interpreted as a textual reference to the element of the one figure corresponding to the element so designated within FIG. 11A.

With the exception of the separate video on demand object 633, the IEPG display 1100A of FIG. 11A is substantially the same as the IEPG display 600 of FIG. 6. The primary difference between the display screens 1100A and 600 of FIGS. 11A and 6, respectively, are as follows. First, in the IEPG display 1100 of FIG. 11A, the first time slot 605A is emphasized in that this time slot is depicted as a light or high intensity object, while the second 605B and third 605C time slot objects are depicted as low intensity objects. Additionally, the first title object 611A of each of the channel content objects 610-1 through 610-8 is emphasized in that each of these objects is presented in a full intensity color (illustratively black) while the second 611B and third 611C title objects are presented in a muted intensity color. In the IEPG display 1100A of FIG. 11A, the muted intensity is achieved in the previously described manner by, e.g., adapting the opacity of the graphic layer to, e.g., 25%, 50% or 75% opacity, while the emphasized objects retain 0% opacity (i.e., no reduction in brightness).

Figure 11B:
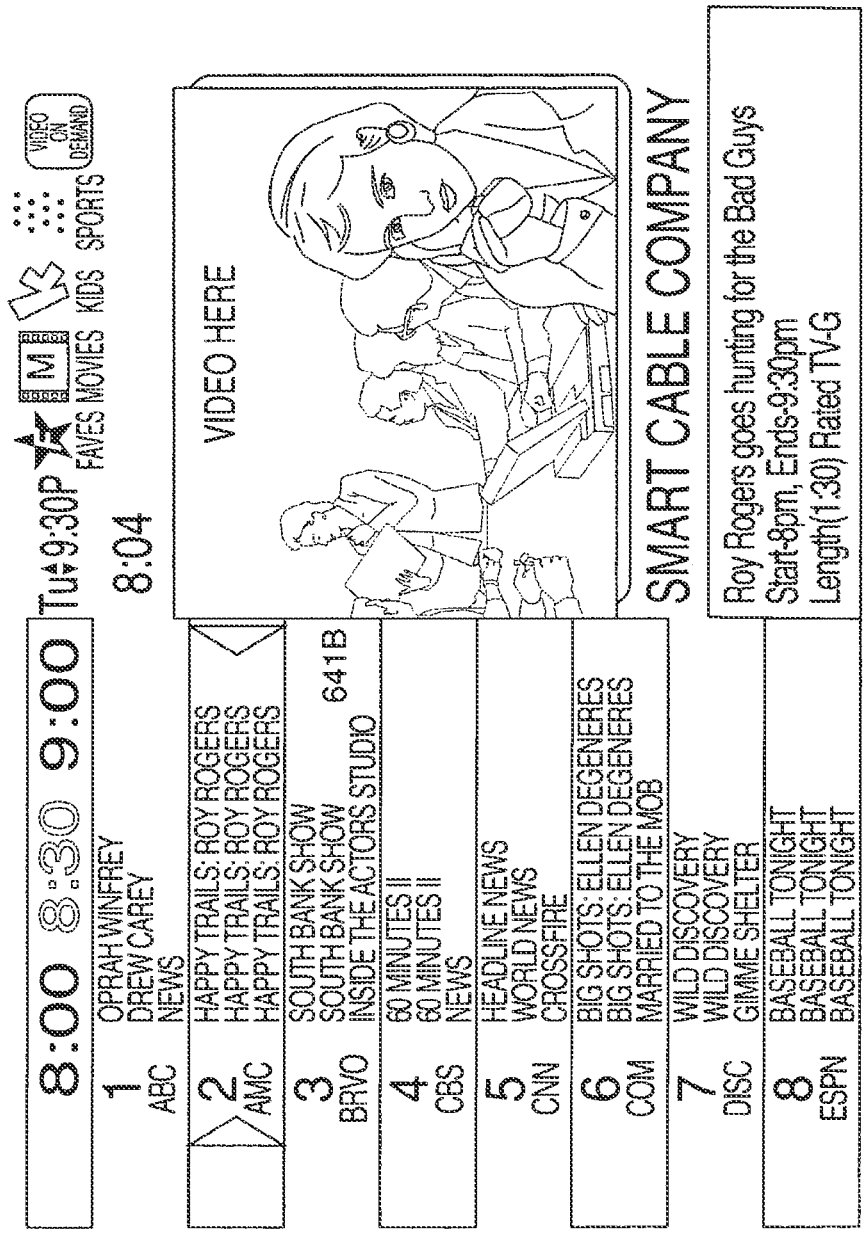
Figure 11C:
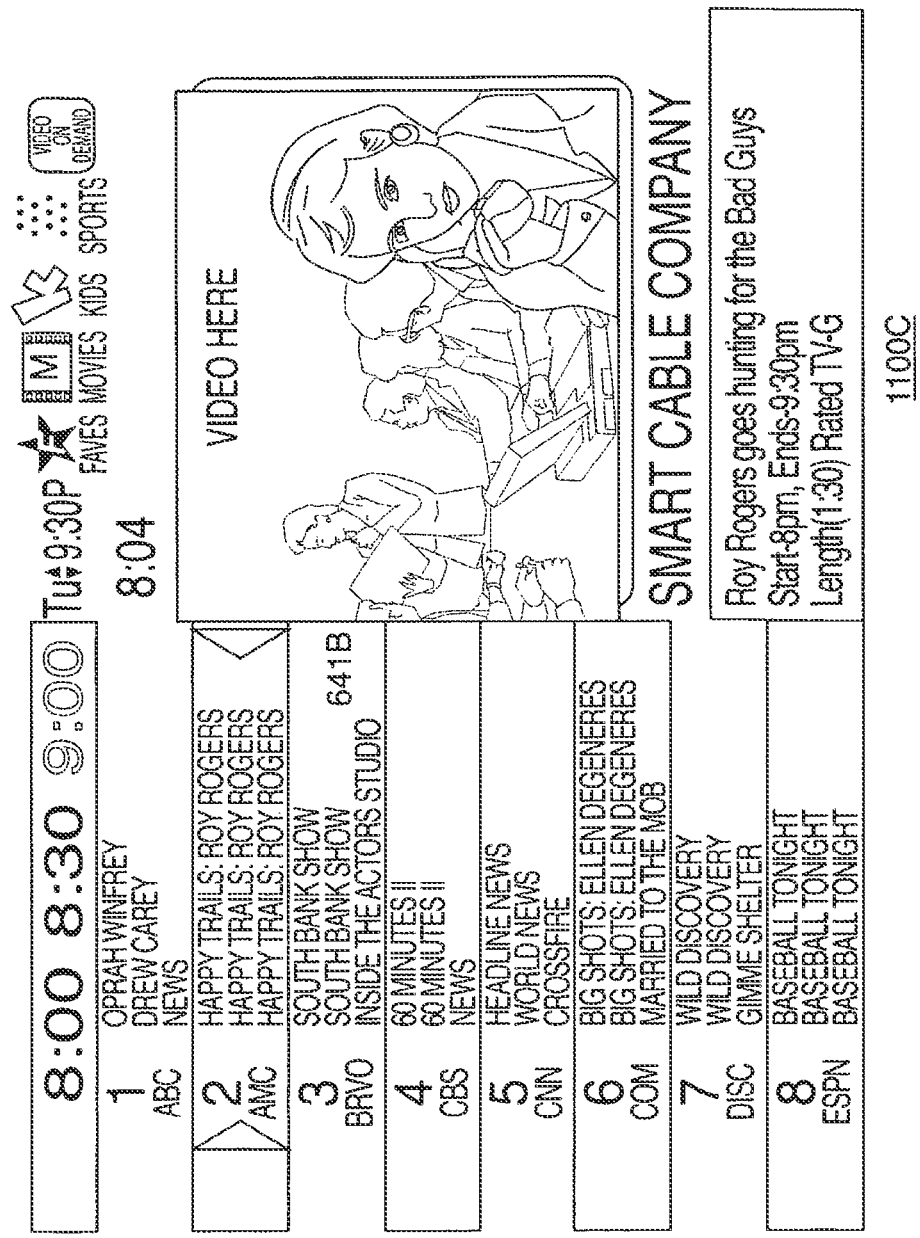

The difference between the various IEPG displays depicted in FIGS. 11A through 14 will now be described. FIGS. 11A through 11C depict program guide display screens 1100A through 1100C in which the opacity of the title object to be emphasized is set to 0%, while the opacity of the title objects to be de-emphasized is set to 75%, 50%, 25% or some other percentage suitable for providing a visual demarcation to the viewer.

Referring to FIGS. 11A-11C, it can be seen that the first time slot 605A is highlighted in a display screen 1100A of FIG. 11A, the second time slot 605B is highlighted in the display screen 1100B of FIG. 11B, and the third time slot 605C is highlighted in the display screen 1100C of FIG. 11C. In this manner, a viewer navigating the program guide is presented with a clear emphasis on the time slot and channel corresponding to an emphasized title object that is associated with the information within the title description object 650.

Figure 12A:
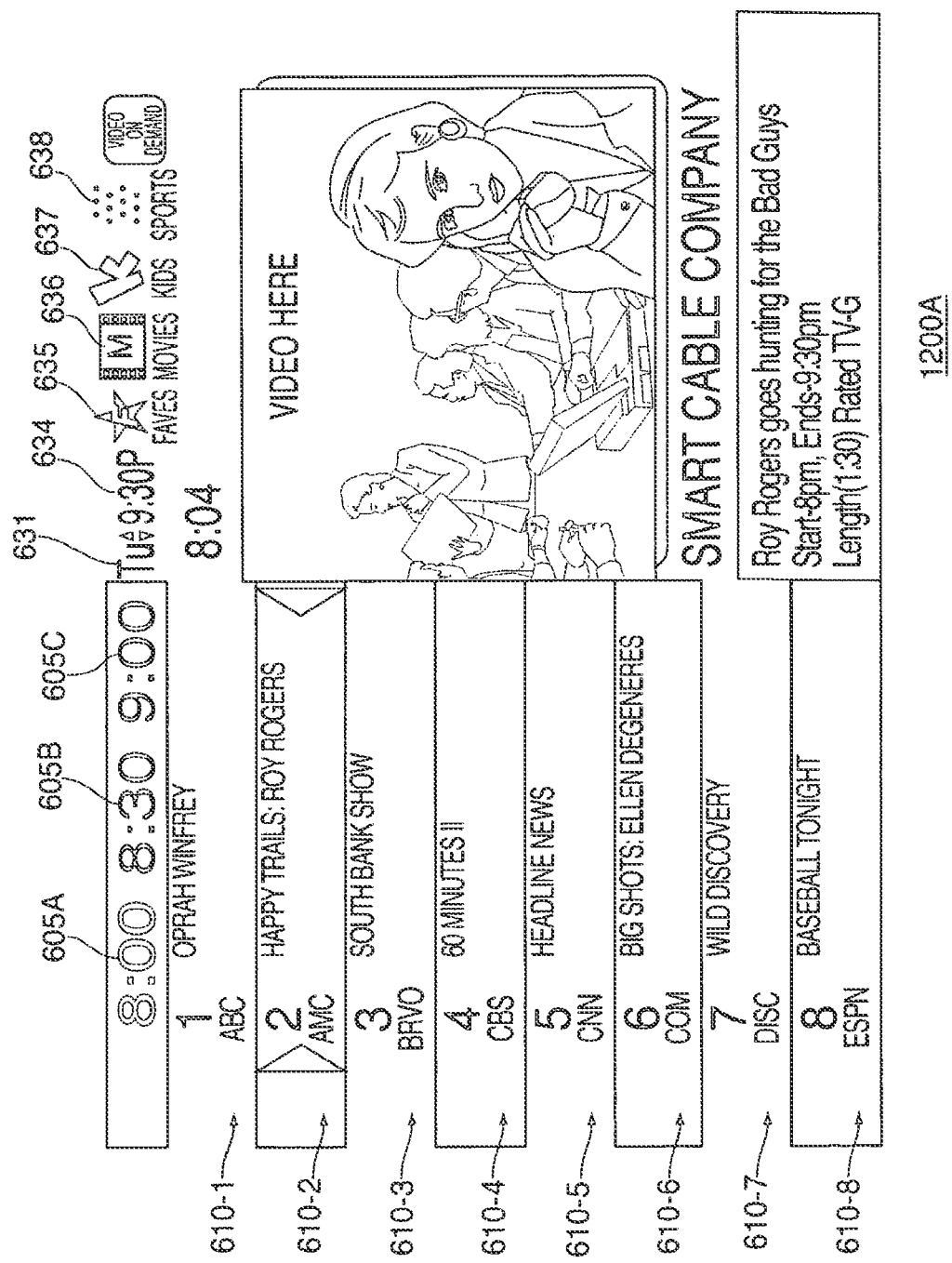

Referring now to FIG. 12A, it is noted that the first time slot 605A is emphasized and that only the first title object 611A within each of the channel content objects 610 is shown. That is, only the title object associated with the emphasized time slot is "revealed," while the title objects associated with the non-emphasized time slots are "hidden." This "hide and reveal" method of presentation provides an IEPG display that some people find more desirable than the previously described (with respect to FIGS. 11A through 11C) muting or reduced opacity de-emphasis method of presentation. However, the muting or reduced opacity de-emphasis method of presentation does present more information to the viewer in each IEPG display.

Figure 12C:
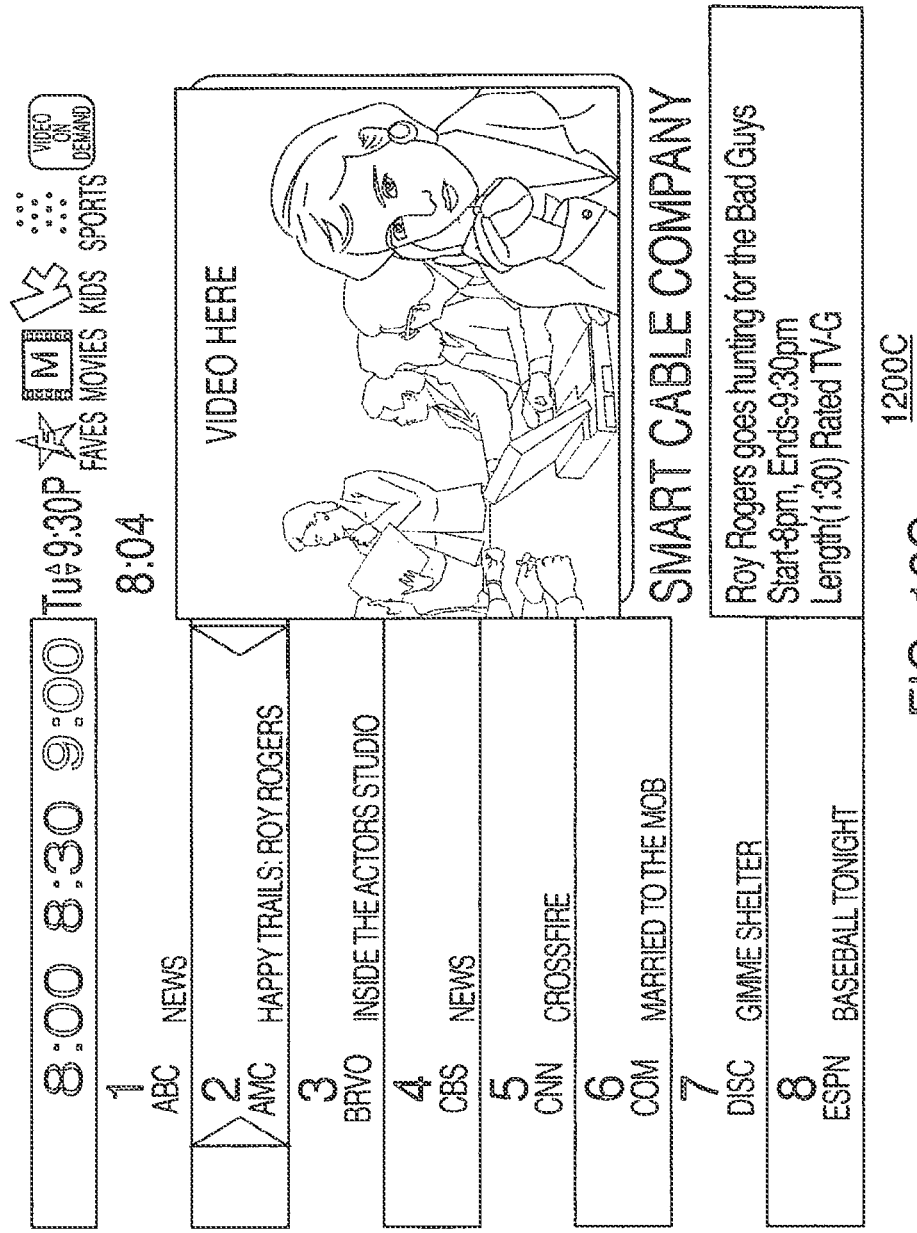

Referring now to FIGS. 12A through 12C, FIG. 12A depicts a IEPG display 1200A having the first time slot 605A emphasized and each of the title objects 611A associated with that first time slot being revealed, while the title objects 611B and 611C associated with the non-emphasized time slots 605B and 605C are hidden. In FIG. 12A, the first time slot object is emphasized and the second and third time slots are de-emphasized; in FIG. 12B the second time slot object is emphasized, while the first and third time slot objects are de-emphasized; and in FIG. 12C, the third time slot object is emphasized while the first and second time slot objects are de-emphasized. Note that in all cases the operation of the title description object 650 remains unchanged, as does the operation of the video barker 120 and all the other functional elements of the program guide.

Figure 13:
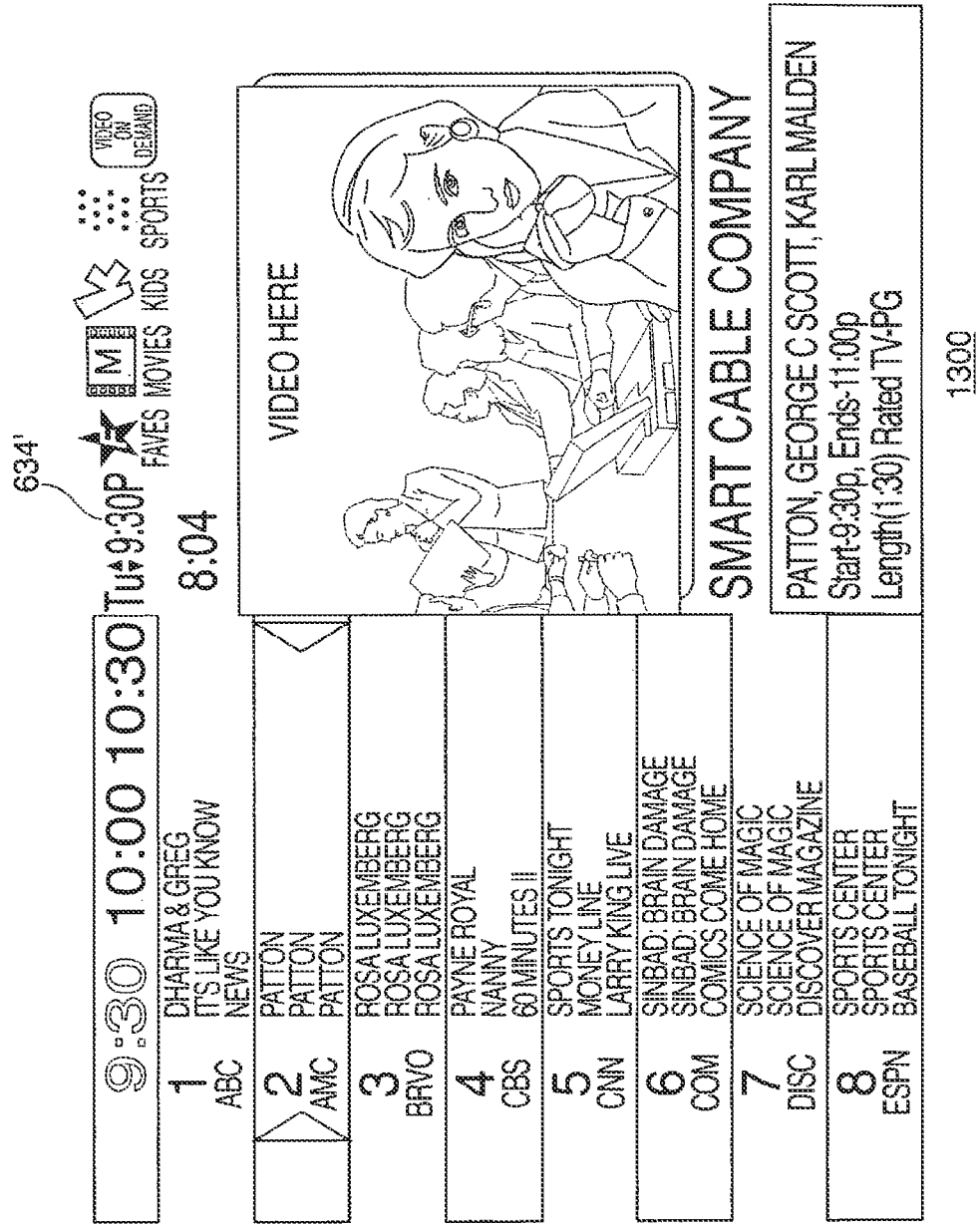

FIG. 13 depicts an IEPG display 1300 that is substantially the same as depicted and described above with respect to FIG. 11A. The difference between the IEPG displays 1300 of FIGS. 13 and 1100A of FIG. 11A comprise the use of the next time slot object 634. Specifically, referring now to FIG. 11A, the next time slot object 634 indicates that the next time slot is 9:30 p.m. This is correct since the third time slot object 605C is 9:00 and the time slots in the exemplary embodiment comprise one half hour each.

As previously described with respect to FIG. 8C, in the case of the image region being active, activations of up or down arrows by a user via a remote control device result in respective incrementing or decrementing of the indicated time slot within the next time slot object 634. Upon receiving a select command, the video stream including the present channel information for the time indicated by the selected next time slot object 634 is retrieved. In the case of that video stream being part of a currently broadcast or currently used video stream (e.g., another user has requested this stream), the head end provides information to the set top terminal enabling the set top terminal to identify which video stream includes the appropriate channel guide information. The set top terminal then retrieves the appropriate video stream. Of course, where the appropriate video stream is located within a different transport stream than the transport stream including the presently viewed video stream, it will be necessary to also select the audio stream from the new transport stream.

Referring now to FIG. 13, a present time object 634' is shown. Specifically, rather than the next time slot object 634 of FIG. 11A, the present time object 634' of FIG. 13 depicts the presently emphasized time slot or, optionally, the first time slot 605A contents. Thus, in the IEPG display 1300 of FIG. 13, the present time slot object 634' identifies the present time slot as 9:30 p.m., which corresponds to the 9:30 time depicted in the first time slot object 605A of FIG. 13.

Figure 14:
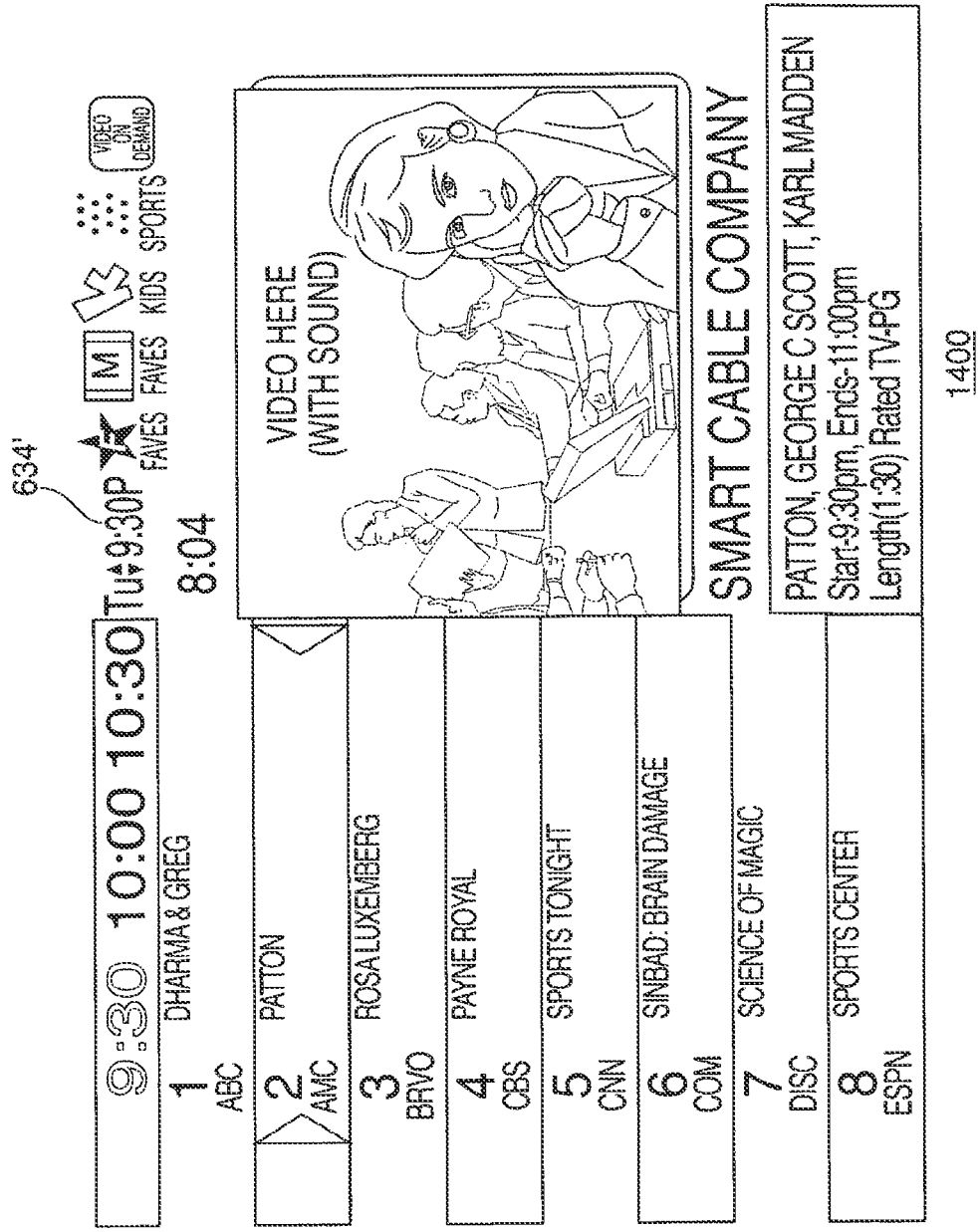

Referring now to FIG. 14, the IEPG display 1400 depicted in FIG. 14 is substantially the same as the IEPG display 1200A depicted in FIG. 12A. As previously described above with respect to FIG. 13, the IEPG display 1400 of FIG. 14 includes a present time object 634' that is indicative of the first time slot object 605A within the guide portion of the IEPG display. The present time slot object 634' may be incremented or decremented using appropriate up or down arrows to indicate a desired present time slot, which, upon selection via the SELECT key, will be retrieved by the set top terminal and displayed as the IEPG display 1400.

The IPG display screen 600 of FIG. 6 (and corresponding display screens depicted in FIGS. 11-14) is shown with channel content object 610-1 through 610-8 depicted as a function of time slots 605A-605C, where each channel content object includes three title objects 611A-611C. In an alternate mode of operation, time slots associated with the group of channels are described for a larger amount of time. Similarly, fewer objects are depicted as a function of channel content objects. That is, a smaller number of channel objects 610 is displayed though each displayed channel object includes more than three title objects 611.

It is important to note that the source of information for the various information elements of the IEPG displays of FIGS. 1, 6 and 11-14. Specifically, both the guide region and image region of the IEPG displays are provided as broadcast, narrowcast or pointcast video streams from the head end. That is, the program guide information is assembled at the head end and provided as video information to the STTs within the system. Manipulation of video layer objects is accomplished by proxy manipulations of graphic layer objects. The STT provides (beyond tuning, demultiplexing, decoding and such operations) the ability to highlight or emphasize object and to select a highlighted or emphasized object. The graphic information manipulated by the STT is received via a data stream (i.e., a data PID), auxiliary data, private data, and the like. Advantageously, since there is no local storage of an entire program guide database, memory resources of the STT are conserved. Rather, information sufficient to describe a highlighted program title is included within the aforementioned data stream and may be contemporaneously transmitted to the STT along with the video stream including the channel group/time slots including the highlighted program title.

Figure 15A:
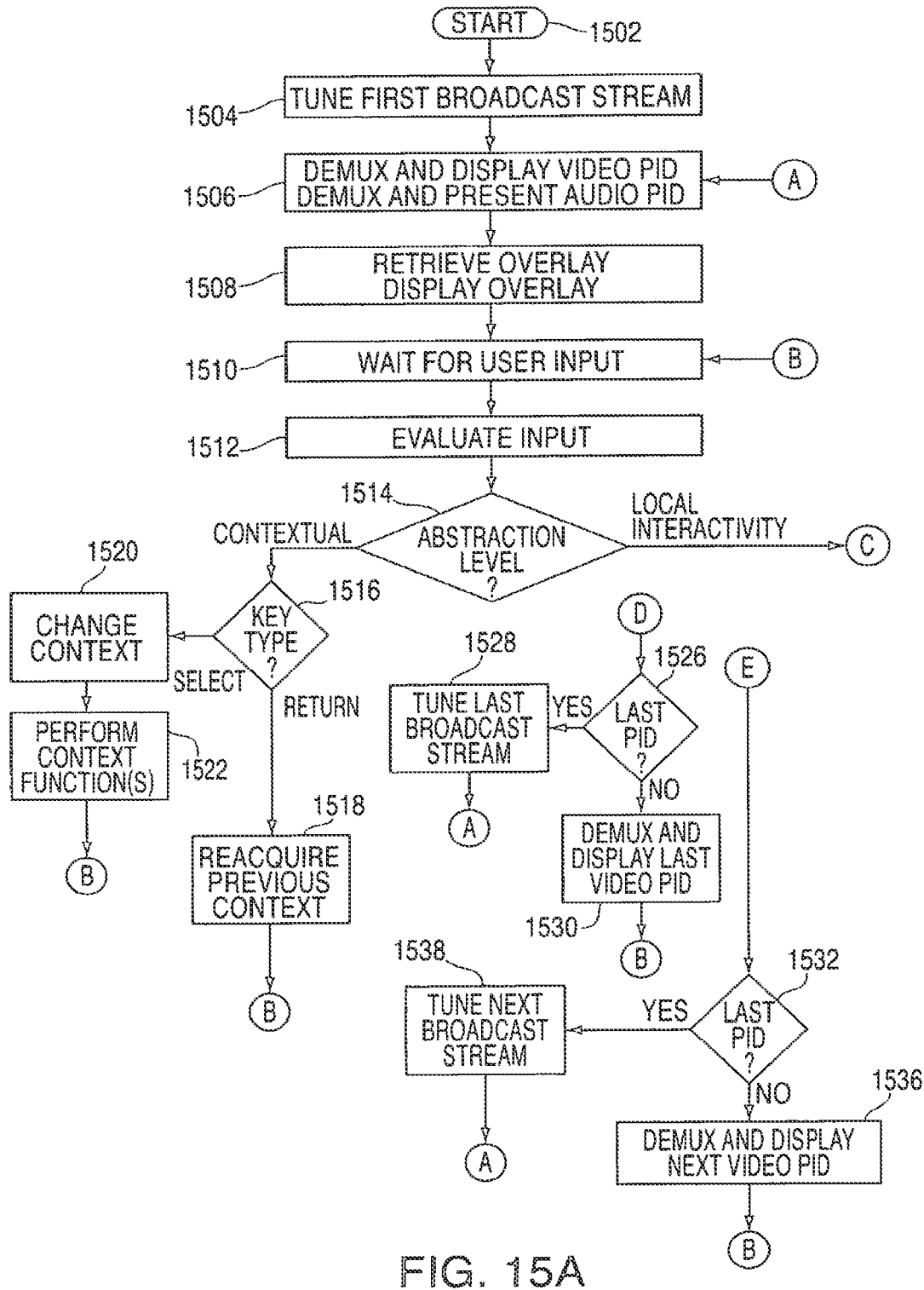
FIGS. 15A and 15B together comprise a user interaction method 1500 according to the invention.
Figure 15B:
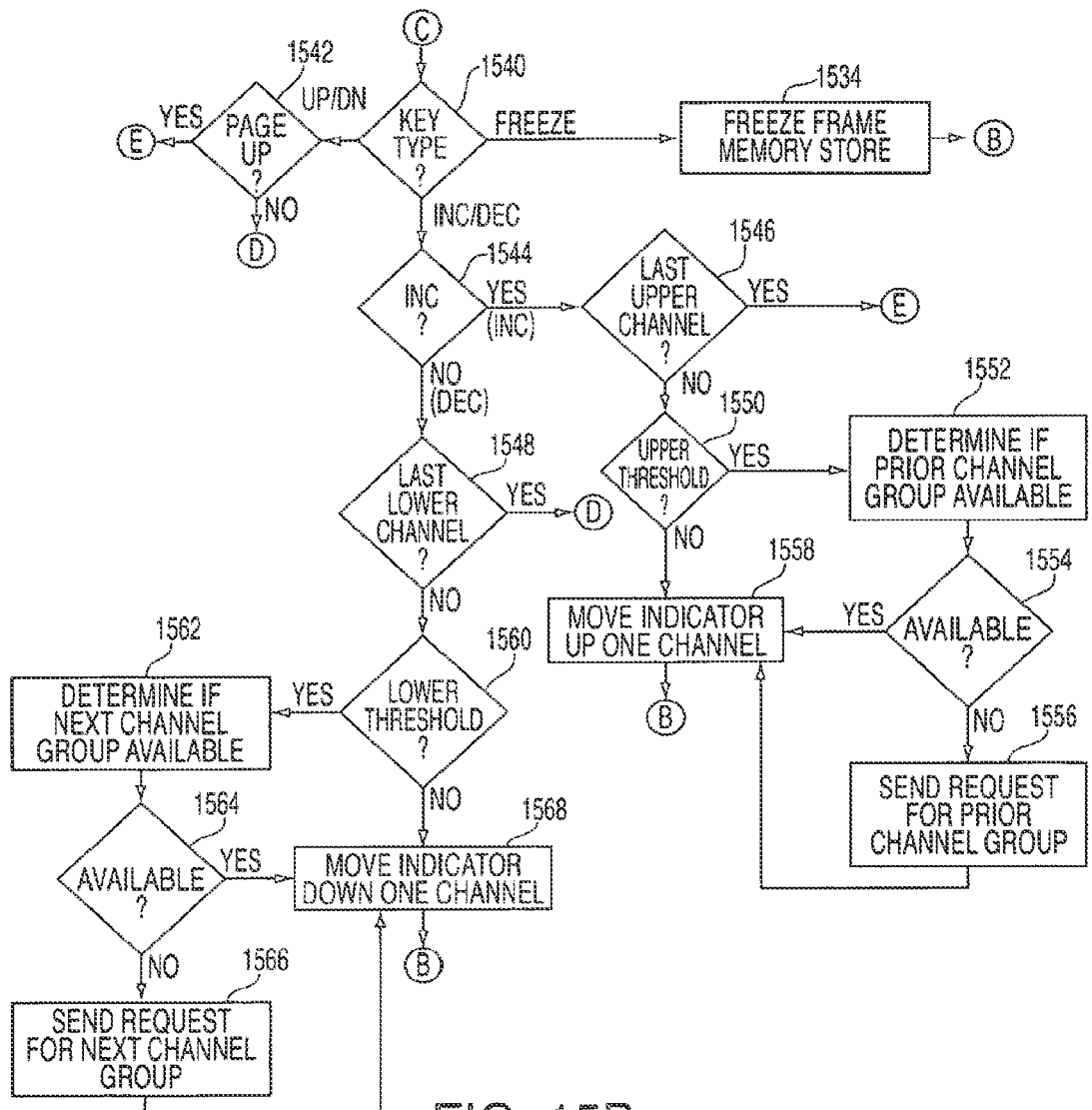

FIGS. 15A and 15B together comprise a user interaction method 1500 according to the invention. FIG. 15B also depicts a diagram representing an alignment between 15A and FIG. 15B. The method 1500 of FIG. 15 comprises a plurality of steps including some that perform substantially the same function as depicted above with respect to the user action method 500 of FIG. 5. Specifically, steps 504-522 of the user interaction method 500 of FIG. 5 operate in substantially the same way as steps 1502-1522 of the user interaction method 1500 of FIG. 15. Therefore, these steps will not be described in further detail except where such description indicates changes or additions to the previously described steps 502-522.

Referring now to step 1514 of FIG. 15 (which corresponds to step 514 of FIG. 5), if the query at step 1514 indicates that local interactivity only is requested by the user, then the method 1500 proceeds to step 1540, where a query is made as to the type of key pressed by the user. If the query at step 1540 indicates that a "freeze" key has been pressed by the user, then the method 1500 proceeds to step 1534, where the video frame presently stored in the frame store unit 262 is frozen. That is, the frame store unit 262 is not updated by subsequent video frames until such time as the "freeze" key or other key is pressed. The method 1500 then proceeds to step 1510, where the processor waits for user input.

If the query at step 1514 indicates that either an increment or "decrement" key has been pressed (e.g., a channel indication increment or decrement command) then the method proceeds to step 1544. If the query at step 1540 indicates that either a page up or "page down" key has been pressed, then the method 1500 proceeds to step 1542.

At step 1542, a query is made to determine if the pressed or activated one of a "page up" or "page down" key is, in fact, the "page up" key. If the query at step 1542 indicates that the "page up" key has been pressed, then the method 1500 proceeds to step 1532. If the query at step 1542 indicates that the "page down" key has been pressed, then the method 1500 proceeds to step 1526. As previously described with respect to FIG. 9A, a "page down" key pressed while the guide region is active indicates a desire to select the video stream including the program guide having a next group of channels, while a "page up" key pressed while the guide region is active indicates a desire to select the video stream including the program guide having a prior group of channels.

At step 1544, a query is made as to whether an "increment" key has been pressed. If the query at step 1544 is answered affirmatively, then the method 1500 proceeds to step 1546. If the query at step 1544 is answered negatively (i.e., a "decrement" key has been pressed), then the method 1500 proceeds to step 1548.

At step 1546, a query is made as to whether a last upper channel is presently being indicated. That is, a query is made as to whether the upper most channel of the program guide (i.e., channel content object 610-1) is presently indicated by channel indicators 641A and 641B. If the query at step 1546 is answered affirmatively, then the method 1500 proceeds to step 1532. Specifically, if the upper most channel content object 610-1 is presently indicated, then the satisfaction of the user "increment" key input requires the selection of the video stream including the next channel group (i.e., the channel group including a lower channel that is contiguous with the presently selected upper channel in a channel guide sense). If the query at step 1546 is answered negatively, then the method 1500 proceeds to step 1550.

At step 1550, a query is made as to whether an upper threshold level has been reached. As previously discussed with respect to path 830 of FIG. 8B, an upper threshold level is a level at which a request for a prior channel PID should be made if such a prior channel PID is unavailable. If the query at step 1550 is answered affirmatively, then the method 1500 proceeds to step 1552. If the query at step 1550 is answered negatively, then the method 1500 proceeds to step 1558.

At step 1552, a determination is made as to whether the prior channel group is available. An available channel group is a channel group within a video stream that is presently being broadcast or narrowcast or pointcast to one or more set top terminals. As previously noted, the set top terminal receives information associating each channel group with a particular video stream as identified by a unique PID. If the unique PID, or the stream associated with the unique PID, is not being broadcast, narrowcast, or pointcast, then it is appropriate at this time to request that the head end begin a pointcast session so that the prior channel group may be received by the set top terminal without undue delay (e.g., without the user experiencing latency due to the amount of time required to process and respond to a request for a video stream). The method 1500 then proceeds to step 1554.

At step 1554, a query is made as to whether the prior channel group is available. If the query at step 1554 is answered negatively, then the method 1500 proceeds to step 1556, where a request for the prior channel group is sent to the head end for processing. The method then proceeds to step 1558. If the query at step 1554 is answered affirmatively, then the method proceeds to 1558.

At step 1558, the channel indicator is moved up by one channel content object 610. That is, the channel content object immediately above the presently indicated channel content object is now indicated. The method 1500 then proceeds to step 1510 to wait for the next user input.

If the query at step 1544 is answered negatively, then the method 1500 then proceeds to 1548. At step 1548 a query is made as to whether the presently indicated channel is the last lower channel. That is, a query is made as to whether the presently indicated channel is channel content object 610-8, per FIG. 6. If the query at step 1548 is answered affirmatively, then the method 1500 proceeds to step 1546. It is important to note that if the presently indicated channel is associated with channel content object 610-8, then a decrement command, as noted above with respect to FIG. 8B and path 832, requires the selection of the next channel PID to display the upper most channel of the next channel group (i.e., channel content object 610-1 of the next channel group). If the query at step 1548 is answered negatively, then the method 1500 precedes to step 1560.

At step 1560, a query is made as to whether a lower threshold has been reached. If the query at step 1560 is answered negatively, then the method 1500 proceeds to step 1568. If the query at step 1560 is answered affirmatively, then the method 1500 proceeds to step 1562.

At step 1562, a determination is made if the next channel group is available. This is, in a manner similar to that described above with respect to step 1552, a determination is made if a presently broadcast, narrowcast, or pointcast stream includes an IEPG guide display including information related to the next channel group. The method 1500 then proceeds to step 1564.

At step 1564, a query is made as to whether the next channel group is in fact available. If the query at step 1564 is answered affirmatively, then the method 1500 proceeds to step 1568. If the query at step 1564 is answered negatively, then the method 1500 proceeds to step 1566.

At step 1566, a request is made by the set top terminal to the head end for the head end to retrieve information associated with the next channel group (i.e., the guide and image portions of the IEPG display including the next channel group, or alternatively, a previously stored video screen including the appropriate information). As previously noted, by requesting such information at this point, the apparent latency of the system, as experienced by the user, is greatly reduced. The method 1500 then proceeds to step 1568.

At step 1568, channel indicators 641A and 641B are decremented or moved down by one channel content object 610. The method 1500 then proceeds to step 1510, where it waits for user input.

FIG. 16 depicts a flow diagram of a head end stream request processing method. Specifically, FIG. 16 depicts a flow diagram of a method 1600 for responding to a request for a pointcast stream simple for use in a head within the information distribution system of FIG. 4 or 17.

The method 1600 is entered at step 1602 and proceeds to step 1604, where a request for a pointcast or a narrowcast stream is received by the head end. The method 1600 then proceeds to step 1606, where a query is made to determine whether the requested stream is presently being provided to any user on the same QAM information stream or forward channel stream. If the query at step 1606 is answered negatively, then the method 1600 proceeds to step 1608. If the query at step 1606 is answered affirmatively, then the method 1600 proceeds to step 1604.

At step 1608, the requested stream is constructed or retrieved from a storage device. In the case of real-time, synchronized encoding of a plurality of guide streams, the encoded, packetized stream is retrieved. The method then proceeds to step 1612.

At step 1612, a PID is assigned to the retrieved or constructed stream and, additionally, a PID/Guide ID table associated with the QAM information stream is updated to indicate that the assigned PID is now associated with the requested stream. The method 1600 then proceeds to step 1614 where a pointcast session is initiated in the manner described above with respect to FIGS. 2-5. The method 1600 then proceeds to step 1616.

It should be noted that the head end provides, for each QAM channel, a PID/Guide ID table stream that conveys to each STT the PID assignment for each stream being provided. In the case of the program guide streams, each program guide stream is represented in a relational way from the present-time broadcast guide streams. If user interaction indicates that a new guide stream is to be selected, the STT examines the PID/Guide ID to see which PID is associated with the Guide ID representing the new guide stream. If there is no PID entry in the table, then it is likely that a pointcast or narrowcast session is necessary to provide the new stream via a PID that is selected by the head end.

Advantageously, the above-described embodiments of the invention utilize a very small amount of STT memory (typically less than 100 Kb). Additionally, the invention takes the consumer navigation experience from the confusing guide presentations of the prior art, back up to the level of a television experience—and adds interactivity. This is achieved by basing the user interaction model on a series of digitally-delivered, compressed video clips that include the appropriate guide information as integrated imagery along with, e.g., promotional video and audio information. In this manner, the local storage of guide data and the rasterization or compositing of the locally stored guide data at the set-top box is avoided.

It must be noted that the above-described data structures and other methods provided for sending video streams to the set top terminals may be formed in accordance with the teachings of contemporaneously filed U.S. patent application Ser. No. 09/293,535 (the '535 application), which is incorporated herein by reference in its entirety.

Specifically, the '535 application provides a data structure suited to efficiently representing a plurality of image streams including common and non-common portions. Specifically, a plurality of similar group of picture (GOP) data structures representing the corresponding plurality of image streams including common and non-common portions is adapted to provide a first encoded stream comprising only P-picture and B-picture access units of one of the similar GOP data structures, and a corresponding plurality of encoded streams comprising only respective I-picture access units of the similar GOP data structures. In this manner, the redundant P-picture and B-picture access units within the encoded streams are eliminated, thereby greatly reducing the bandwidth or memory resources needed to transmit or store the plurality of image streams.

A data structure according to the '535 invention comprises: a multiplexed stream comprising a plurality of video streams representing respective first portions of a group of pictures (GOP) information structure, each of the respective first portions including an access unit associated with an I-picture and a video stream representing a remaining portion of the GOP information structure including at least one of an access unit associated with a P-picture and an access unit associated with a B-picture, wherein: a concatenation of one of the respective first portions of the GOP information structure and the second portion of the GOP structure results in a complete GOP information structure.

Although various embodiments which incorporate the teachings of the present invention have been shown and described in detail herein, those skilled in the art can readily devise many other varied embodiments that still incorporate these teachings.

What is claimed is:

1. An apparatus comprising:
   a processor; and
   one or more memories storing software instructions that, when executed by the processor, cause the apparatus to:
   receive, from a network, a video comprising imagery identifying programming offered by each of a plurality of sources, the imagery comprising a plurality of video objects;
   receive, from the network, a transmission comprising a plurality of graphic overlay objects;
   merge the video with the transmission to generate a first modified video comprising the imagery overlayed with the plurality of graphic overlay objects;
   output the first modified video for display;
   modify a graphic overlay object of the plurality of graphic overlay objects to generate a modified graphic overlay object, in response to receiving a user command; and
   merge the video with the modified graphic overlay object and the plurality of graphic overlay objects, to generate a second modified video comprising the imagery overlayed with the modified graphical overlay object and the plurality of graphic overlay objects, wherein the modifying the graphic overlay object and the merging the video with the modified graphical overlay object and the plurality of graphic overlay objects selectively emphasize or deemphasize a video object of the plurality of video objects.

2. The apparatus of claim 1, wherein the software instructions, when executed, further cause the apparatus to:
   receive a second video comprising second imagery identifying programming offered by each of a second plurality of sources, the second imagery comprising a second video object;
   further modify a second graphic overlay object of the plurality of graphic overlay objects; and
   merge the second video with the plurality of graphic overlay objects to generate a third modified video comprising the second imagery overlayed with the plurality of graphic overlay objects, wherein the merging of the second video with the plurality of graphic overlay objects and the further modifying of the second graphic overlay object emphasize or deemphasize the second video object.

3. The apparatus of claim 1, wherein the video object of the plurality of video objects comprises a moving image within the video.

4. The apparatus of claim 1, wherein the software instructions, when executed, further cause the apparatus to:
   output the first modified video for display with and without the emphasizing or the deemphasizing of the video object.

5. The apparatus of claim 1, wherein, to modify the graphic overlay object, the software instructions, when executed, further cause the apparatus to:
   adjust at least one of a chrominance and a luminance parameter of the graphic overlay object.

6. The apparatus of claim 1, wherein the one or more memories further store software instructions that, when executed by the processor, cause the apparatus to output the second modified video for display.

7. The apparatus of claim 1, wherein each of the plurality of graphic overlay objects corresponds to a corresponding video object of the plurality of video objects, and user interaction with each of the graphic overlay objects selectively emphasizes or deemphasizes a corresponding video object.

8. A method comprising:
   receiving, at a terminal from a network, a video comprising imagery identifying programming offered by each of a plurality of sources, the imagery comprising a plurality of video objects;
   receiving, from the network, a transmission comprising a plurality of graphic overlay objects;
   merging the video with the transmission to generate a first modified video comprising the imagery overlayed with the plurality of graphic overlay objects;
   outputting the first modified video for display;
   modifying a graphic overlay object of the plurality of graphic overlay objects in response to receiving a user command to generate a modified graphic overlay object; and
   merging the video with the modified graphic overlay object and the plurality of graphic overlay objects, to generate a second modified video comprising the imagery overlayed with the modified graphic overlay object and the plurality of graphic overlay objects, wherein the modifying the graphic overlay object and the merging the video with the modified graphic overlay object and the plurality of graphic overlay objects selectively emphasize or deemphasize a video object of the plurality of video objects.

9. The method of claim 8, further comprising:
   receiving a second video comprising second imagery identifying programming offered by each of a second plurality of sources, the second imagery comprising a second video object;
   further modifying a second graphic overlay object of the plurality of graphic overlay objects; and
   merging the second video with the transmission to generate a third modified video comprising the second imagery overlayed with the plurality of graphic overlay objects, wherein the merging of the second video with the transmission and the further modifying of the second graphic overlay object emphasize or deemphasize a second video object of the plurality of video objects.

10. The method of claim 8, wherein the video object comprises a moving image within the video.

11. The method of claim 8, further comprising:
   outputting the first modified video for display with and without the emphasizing or the deemphasizing of the video object.

12. The method of claim 8, wherein the modifying includes adjusting at least one of a chrominance and a luminance parameter of the graphic overlay object.

13. The method of claim 8, further comprising outputting the second modified video for display.

14. The method of claim 8, wherein each of the plurality of graphic overlay objects corresponds to a corresponding video object of the plurality of video objects, and user interaction with each of the graphic overlay objects selectively emphasizes or deemphasizes a corresponding video object.

15. A method comprising:
receiving, from a network, at a terminal, a video transmission, the video transmission comprising images of a user interface screen identifying programming offered by each of a first plurality of channels, the video transmission further comprising a plurality of video objects corresponding to interactive elements of the user interface screen;
retrieving from the network, a graphic overlay comprising a plurality of graphic objects, each of the plurality of graphic objects having a predefined display position visually cooperative with a display position of a corresponding video object of the plurality of video objects in the video transmission, each of the graphic objects being user interactive to selectively emphasize or deemphasize the corresponding video object;
merge the video transmission with the graphic overlay to generate a first modified video comprising the images overlayed with the plurality of graphic objects;
outputting the first modified video for display;
in response to a user interaction with one of the plurality of video objects, modifying, by the terminal, a graphic object corresponding to the one of the video objects to generate a modified graphic object; and
merging the video transmission with the modified graphic object and the plurality of graphic objects to generate a second modified video transmission.

16. The method of claim 15, further comprising:
receiving a second video transmission comprising second imagery identifying programming offered by each of a second plurality of sources, the second imagery comprising a second plurality of video objects;
further modifying a second graphic object of the plurality of graphic objects; and
merging the second video transmission with the graphic overlay to generate a third modified video transmission comprising the second imagery overlayed with the plurality of graphic objects, wherein the merging of the second video transmission with the graphic overlay and the further modifying of the second graphic object emphasize or deemphasize a corresponding video object.

17. The method of claim 15, wherein the one of the plurality of video objects comprises a moving image within the video transmission.

18. The method of claim 15, further comprising:
displaying the first modified video with and without the emphasizing or the deemphasizing of the one of the plurality of video objects.

19. The method of claim 15, wherein the modifying includes adjusting at least one of a chrominance and a luminance parameter of the graphic object.

20. The method of claim 15, further comprising outputting the second modified video transmission for display.

* * * * *

UNITED STATES PATENT AND TRADEMARK OFFICE
CERTIFICATE OF CORRECTION

PATENT NO. : 9,674,586 B2
APPLICATION NO. : 13/847751
DATED : June 6, 2017
INVENTOR(S) : Gordon et al.

Page 1 of 1

It is certified that error appears in the above-identified patent and that said Letters Patent is hereby corrected as shown below:

On the Title Page

Page 6, Column 1, Other Publications, Line 13:
Please delete "0." and insert --O.--.

In the Specification

Column 1, Background of the Disclosure, Line 61:
Delete "(DRS)" and insert --(DBS)--.

Column 34, Description of the Embodiment, Line 26:
Delete "FIGS." and insert --FIG.--.

Signed and Sealed this
Twenty-sixth Day of February, 2019

Andrei Iancu
*Director of the United States Patent and Trademark Office*